(12) United States Patent
Yamaguchi et al.

(10) Patent No.: US 8,248,728 B2
(45) Date of Patent: Aug. 21, 2012

(54) THIN-FILM MAGNETIC HEAD HAVING A MAGNETIC POLE FORMED OF A PLATING FILM

(75) Inventors: Atsushi Yamaguchi, Tokyo (JP); Masaya Kato, Tokyo (JP); Koichi Otani, Tokyo (JP); Wakako Okawa, Tokyo (JP)

(73) Assignee: TDK Corporation, Tokyo (JP)

(*) Notice: Subject to any disclaimer, the term of this patent is extended or adjusted under 35 U.S.C. 154(b) by 306 days.

(21) Appl. No.: 12/697,699

(22) Filed: Feb. 1, 2010

(65) Prior Publication Data
US 2011/0188151 A1    Aug. 4, 2011

(51) Int. Cl.
*G11B 5/147* (2006.01)
(52) U.S. Cl. .................. 360/125.09; 360/125.13
(58) Field of Classification Search ......... 360/125.09, 360/125.1, 125.11, 125.13, 125.14, 125.15
See application file for complete search history.

(56) References Cited

U.S. PATENT DOCUMENTS

| | | | | |
|---|---|---|---|---|
| 5,867,350 A * | 2/1999 | Haga et al. | ............. | 360/319 |
| 6,144,287 A * | 11/2000 | Komeda | ............. | 338/195 |
| 6,452,756 B1 * | 9/2002 | Sasaki | ............. | 360/317 |
| 6,466,403 B1 * | 10/2002 | Sato et al. | ............. | 360/119.11 |
| 7,168,156 B2 * | 1/2007 | Sasaki et al. | ............. | 29/603.07 |
| 7,294,418 B2 | 11/2007 | Ikeda et al. | | |
| 7,333,296 B2 * | 2/2008 | Sasaki et al. | ............. | 360/125.03 |
| 7,436,627 B2 * | 10/2008 | Sasaki et al. | ............. | 360/125.09 |
| 7,468,864 B2 * | 12/2008 | Sasaki et al. | ............. | 360/125.12 |
| 7,472,471 B2 * | 1/2009 | Sasaki et al. | ............. | 29/603.16 |
| 7,518,824 B2 * | 4/2009 | Sasaki et al. | ............. | 360/125.09 |
| 7,656,612 B2 * | 2/2010 | Sasaki et al. | ............. | 360/125.14 |
| 7,877,860 B2 * | 2/2011 | Sasaki et al. | ............. | 29/603.16 |
| 7,951,415 B2 * | 5/2011 | Sasaki et al. | ............. | 427/131 |
| 7,978,432 B2 * | 7/2011 | Sasaki et al. | ............. | 360/125.42 |
| 2005/0280936 A1 * | 12/2005 | Sasaki et al. | ............. | 360/126 |
| 2008/0067073 A1 | 3/2008 | Kagawa et al. | | |
| 2008/0316642 A1 | 12/2008 | Yamaguchi et al. | | |
| 2009/0162699 A1 | 6/2009 | Sasaki et al. | | |

* cited by examiner

*Primary Examiner* — Brian Miller
(74) *Attorney, Agent, or Firm* — Oliff & Berridge, PLC

(57) ABSTRACT

A magnetic pole of a magnetic head includes a narrow and a wide portion, and is formed of a plating film. An electrode film forms the plating film, and is provided only under at least a part of the wide portion. A manufacturing method for the magnetic head includes: forming a plating-film-accommodating layer with an accommodating groove; forming the electrode film in part of the accommodating groove; and forming the plating film in the accommodating groove by plating using the electrode film. The accommodating groove includes a narrow and a wide groove portion for accommodating the narrow and wide portions, respectively. The electrode film is provided only in at least a part of the wide groove portion. In the step of forming the plating film, the plating film grows from the surface of the electrode film, and the narrow groove portion is filled with a part of the plating film.

7 Claims, 40 Drawing Sheets

THIN-FILM MAGNETIC HEAD HAVING A MAGNETIC POLE FORMED OF A PLATING FILM

BACKGROUND OF THE INVENTION

1. Field of the Invention

The present invention relates to a thin-film magnetic head having a magnetic pole that is formed of a plating film, and a method of manufacturing the same.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has a structure in which a reproducing head including a magnetoresistive element (hereinafter, also referred to as MR element) for reading and a recording head including an induction-type electromagnetic transducer for writing are stacked on a substrate. The recording systems of magnetic recording devices include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. As compared with the longitudinal magnetic recording system, the perpendicular magnetic recording system is harder to be affected by thermal fluctuation of the recording medium and capable of providing higher linear recording density.

Typically, the longitudinal magnetic recording system and the perpendicular magnetic recording system both use a thin-film magnetic head that has a structure in which a reproducing head including a magnetoresistive element (hereinafter, also referred to as an MR element) for reading and a recording head including an induction-type electromagnetic transducer for writing are stacked on a substrate. The recording head includes a magnetic pole that is made of a magnetic material. The magnetic pole includes a narrow portion and a wide portion, for example. The narrow portion has a front end face located in a medium facing surface that faces the recording medium, and a rear end opposite to the front end face. The wide portion is connected to the rear end of the narrow portion and has a width greater than that of the narrow portion. The magnetic pole produces, from the front end face of the narrow portion, a recording magnetic field for recording data on the recording medium. The width of the front end face of the narrow portion defines the track width. To increase the recording density, reduction in track width and improvement in recording characteristics, such as overwrite property which is a parameter indicating an overwriting capability, are required of the recording head.

A known method for forming the magnetic pole is to form the magnetic pole by plating in a groove that has a shape corresponding to the shape of the magnetic pole. For example, U.S. Patent Application Publication No. 2009/0162699 A1 describes a method in which a seed layer is initially formed in a groove of a pole-layer-encasing layer that is made of a nonmagnetic material, and then the magnetic pole is formed in the groove by plating. U.S. Patent Application Publication No. 2008/0316642 A1 describes a method in which a resist pattern that has an opening having a shape corresponding to that of the magnetic pole is formed on a nonmagnetic film. The nonmagnetic film and the resist pattern are used to form a groove, and an electrode film is formed in this groove before the magnetic pole is formed in the groove by plating.

A description will now be given of problems that occur with the formation of the magnetic pole having the narrow portion and the wide portion by using the method of forming the magnetic pole in a groove by plating. In such a case, the groove has a narrow groove portion for accommodating the narrow portion of the magnetic pole and a wide groove portion for accommodating the wide portion of the magnetic pole. An electrode film for plating is formed in the groove. In the process of forming the magnetic pole in the groove by plating, a plating film grows from the surface of the electrode film. Here, in the narrow groove portion, two portions of the plating film that are grown from two portions of the electrode film lying on two sidewalls of the narrow groove portion meet each other to form a seam between the two portions of the plating film. This results in a seam in the middle of the narrow portion as seen in the width direction.

The seam is a large, uniform crystal grain boundary. Impurities are apt to segregate on the seam. The seam therefore becomes low in mechanical strength and susceptible to corrosion as compared with the other areas of the magnetic pole. Consequently, if a seam is formed in the narrow portion of the magnetic pole, the magnetic pole becomes prone to defects in the process of manufacturing the thin-film magnetic head, such as a deep recess in the position of the seam. The magnetic material has a lower density at the seam than in the other areas of the magnetic pole. The presence of the seam in the narrow portion of the magnetic pole thus degrades the recording characteristics such as overwrite property.

OBJECT AND SUMMARY OF THE INVENTION

It is an object of the present invention to provide a thin-film magnetic head including a magnetic pole that is formed of a plating film and has a narrow portion and a wide portion, the magnetic head having no seam in the plating film in the narrow portion, and to provide a method of manufacturing such a thin-film magnetic head.

A thin-film magnetic head of the present invention includes a medium facing surface that faces a recording medium, a magnetic pole formed of a plating film, and an electrode film provided under a part of the magnetic pole. The magnetic pole includes a narrow portion and a wide portion, the narrow portion having a front end face located in the medium facing surface and a rear end opposite to the front end face, the wide portion being connected to the rear end of the narrow portion and having a width greater than that of the narrow portion. The magnetic pole produces, from the front end face of the narrow portion, a recording magnetic field for recording data on the recording medium. The electrode film is provided not under the narrow portion but under at least a part of the wide portion.

In the thin-film magnetic head of the present invention, the electrode film may include a layer made of a nonmagnetic metal material.

A head assembly of the present invention includes a slider that is disposed to face a recording medium, and a supporter that flexibly supports the slider. The slider includes the thin-film magnetic head of the present invention.

A magnetic recording device of the present invention includes a recording medium, a slider that is disposed to face the recording medium, and a positioning device that supports the slider and positions the slider with respect to the recording medium. The slider includes the thin-film magnetic head of the present invention.

A first method of manufacturing the thin-film magnetic head of the present invention includes the steps of: forming a plating-film-accommodating layer that has an accommodating groove in which the plating film is to be accommodated later; forming the electrode film in a part of the accommodating groove; and forming the plating film in the accommodating groove by plating using the electrode film.

The accommodating groove includes a narrow groove portion for accommodating the narrow portion of the magnetic pole and a wide groove portion for accommodating the wide portion of the magnetic pole. The electrode film is provided not in the narrow groove portion but in at least a part of the wide groove portion. In the step of forming the plating film, the plating film grows from the surface of the electrode film, and the narrow groove portion is filled with a part of the plating film.

A second method of manufacturing the thin-film magnetic head of the present invention includes the steps of: fabricating a substructure by forming components of the thin-film magnetic head on a substrate, the substructure including a pre-head portion that is to become the thin-film magnetic head later and a to-be-removed portion that is to be removed later, the to-be removed portion adjoining the pre-head portion across a position where the medium facing surface is to be formed; and fabricating the thin-film magnetic head from the substructure so that the to-be-removed portion is removed from the substructure to form the medium facing surface.

The step of fabricating the substructure includes the steps of: forming a plating-film-accommodating layer that has an accommodating groove in which the plating film is to be accommodated later; forming the electrode film in a part of the accommodating groove; and forming the plating film in the accommodating groove by plating using the electrode film. The accommodating groove includes a narrow groove portion for accommodating the narrow portion of the magnetic pole, a wide groove portion for accommodating the wide portion of the magnetic pole, and a to-be-removed groove portion that is provided in the to-be-removed portion so as to be continuous with the narrow groove portion and is to be removed later.

In the second method of manufacturing the thin-film magnetic head of the present invention, the electrode film has a first part provided in at least a part of the wide groove portion and a second part provided in a part of the to-be-removed groove portion, the electrode film not being provided in the narrow groove portion. The first part of the electrode film has a first end that is closer to the position where the medium facing surface is to be formed. The second part of the electrode film has a second end that is closer to the position where the medium facing surface is to be formed. A center position at equal distances from the first end and the second end falls within the to-be-removed portion. In the step of forming the plating film, the plating film grows from the surfaces of the first and second parts of the electrode film, and the narrow groove portion is filled with a part of the portion of the plating film that is grown from the surface of the first part of the electrode film.

In the second method of manufacturing the thin-film magnetic head of the present invention, the plating film preferably has a thickness greater than ½ the distance between the first end and the second end of the electrode film.

According to the thin-film magnetic head of the present invention, the electrode film is provided not under the narrow portion but under at least a part of the wide portion. This makes it possible to provide a thin-film magnetic head in which the narrow portion of the magnetic pole has no seam in the plating film.

According to the first or second method of manufacturing the thin-film magnetic head of the present invention, the electrode film is provided not in the narrow groove portion but in at least a part of the wide groove portion. The narrow groove portion is filled with a part of the plating film that is grown from the surface of the electrode film provided in the wide groove portion. According to the present invention, it is thus possible to provide a thin-film magnetic head in which the narrow portion of the magnetic pole has no seam in the plating film.

Other objects, features and advantages of the present invention will become fully apparent from the following description.

DETAILED DESCRIPTION OF THE PREFERRED EMBODIMENT

Figure 8:
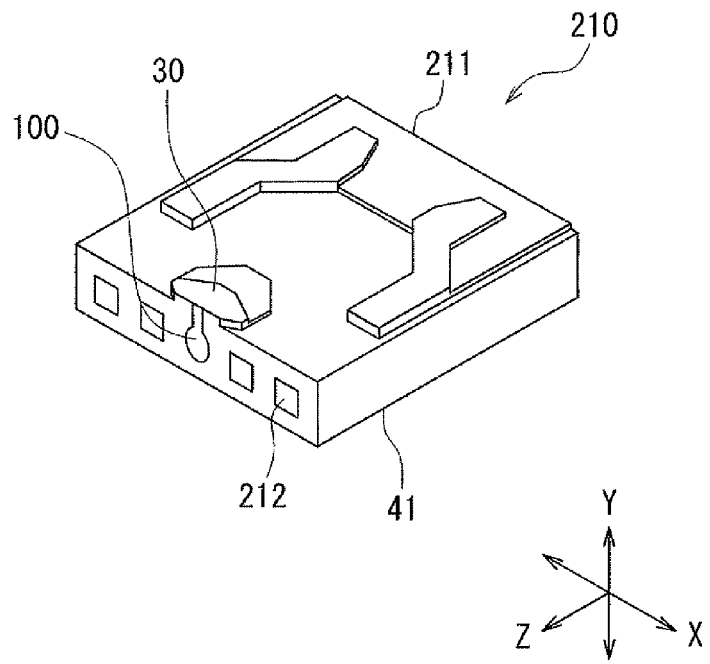
FIG. 8 is a perspective view showing a slider including the magnetic head according to the embodiment of the invention.

A preferred embodiment of the present invention will now be described in detail with reference to the drawings. Reference is first made to FIG. 8 to describe a slider 210 including a thin-film magnetic head (hereinafter, simply referred to as a magnetic head) according to the embodiment of the invention. The magnetic head according to the present embodiment is for use in perpendicular magnetic recording. In a magnetic recording device, the slider 210 is disposed to face a circular-plate-shaped recording medium (a magnetic disk) that is driven to rotate. In FIG. 8, the X direction is a direction across the tracks of the recording medium, the Y direction is a direction perpendicular to the surface of the recording medium, and the Z direction is the direction of travel of the recording medium as seen from the slider 210. The X, Y and Z directions are orthogonal to one another. The slider 210 has a base body 211. The base body 211 is nearly hexahedron-shaped. One of the six surfaces of the base body 211 is designed to face the surface of the recording medium. At this one of the six surfaces, there is formed a medium facing surface 30 to face the recording medium. When the recording medium rotates and travels in the Z direction, an airflow passing between the recording medium and the slider 210 causes a lift below the slider 210 in the Y direction of FIG. 8. This lift causes the slider 210 to fly over the surface of the recording medium. The magnetic head 100 according to the present embodiment is formed near the air-outflow-side end (the end in the Z direction) of the slider 210. A plurality of terminals 212 are also provided at the air-outflow-side end of the slider 210.

A head assembly according to the present embodiment will now be described with reference to FIG. 9. The head assembly according to the present embodiment includes the slider 210 shown in FIG. 8 and a supporter that flexibly supports the slider 210. Forms of the head assembly include a head gimbal assembly and a head arm assembly described below.

First, the head gimbal assembly 220 will be described. The head gimbal assembly 220 includes the slider 210, and a suspension 221 serving as the supporter that flexibly supports the slider 210. The suspension 221 includes: a plate-spring-shaped load beam 222 formed of, e.g., stainless steel; a flexure 223 to which the slider 210 is joined, the flexure 223 being provided at an end of the load beam 222 and giving an appropriate degree of freedom to the slider 210; and a base plate 224 provided at the other end of the load beam 222. The base plate 224 is configured to be attached to an arm 230 of an actuator for moving the slider 210 along the X direction across the tracks of the recording medium 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms with a plurality of head gimbal assemblies 220 respectively attached to the arms is called a head stack assembly.

Figure 9:
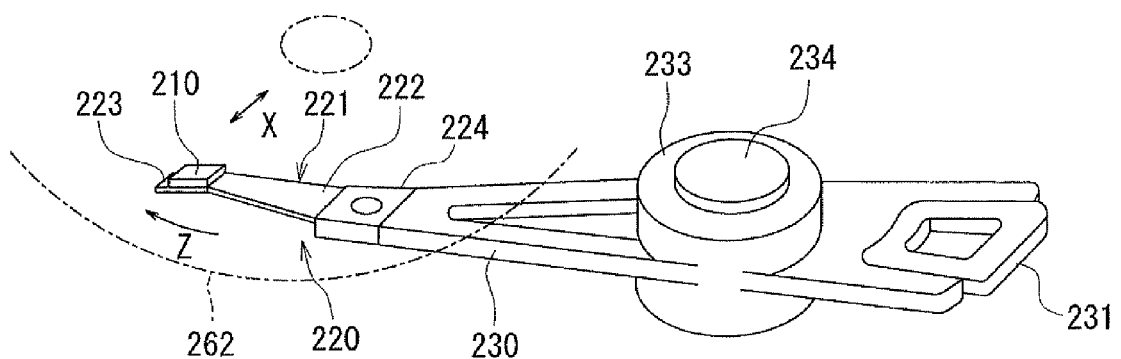
FIG. 9 is a perspective view showing a head arm assembly according to the embodiment of the invention.

FIG. 9 shows the head arm assembly according to the present embodiment. In the head arm assembly, the head gimbal assembly 220 is attached to an end of the arm 230. A coil 231 that forms a part of the voice coil motor is fixed to the other end of the arm 230. A bearing 233 is provided in the middle of the arm 230. The bearing 233 is attached to a shaft 234 for rotatably supporting the arm 230.

Figure 10:
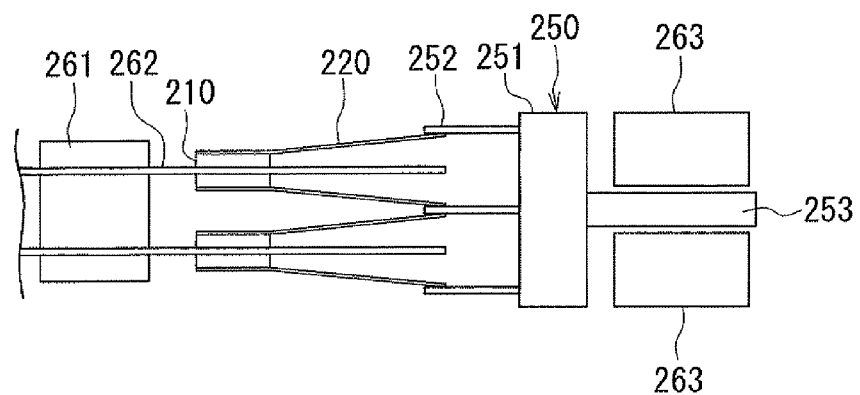
FIG. 10 is an explanatory diagram for explaining the main part of a magnetic recording device according to the embodiment of the invention.
Figure 11:
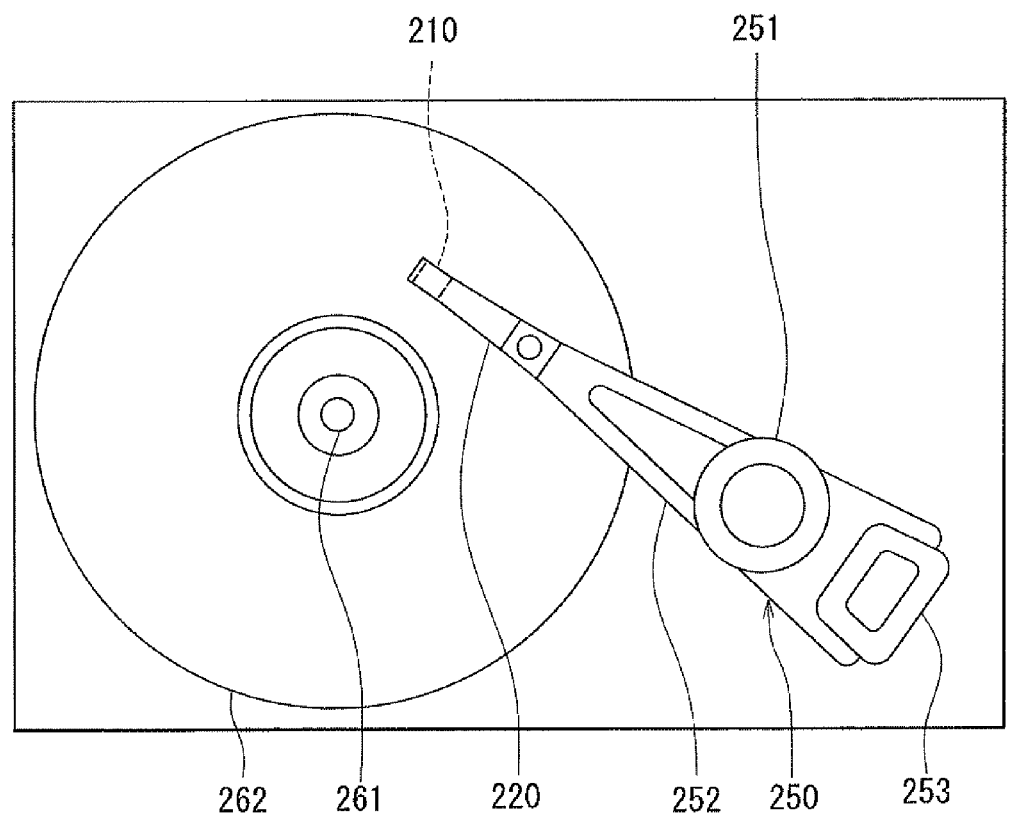
FIG. 11 is a plan view of the magnetic recording device according to the embodiment of the invention.

Reference is now made to FIG. 10 and FIG. 11 to describe an example of the head stack assembly and the magnetic recording device according to the present embodiment. FIG. 10 is an explanatory diagram showing the main part of the magnetic recording device. FIG. 11 is a plan view of the magnetic recording device. The head stack assembly 250 includes a carriage 251 having a plurality of arms 252. A plurality of head gimbal assemblies 220 are attached to the arms 252 such that the assemblies 220 are aligned in the vertical direction with spacing between every adjacent ones. A coil 253 that forms a part of the voice coil motor is mounted on a side of the carriage 251 opposite to the arms 252. The head stack assembly 250 is installed in the magnetic recording device. The magnetic recording device includes a plurality of recording media 262 mounted on a spindle motor 261. Two sliders 210 are allocated to each recording medium 262 such that the two sliders 210 are opposed to each other with the recording medium 262 located therebetween. The voice coil motor includes permanent magnets 263 arranged to be opposed to each other with the coil 253 of the head stack assembly 250 located therebetween. The actuator and the head stack assembly 250 except the sliders 210 correspond to the positioning device of the present invention, and support the sliders 210 and position them with respect to the recording media 262.

In the magnetic recording device according to the present embodiment, the actuator moves the slider 210 across the tracks of the recording medium 262 and positions the slider 210 with respect to the recording medium 262. The magnetic head included in the slider 210 records data on the recording medium 262 by using the recording head, and reproduces data stored on the recording medium 262 by using the reproducing head.

Figure 1:
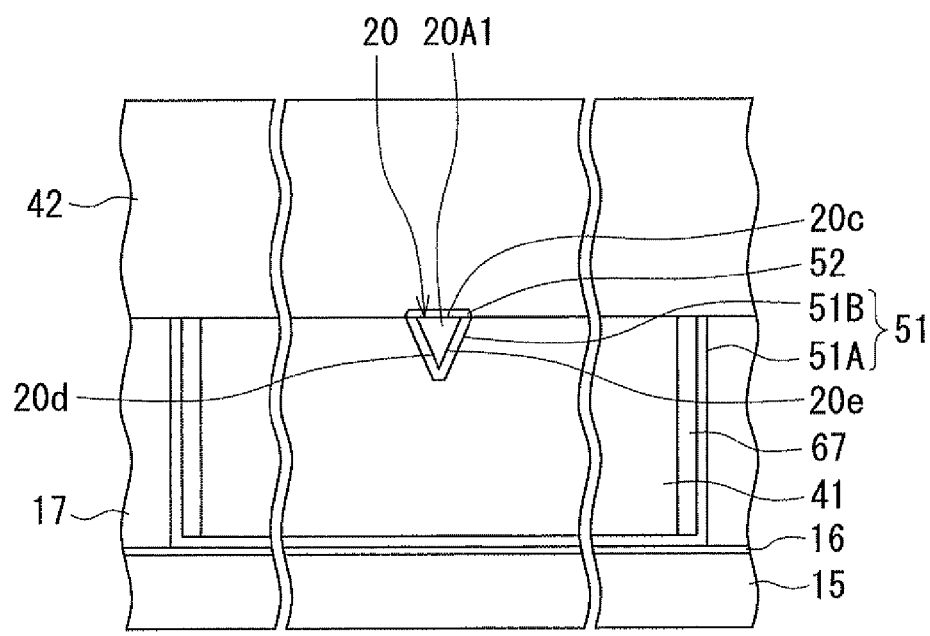
FIG. 1 is a front view showing a part of the medium facing surface of a magnetic head according to an embodiment of the invention.
Figure 2:
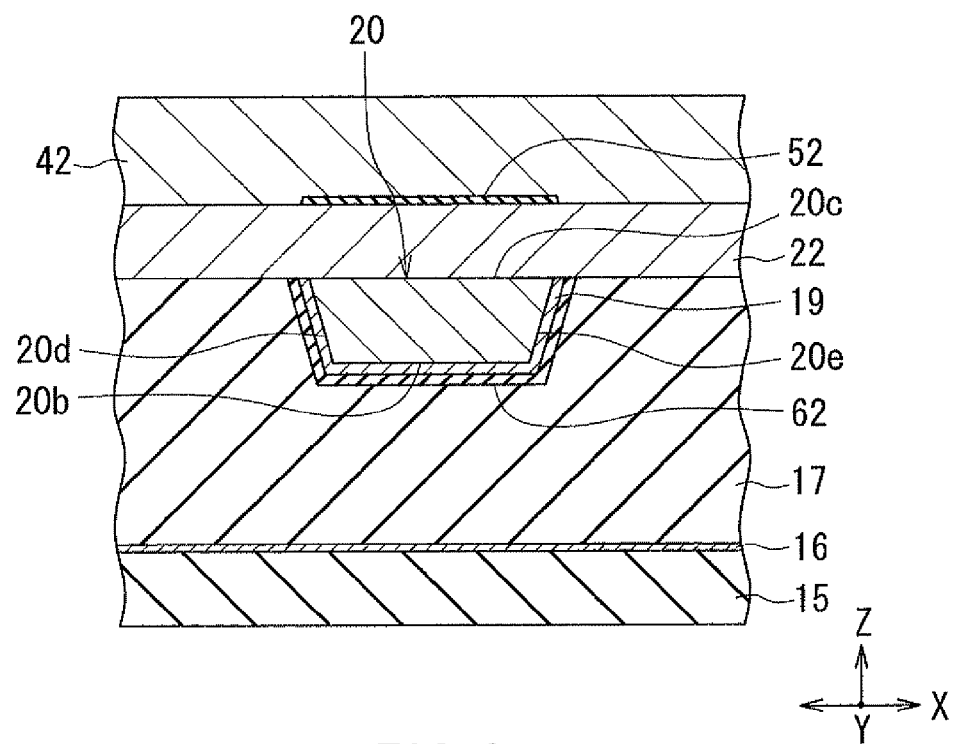
FIG. 2 is a cross-sectional view showing a cross section of the main part of the magnetic head according to the embodiment of the invention, the cross section being parallel to the medium facing surface.
Figure 3:
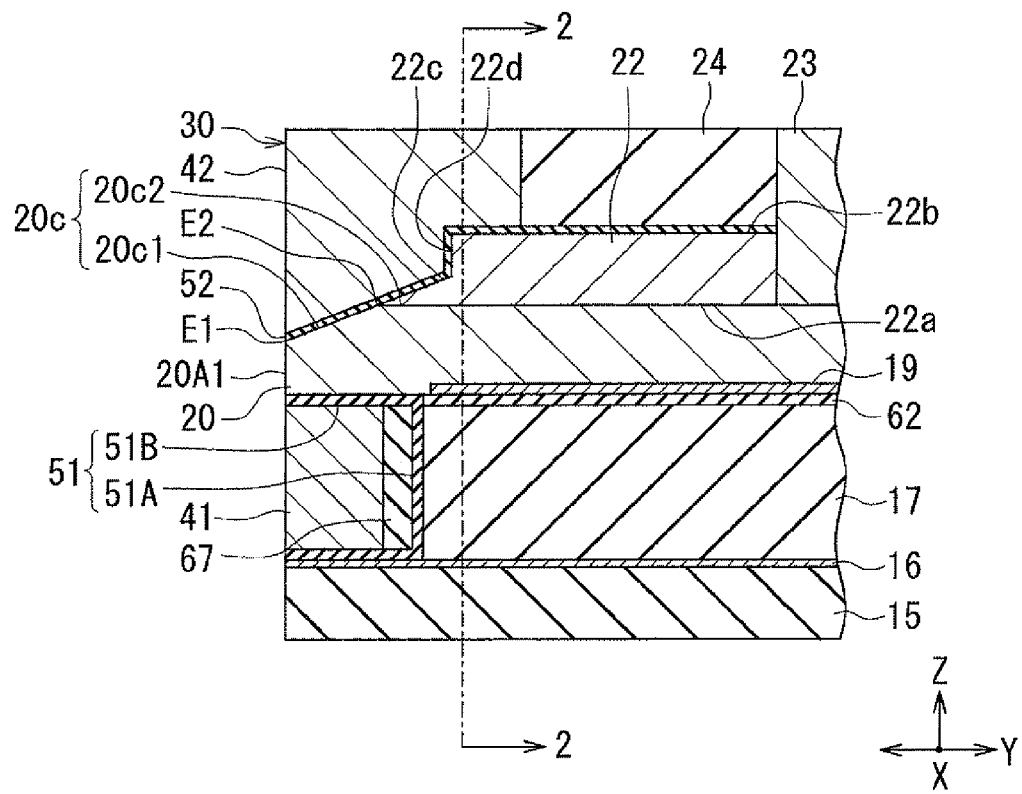
FIG. 3 is a cross-sectional view showing a cross section of the main part of the magnetic head according to the embodiment of the invention, the cross section being perpendicular to the medium facing surface.
Figure 4:
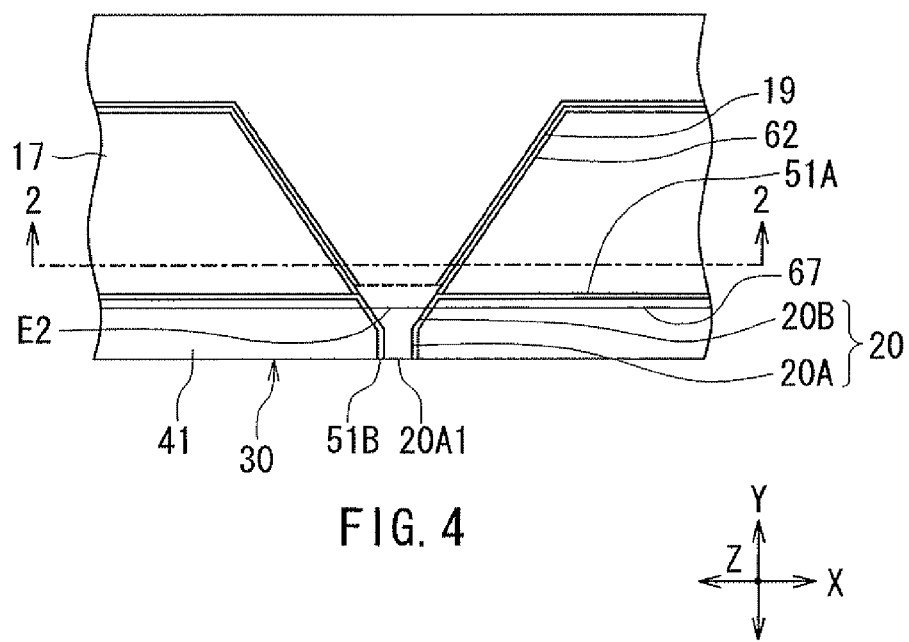
FIG. 4 is a plan view showing a part of the magnetic pole and its vicinity in the magnetic head according to the embodiment of the invention.
Figure 5:
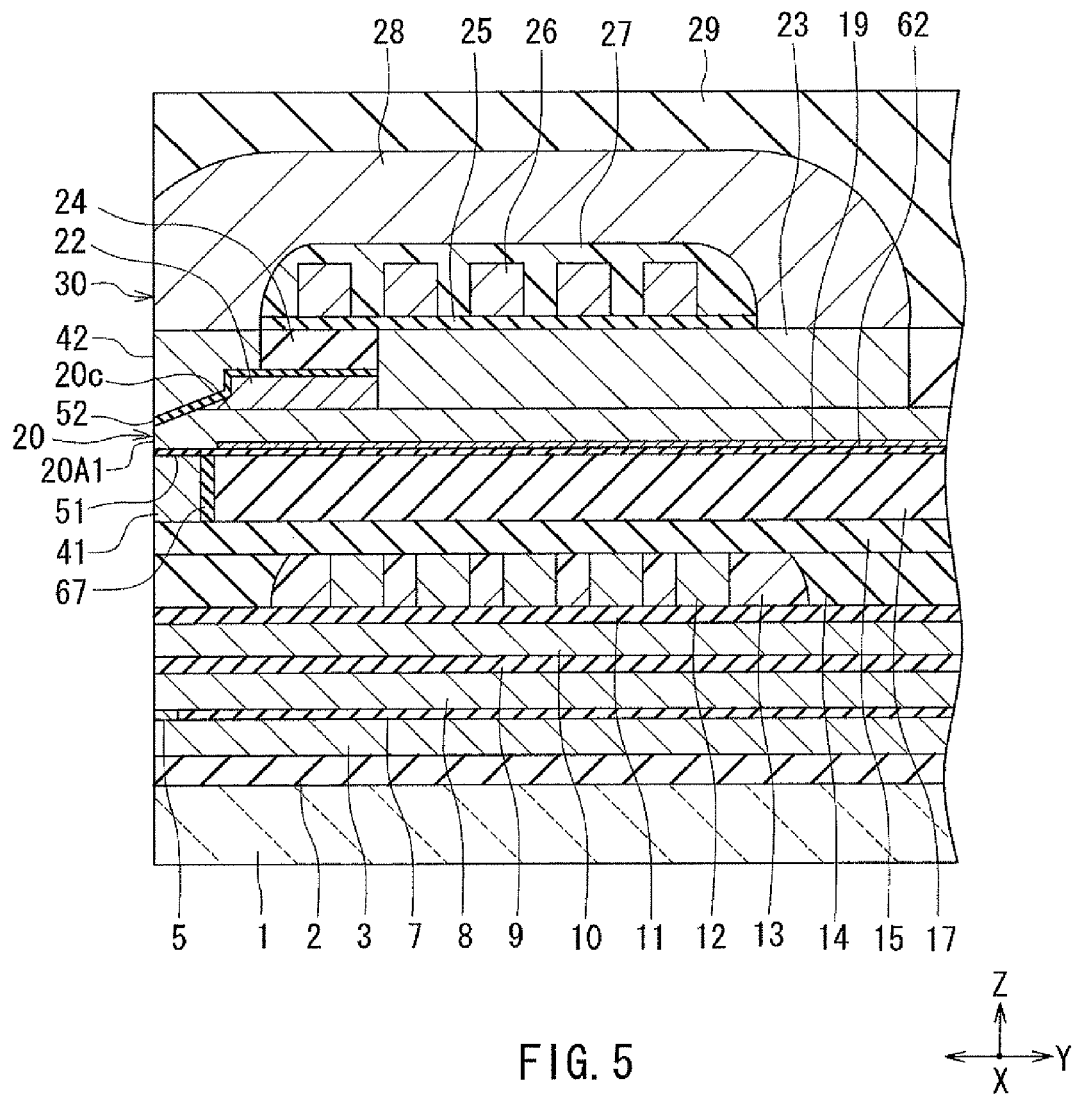
FIG. 5 is a cross-sectional view showing the configuration of the magnetic head according to the embodiment of the invention.
Figure 6:
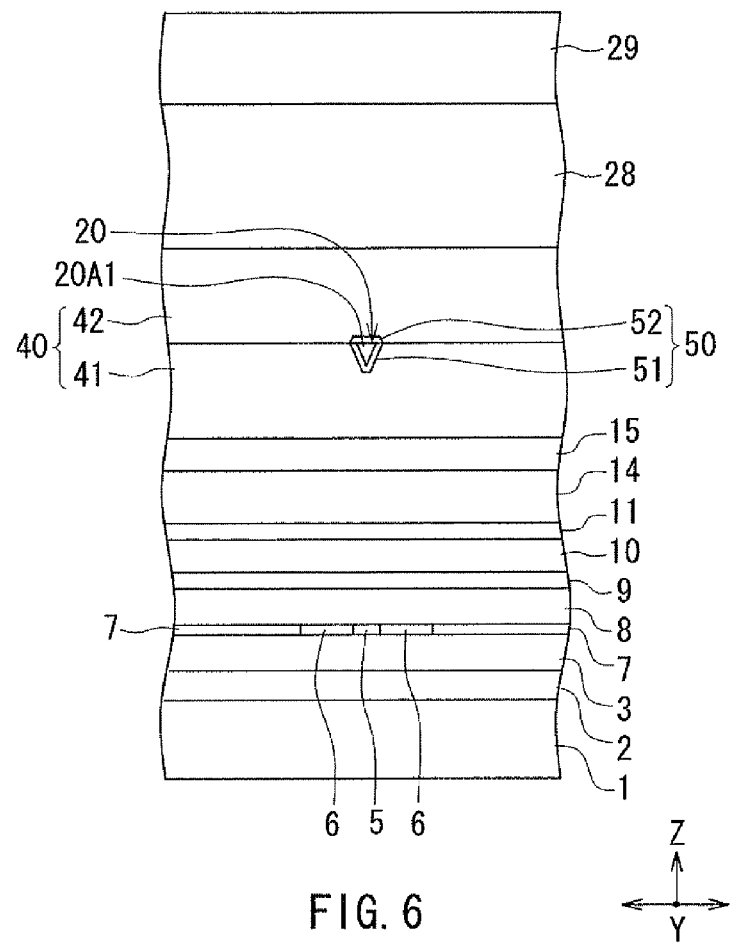
FIG. 6 is a front view showing the medium facing surface of the magnetic head according to the embodiment of the invention.
Figure 7:
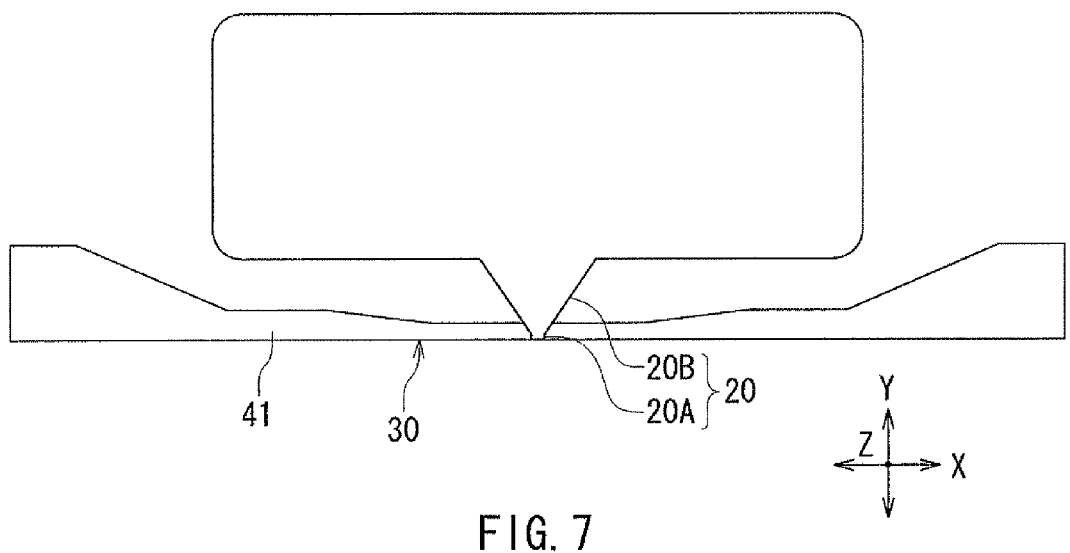
FIG. 7 is a plan view showing the magnetic pole and a first shield of the magnetic head according to the embodiment of the invention.

Reference is now made to FIG. 1 to FIG. 7 to describe the configuration of the magnetic head according to the present embodiment. FIG. 1 is a front view showing a part of the medium facing surface of the magnetic head. FIG. 2 is a cross-sectional view showing a cross section of the main part of the magnetic head parallel to the medium facing surface. FIG. 3 is a cross-sectional view showing a cross section of the main part of the magnetic head perpendicular to the medium facing surface. FIG. 4 is a plan view showing a part of the magnetic pole and its vicinity in the magnetic head. FIG. 5 is a cross-sectional view showing the configuration of the magnetic head. FIG. 6 is a front view showing the medium facing surface of the magnetic head. FIG. 7 is a plan view showing the magnetic pole and a first shield of the magnetic head. Note that FIG. 3 and FIG. 5 each show a cross section perpendicular to the medium facing surface and the top surface of the substrate. FIG. 2 shows a cross section taken along line 2-2 of FIG. 3 and FIG. 4. The X, Y and Z directions shown in FIG. 8 are also shown in FIG. 1 to FIG. 7. In FIG. 1, FIG. 2 and FIG. 6, the Y direction is orthogonal to the X and Z directions. In FIG. 3 and FIG. 5, the X direction is orthogonal to the Y and Z directions. In FIG. 4 and FIG. 7, the Z direction is orthogonal to the X and Y directions. The track width direction in the magnetic head is the same as the X direction.

As shown in FIG. 5, the magnetic head according to the present embodiment has the medium facing surface 30 that faces the recording medium. As shown in FIG. 5 and FIG. 6, the magnetic head includes a substrate 1 made of a ceramic material such as aluminum oxide-titanium carbide ($Al_2O_3$—TiC), an insulating layer 2 disposed on the substrate 1, and a bottom reproduction shield layer 3 made of a magnetic material and disposed on the insulating layer 2.

The magnetic head further includes a magnetoresistive (MR) element 5 as a reproducing element disposed on the bottom reproduction shield layer 3, and two bias magnetic field applying layers 6 that are located on opposite sides of the MR element 5 in the track width direction and apply a bias magnetic field to the MR element 5. Note that not-shown insulating films are respectively provided between each bias magnetic field applying layer 6 and the bottom reproduction shield layer 3, and between each bias magnetic field applying layer 6 and the MR element 5. The magnetic head further includes an insulating layer 7 disposed around the MR element 5 and the bias magnetic field applying layers 6 on the bottom reproduction shield layer 3, and a first top reproduction shield layer 8 made of a magnetic material and disposed over the MR element 5, the bias magnetic field applying layers 6 and the insulating layer 7.

An end of the MR element 5 is located in the medium facing surface 30. The MR element 5 may be a giant magnetoresistive (GMR) element or a tunneling magnetoresistive (TMR) element, for example. The GMR element may be of either the current-in-plane (CIP) type in which a sense current for detecting magnetic signals is fed in a direction nearly parallel to the plane of layers constituting the GMR element or the current-perpendicular-to-plane (CPP) type in which the sense current is fed in a direction nearly perpendicular to the plane of layers constituting the GMR element.

If the MR element 5 is a TMR element or a CPP-type GMR element, the bottom reproduction shield layer 3 and the first top reproduction shield layer 8 may also function as electrodes for feeding the sense current to the MR element 5. FIG. 5 shows the case where the MR element 5 is a TMR element or a CPP-type GMR element. If the MR element 5 is a CIP-type GMR element, insulating films are respectively provided between the MR element 5 and the bottom reproduction shield layer 3 and between the MR element 5 and the first top reproduction shield layer 8, and two wiring layers for feeding the sense current to the MR element 5 are provided between these insulating films.

The magnetic head further includes a nonmagnetic layer 9 and a second top reproduction shield layer 10 that are arranged in this order on the first top reproduction shield layer 8. The nonmagnetic layer 9 is made of a nonmagnetic material such as alumina. The second top reproduction shield layer 10 is made of a magnetic material. The parts from the bottom reproduction shield layer 3 to the second top reproduction shield layer 10 constitute the reproducing head.

The magnetic head further includes: an insulating layer 11 made of an insulating material and disposed on the second top reproduction shield layer 10; a coil 12 disposed on the insulating layer 11; an insulating layer 13 made of an insulating material and disposed around the coil 12 and in the space between every adjacent turns of the coil 12; and an insulating layer 14 made of an insulating material and disposed around the insulating layer 13. The coil 12 is planar spiral-shaped. The coil 12 and the insulating layers 13 and 14 are flattened at the top. The insulating layers 11 and 14 are made of alumina, for example. The insulating layer 13 is made of photoresist, for example. The coil 12 is made of a conductive material such as copper. The magnetic head further includes an insulating layer 15 made of an insulating material and disposed over the top surfaces of the coil 12 and the insulating layers 13 and 14. The insulating layer 15 is made of alumina, for example.

As shown in FIG. 1 to FIG. 3, the magnetic head further includes a nonmagnetic metal layer 16 made of a nonmagnetic metal material, and a nonmagnetic layer 17 made of a nonmagnetic material. The nonmagnetic metal layer 16 is disposed on the insulating layer 15. The nonmagnetic layer 17 is disposed on an area of the nonmagnetic metal layer 16 other than the area near the medium facing surface 30. The nonmagnetic metal layer 16 is made of Ti, for example. The nonmagnetic layer 17 is made of, for example, an inorganic insulating material such as alumina. The nonmagnetic metal layer 16 is omitted in FIG. 5 and FIG. 6.

The magnetic head further includes a magnetic pole 20 made of a magnetic material, a recording shield 40 made of a magnetic material, and a recording gap layer 50 made of a nonmagnetic material and provided between the magnetic pole 20 and the recording shield 40. The magnetic pole 20 and the recording shield 40 may each be made of NiFe, CoFe, CoNiFe, CoNi, FeCo, or FeNi, for example. The nonmagnetic material used to form the recording gap layer 50 may be an insulating material or a nonmagnetic metal material. The material used for the recording gap layer 50 may be alumina, for example.

As shown in FIG. 4 and FIG. 7, the magnetic pole 20 includes a narrow portion 20A and a wide portion 20B. The narrow portion 20A has a front end face 20A1 located in the medium facing surface 30, and a rear end opposite to the front end face 20A1. The wide portion 20B is connected to the rear end of the narrow portion 20A and has a width greater than that of the narrow portion 20A. The magnetic pole 20 produces, from the front end face 20A1 of the narrow portion 20A, a recording magnetic field for recording data on the recording medium by means of the perpendicular magnetic recording system. The width (dimension in the X direction) of the narrow portion 20A is almost uniform, regardless of the distance from the medium facing surface 30. At the boundary between the narrow portion 20A and the wide portion 20B, the wide portion 20B shows a sudden increase in width relative to the width of the narrow portion 20A. The width of the wide portion 20B gradually increases with increasing distance from the medium facing surface 30, and then becomes uniform.

As shown in FIG. 1 and FIG. 2, the magnetic pole 20 has a bottom surface 20b, a top surface 20c, and a first side surface 20d and a second side surface 20e that are located at opposite ends in the track width direction. The distance between the first side surface 20d and the second side surface 20e in the track width direction decreases toward the top surface of the substrate 1. In the example shown in FIG. 1, the bottom end of the first side surface 20*d* and the bottom end of the second side surface 20*e* intersect to form an edge in the narrow portion 20A. The bottom surface 20*b* is thus formed only in the wide portion 20B. The narrow portion 20A, however, may also have the bottom surface 20*b*.

As shown in FIG. 3, the top surface 20*c* of the magnetic pole 20 has a first part 20*c*1 and a second part 20*c*2. The first part 20*c*1 has a first edge E1 located in the medium facing surface 30, and a second edge E2 opposite thereto. The second part 20*c*2 is located farther from the medium facing surface 30 than is the first part 20*c*1 and connected to the first part 20*c*1 at the second edge E2.

The distance between the top surface of the substrate 1 and an arbitrary point on the first part 20*c*1 increases with increasing distance between the arbitrary point and the medium facing surface 30. The angle of inclination of the first part 20*c*1 with respect to the direction perpendicular to the medium facing surface 30 (the Y direction) is within the range of 15 to 35 degrees, for example.

The recording shield 40 has an end face that is located in the medium facing surface 30 to wrap around the front end face 20A1 of the narrow portion 20A of the magnetic pole 20. The recording shield 40 includes a first shield 41 and a second shield 42 each of which has an end face located in the medium facing surface 30. The recording gap layer 50 includes a first gap layer 51 and a second gap layer 52 each of which has an end face located in the medium facing surface 30.

The first gap layer 51 has a first part 51A and a second part 51B. The first part 51A is disposed on the top surface of an area of the nonmagnetic metal layer 16 on which the nonmagnetic layer 17 is not provided, and along the sidewall of the nonmagnetic layer 17 that faces the area. The first shield 41 is disposed above the nonmagnetic metal layer 16 with the first part 51A therebetween. The first shield 41 and the nonmagnetic layer 17 have respective grooves that are continuous with each other. A part of the magnetic pole 20 including the narrow portion 20A is accommodated in the groove of the first shield 41. The other part of the magnetic pole 20 is accommodated in the groove of the nonmagnetic layer 17. The second part 51B of the first gap layer 51 is provided in the groove of the first shield 41, being interposed between the first shield 41 and the magnetic pole 20. As shown in FIG. 3, the first part 51A and the second part 51B are continuous with each other. In FIG. 5 and FIG. 6, the first part 51A is omitted and the second part 51B is designated by the reference numeral 51.

The magnetic head further includes a nonmagnetic layer 62 made of a nonmagnetic material, and an electrode film 19. The nonmagnetic layer 62 is provided in the groove of the nonmagnetic layer 17, being interposed between the nonmagnetic layer 17 and the magnetic pole 20. The electrode film 19 is provided in the groove of the nonmagnetic layer 17, being interposed between the nonmagnetic layer 62 and the magnetic pole 20. The nonmagnetic layer 62 is made of alumina, for example.

The electrode film 19 is intended to be used as an electrode and seed layer when a plating film to become the magnetic pole 20 is formed by plating. The electrode film 19 may include one or more nonmagnetic metal layers made of a nonmagnetic metal material. The one or more nonmagnetic metal layers may include a first layer for improving the adhesion of the electrode layer 19 to a layer underlying the same, and a second layer provided on the first layer for the purpose of improving the soft magnetic properties of the magnetic pole 20. The first layer contains one or more elements selected from the group consisting of Ti, Cr, and Ta, for example. The second layer contains one or more elements selected from the group consisting of Ru, Rh, Ir, Cr, Cu, Au, Ag, Pt, and Pd, for example. U.S. Pat. No. 7,294,418 B2 discloses that forming a magnetic layer composed of Fe and Co on a nonmagnetic layer containing one or more elements selected from the group consisting of Ru, Rh, Ir, Cr, Cu, Au, Ag, Pt, and Pd improves the soft magnetic properties of the magnetic layer. The electrode film 19 may further include a layer of magnetic metal that is formed on the foregoing one or more nonmagnetic metal layers.

The magnetic head further includes a nonmagnetic layer 67 made of a nonmagnetic material and interposed between the first part 51A of the first gap layer 51 and the first shield 41. The nonmagnetic layer 67 is made of alumina, for example.

The magnetic head further includes a nonmagnetic layer 22 made of a nonmagnetic material and disposed on the second part 20*c*2 of the top surface 20*c* of the magnetic pole 20. The nonmagnetic layer 22 may be composed of a single layer or a plurality of layers. The nonmagnetic material used to form the nonmagnetic layer 22 may be an insulating material or a nonmagnetic metal material. The nonmagnetic layer 22 has a bottom surface 22*a* that is in contact with the second part 20*c*2, and a top surface 22*b* opposite to the bottom surface 22*a*. The position of the end of the bottom surface 22*a* closer to the medium facing surface 30 coincides with the position of the second edge E2. The nonmagnetic layer 22 further has an oblique surface 22*c* and a connecting surface 22*d*. The oblique surface 22*c* has an end that coincides with the end of the bottom surface 22*a* closer to the medium facing surface 30. The connecting surface 22*d* connects the end of the oblique surface 22*c* farther from the medium facing surface 30 and the end of the top surface 22*b* closer to the medium facing surface 30. The distance between the top surface of the substrate 1 and an arbitrary point on the oblique surface 22*c* increases with increasing distance between the arbitrary point and the medium facing surface 30. The angle of inclination of the oblique surface 22*c* with respect to the direction perpendicular to the medium facing surface 30 (the Y direction) is equal to or approximately equal to the angle of inclination of the first part 20*c*1 with respect to the direction perpendicular to the medium facing surface 30. The connecting surface 22*d* is parallel to the medium facing surface 30, for example.

The second gap layer 52 is disposed to cover the first part 20*c*1 of the top surface 20*c* of the magnetic pole 20 and the oblique surface 22*c*, the connecting surface 22*d* and the top surface 22*b* of the nonmagnetic layer 22. As shown in FIG. 5, a part of the top surface 20*c* of the magnetic pole 20 away from the medium facing surface 30 is not covered with the nonmagnetic layer 22 and the second gap layer 52. The second shield 42 is disposed over the second gap layer 52, the first shield 41 and the nonmagnetic layers 17 and 67.

The second shield 42 has a bottom surface in contact with the second gap layer 52. The bottom surface of the second shield 42 bends to be opposed to the magnetic pole 20 and the nonmagnetic layer 22, with the second gap layer 52 interposed between the second shield 42 and each of the magnetic pole 20 and the nonmagnetic layer 22. The distance between the bottom surface of the second shield 42 and the second part 20*c*2 is greater than the distance between the bottom surface of the second shield 42 and the first part 20*c*1.

FIG. 4 shows an example where the distance from the medium facing surface 30 to the boundary between the narrow portion 20A and the wide portion 20B is smaller than the distance from the medium facing surface 30 to the second edge E2. However, the distance from the medium facing surface 30 to the boundary between the narrow portion 20A and the wide portion 20B may be equal to or greater than the distance from the medium facing surface 30 to the second edge E2.

The magnetic head further includes a yoke layer 23 disposed on the part of the top surface 20c of the magnetic pole 20 away from the medium facing surface 30. The yoke layer 23 is made of a magnetic material. The material of the yoke layer 23 may be NiFe, CoFe, CoNiFe, CoNi, FeCo, or FeNi, for example.

The magnetic head further includes a nonmagnetic layer 24 made of a nonmagnetic material and disposed around the second shield 42 and the yoke layer 23. The second shield 42, the yoke layer 23, and the nonmagnetic layer 24 are flattened at the top. The nonmagnetic material used to form the nonmagnetic layer 24 may be an insulating material or a nonmagnetic metal material.

The magnetic head further includes: an insulating layer 25 disposed over areas of the top surfaces of the yoke layer 23 and the nonmagnetic layer 24 above which a coil 26 mentioned below is to be disposed; the coil 26 disposed on the insulating layer 25; and an insulating layer 27 covering the coil 26. The insulating layer 25 is made of alumina, for example. The coil 26 is planar spiral-shaped. The coil 26 is made of a conductive material such as copper. The insulating layer 27 is made of photoresist, for example.

The magnetic head further includes a return yoke layer 28 disposed over the second shield 42, the insulating layer 27 and the yoke layer 23. The return yoke layer 28 magnetically couples the second shield 42 and the yoke layer 23 to each other. A part of the coil 26 passes between the yoke layer 23 and the return yoke layer 28. The return yoke layer 28 is made of a magnetic material. The material of the return yoke layer 28 may be NiFe, CoFe, CoNiFe, CoNi, FeCo, or FeNi, for example.

The magnetic head further includes a protection layer 29 that is made of an insulating material such as alumina and disposed to cover the return yoke layer 28. The parts from the coil 12 to the return yoke layer 28 constitute the recording head.

As has been described, the magnetic head according to the present embodiment includes the medium facing surface 30 that faces the recording medium, the reproducing head, and the recording head. The reproducing head and the recording head are stacked on the substrate 1. The reproducing head is disposed backward along the direction of travel of the recording medium (the Z direction) (in other words, disposed closer to the air inflow end of the slider), while the recording head is disposed forward along the direction of travel of the recording medium (in other words, disposed closer to the air outflow end of the slider).

The reproducing head includes: the MR element 5 as the reproducing element; the bottom reproduction shield layer 3 and the first top reproduction shield layer 8 for shielding the MR element 5, the shield layers 3 and 8 having respective portions that are located near the medium facing surface 30 and are opposed to each other with the MR element 5 therebetween; and the two bias magnetic field applying layers 6 disposed on opposite sides of the MR element 5 in the track width direction.

The recording head includes the coil 12, the magnetic pole 20, the recording shield 40, the recording gap layer 50, the nonmagnetic layer 22, the yoke layer 23, the coil 26, and the return yoke layer 28. When a recording electric current is supplied to the coils 12 and 26, the coils 12 and 26 produce magnetic fields in opposite directions at their respective centers. The coil 26 produces a magnetic field corresponding to data to be recorded on the recording medium. The coil 12 produces a magnetic field that prevents the magnetic field produced by the coil 26 from affecting the reproducing head. Note that the coil 12 is not an essential component of the recording head and can be dispensed with.

The magnetic pole 20 allows a magnetic flux corresponding to the magnetic field produced by the coil 26 to pass, and produces a recording magnetic field from the front end face 20A1 of the narrow portion 20A, the recording magnetic field being intended for recording data on the recording medium by means of the perpendicular magnetic recording system.

As shown in FIG. 6, the recording shield 40 has an end face that is located in the medium facing surface 30 to wrap around the front end face 20A1 of the narrow portion 20A of the magnetic pole 20. The recording shield 40 includes the first shield 41 and the second shield 42. The recording gap layer 50 is provided between the magnetic pole 20 and the recording shield 40. The recording gap layer 50 includes the first gap layer 51 and the second gap layer 52.

In the medium facing surface 30, the end face of the second shield 42 is located forward of the front end face 20A1 of the narrow portion 20A of the magnetic pole 20 along the direction of travel of the recording medium (the Z direction) with a predetermined distance provided therebetween by the thickness of the second gap layer 52. The thickness of the second gap layer 52 is preferably equal to or smaller than 200 nm, or more preferably within the range of 25 to 50 nm, so that the second shield 42 can fully exhibit its function as a shield.

The position of the end of a bit pattern to be recorded on the recording medium depends on the position of an edge of the front end face 20A1 of the narrow portion 20A located in the medium facing surface 30, the edge being closer to the second gap layer 52. The recording shield 40 takes in a magnetic flux that is generated from the front end face 20A1 of the narrow portion 20A located in the medium facing surface 30 and that expands in directions other than the direction perpendicular to the plane of the recording medium, so that the magnetic flux is prevented from reaching the recording medium. In the present embodiment, in particular, the end face of the recording shield 40 is disposed in the medium facing surface 30 to wrap around the front end face 20A1 of the narrow portion 20A of the magnetic pole 20. This serves to increase the gradient of the recording magnetic field and to suppress adjacent track erase. The improvement of recording density is made possible by these functions. The adjacent track erase refers to the phenomenon that signals already recorded on one or more tracks that are adjacent to a track targeted for recording are erased or attenuated when recording a signal on the track targeted for recording.

The recording shield 40 also takes in a disturbance magnetic field that is applied to the magnetic head from the outside thereof. This makes it possible to prevent erroneous recording on the recording medium caused by the disturbance magnetic field intensively taken into the magnetic pole 20. The recording shield 40, the return yoke layer 28 and the yoke layer 23 also have the function of returning a magnetic flux that has been generated from the end face of the magnetic pole 20 and has magnetized the recording medium.

A method of manufacturing the magnetic head according to the present embodiment will now be described. The method of manufacturing the magnetic head according to the embodiment includes the steps of: fabricating a substructure by forming components of the magnetic head on a substrate, the substructure including a pre-head portion that is to become the magnetic head later and a to-be-removed portion that is to be removed later, the to-be-removed portion adjoining the pre-head portion across the position where the medium facing surface 30 is to be formed; and fabricating the magnetic head from the substructure so that the to-be-removed portion is removed from the substructure to form the medium facing surface 30. The substructure may include pre-head portions that are arranged in a plurality of rows. Hereinafter, the method of manufacturing the magnetic head will be described further in conjunction with an example where the substructure includes a plurality of pre-head portions arranged in a plurality of rows.

Figure 27:
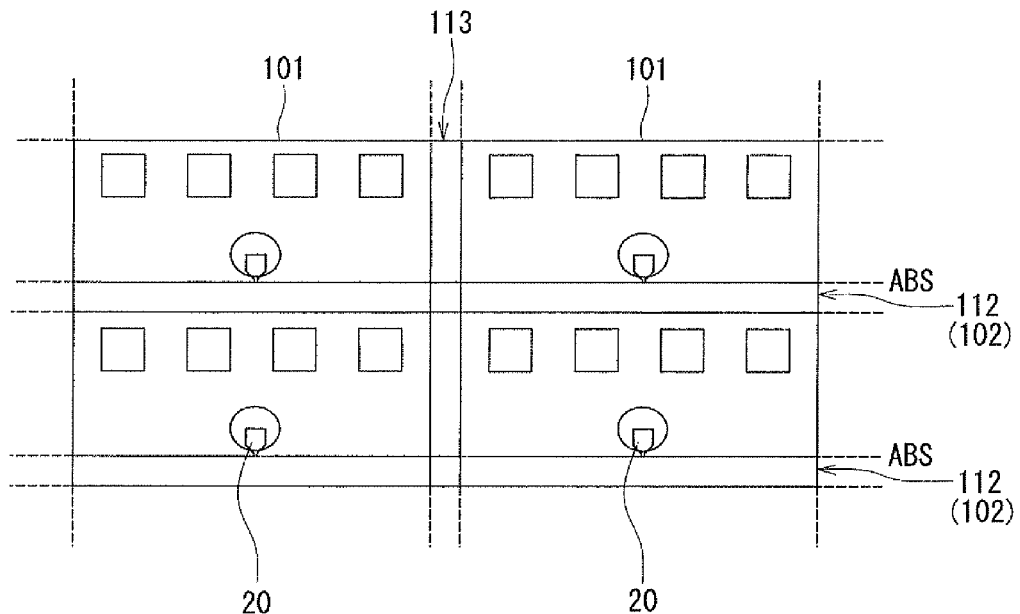
FIG. 27 is a plan view showing a part of a substructure fabricated in the method of manufacturing the magnetic head according to the embodiment of the invention.

FIG. 27 is a plan view showing a part of the exemplary substructure. The substructure shown in FIG. 27 includes a plurality of pre-head portions 101 arranged in a plurality of rows. In FIG. 27, the symbol ABS indicates the positions where the medium facing surfaces 30 are to be formed. Here, an array of pre-head portions 101 in the direction parallel to the medium facing surfaces 30, i.e., in the horizontal direction of FIG. 27, will be referred to as a row.

The substructure further includes inter-row to-be-removed portions 112 located between every two adjoining rows, and intra-row to-be-removed portions 113 located between every two adjoining pre-head portions 101 in each row. The inter-row to-be-removed portions 112 and the intra-row to-be-removed portions 113 are both intended to be removed later so as not to remain in the magnetic heads.

In the step of fabricating the magnetic head from the substructure shown in FIG. 27, the substructure is cut in the positions of the inter-row to-be-removed portions 112 and the intra-row to-be-removed portions 113, whereby the plurality of pre-head portions 101 are separated from each other and the medium facing surfaces 30 are formed in the respective positions ABS where to form the medium facing surfaces 30. More specifically, the medium facing surfaces 30 are formed by polishing the cut surfaces of the substructure in the positions of the respective inter-row to-be-removed portions 112. A plurality of magnetic heads are thereby fabricated from the substructure.

Next, the method of fabricating the substructure will be described in detail with attention focused on a single pre-head portion 101 and a part of an inter-row to-be-removed portion 112 that adjoins the single pre-head portion 101 across the position ABS where the medium facing surface 30 is to be formed. The aforementioned part of the inter-row to-be-removed portion 112 corresponds to the "to-be-removed portion" according to the present invention. In the following description, this part will be referred to as a to-be-removed portion, and will be designated by the reference numeral 102. In the following description, with regard to a stack of layers that is under the process of fabricating the substructure, the portions to become the magnetic heads later will also be referred to as pre-head portions 101, and the portions to be removed later will also be referred to as to-be-removed portions 102.

FIG. 12A to FIG. 26D each show a stack of layers in the process of fabricating the substructure. The portions lying below the insulating layer 15 are omitted in FIG. 12A to FIG. 26D. Of FIG. 12A to FIG. 26D, FIG. nA (n is any integer between 12 and 26 inclusive) is a plan view of the stack. FIG. nB is a cross-sectional view showing a cross section of the stack perpendicular to the medium facing surface 30 and the top surface of the substrate 1. In FIG. nA, the position of the cross section of FIG. nB is shown by the line nB-nB. FIG. nC is a cross-sectional view showing a cross section of the stack taken at the position ABS where the medium facing surface 30 is to be formed. In FIG. nA and FIG. nB, the position of the cross section of FIG. nC, i.e., the position ABS where the medium facing surface 30 is to be formed, is shown by the line nC-nC. In FIG. nA, the area above the line nC-nC is the pre-head portion 101, and the area below the line nC-nC is the to-be-removed portion 102. In FIG. nB, the area to the right of the line nC-nC is the pre-head portion 101, and the area to the left of the nC-nC is the to-be-removed portion 102. FIG. nD is a cross-sectional view showing a cross section of the stack taken along the line nD-nD of FIG. nA and FIG. nB.

In the step of fabricating the substructure, first, the insulating layer 2 and the bottom reproduction shield layer 3 are formed in this order on the substrate 1, as shown in FIG. 5. Next, the MR element 5, the two bias magnetic field applying layers 6 and the insulating layer 7 are formed on the bottom reproduction shield layer 3. Next, the first top reproduction shield layer 8, the nonmagnetic layer 9, the second top reproduction shield layer 10 and the insulating layer 11 are formed in this order over the MR element 5, the bias magnetic field applying layers 6 and the insulating layer 7. Next, the coil 12 and the insulating layers 13 and 14 are formed on the insulating layer 11. The coil 12 and the insulating layers 13 and 14 are then flattened at the top by chemical mechanical polishing (hereinafter referred to as CMP), for example. Next, the insulating layer 15 is formed over the top surfaces of the coil 12 and the insulating layers 13 and 14.

Figure 12A:
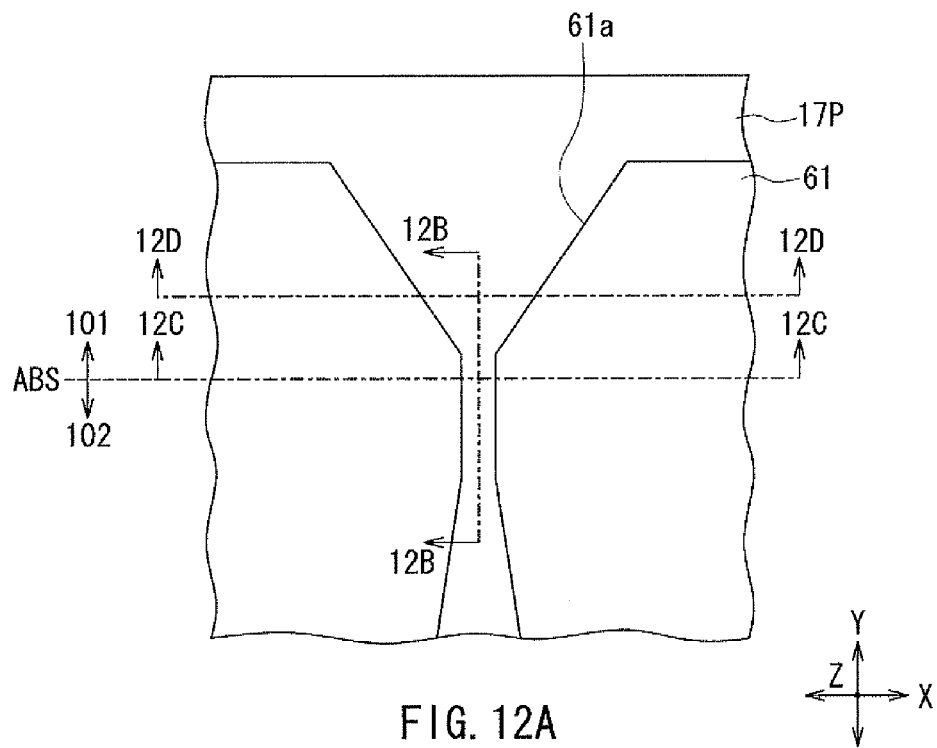
FIG. 12A to FIG. 12D are explanatory diagrams showing a step of a method of manufacturing the magnetic head according to the embodiment of the invention.
Figure 12B:
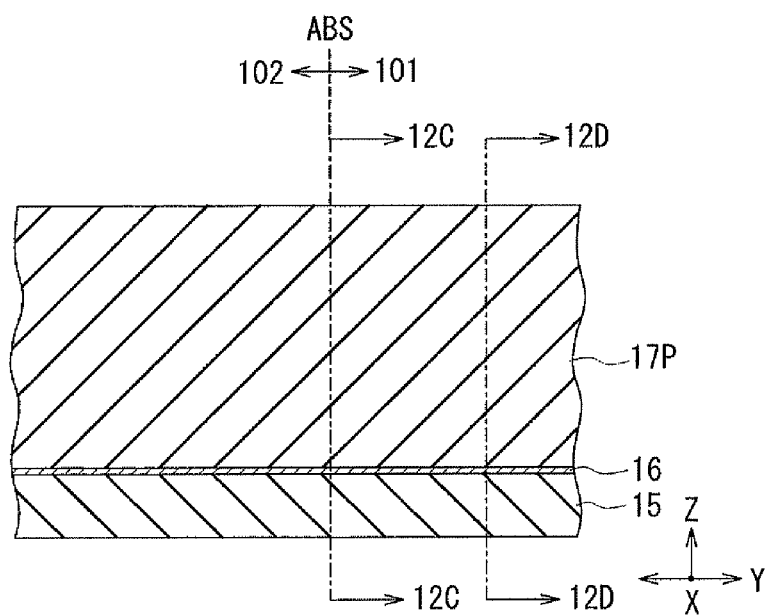
Figure 12C:
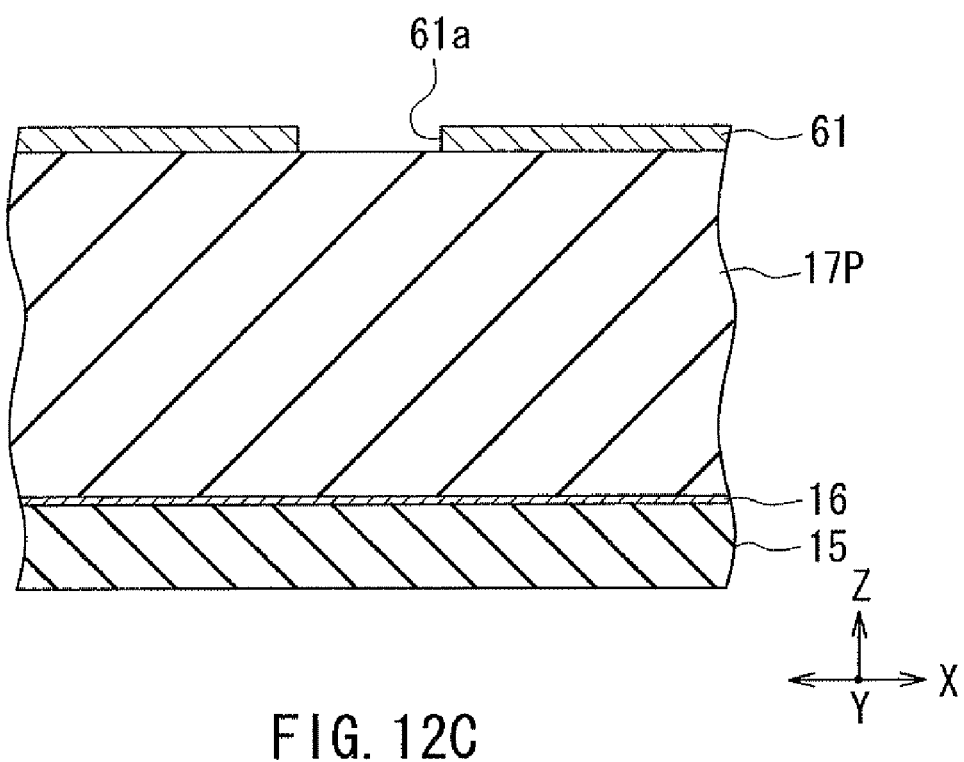
Figure 12D:
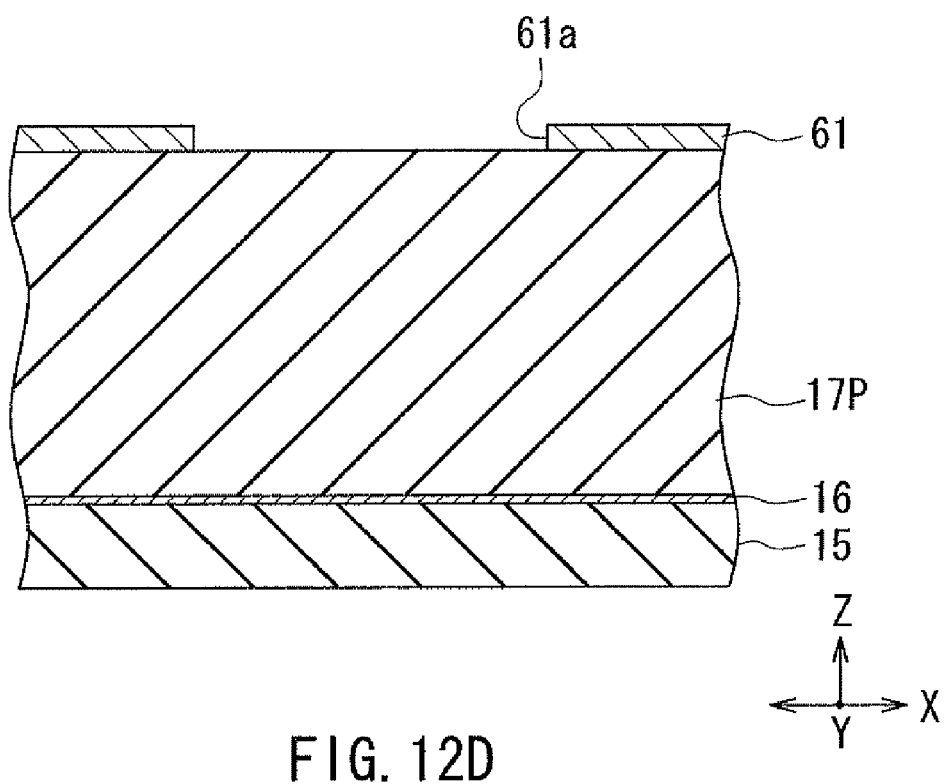

FIG. 12A to FIG. 12D show the next step. In this step, the nonmagnetic metal layer 16 is initially formed on the insulating layer 15. Next, an initial nonmagnetic layer 17P, which is to become the nonmagnetic layer 17 later, is formed on the nonmagnetic metal layer 16. Next, an etching mask layer 61 made of a metal material is formed on the initial nonmagnetic layer 17P. The etching mask layer 61 has a penetrating opening 61a. As shown in FIG. 12A and FIG. 12B, the insulating layer 15, the nonmagnetic metal layer 16, the initial nonmagnetic layer 17P, and the etching mask layer 61 are formed across the pre-head portion 101 and the to-be-removed portion 102. As shown in FIG. 12A, the opening 61a includes a portion that has a shape corresponding to the planar shape of the magnetic pole 20 to be formed later and is located in the pre-head portion 101, and a portion that is located in the to-be-removed portion 102 so as to be continuous with the foregoing portion.

Figure 13A:
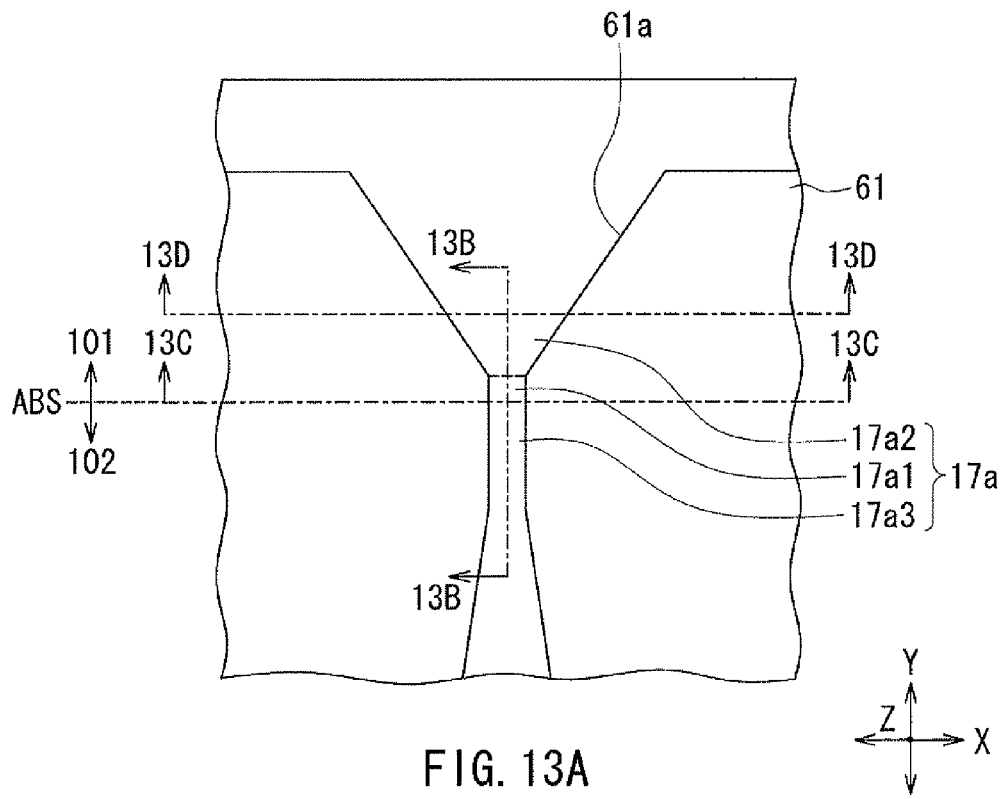
FIG. 13A to FIG. 13D are explanatory diagrams showing a step that follows the step shown in FIG. 12A to FIG. 12D.
Figure 13B:
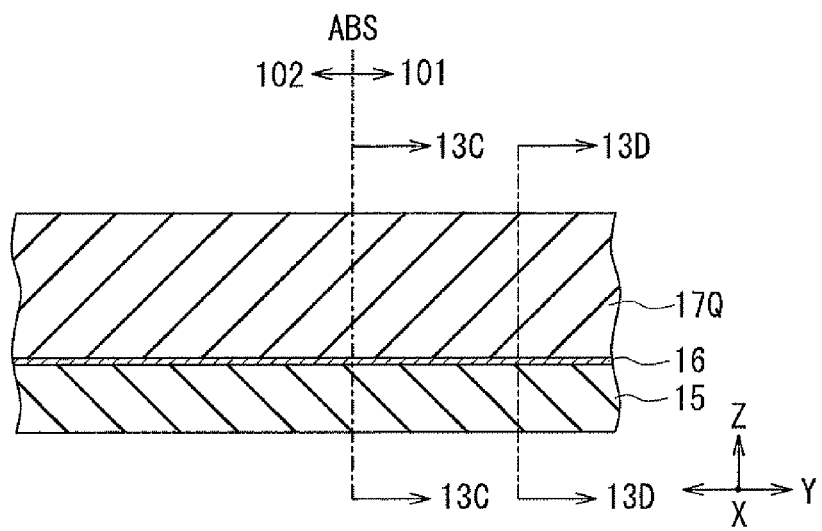
Figure 13C:
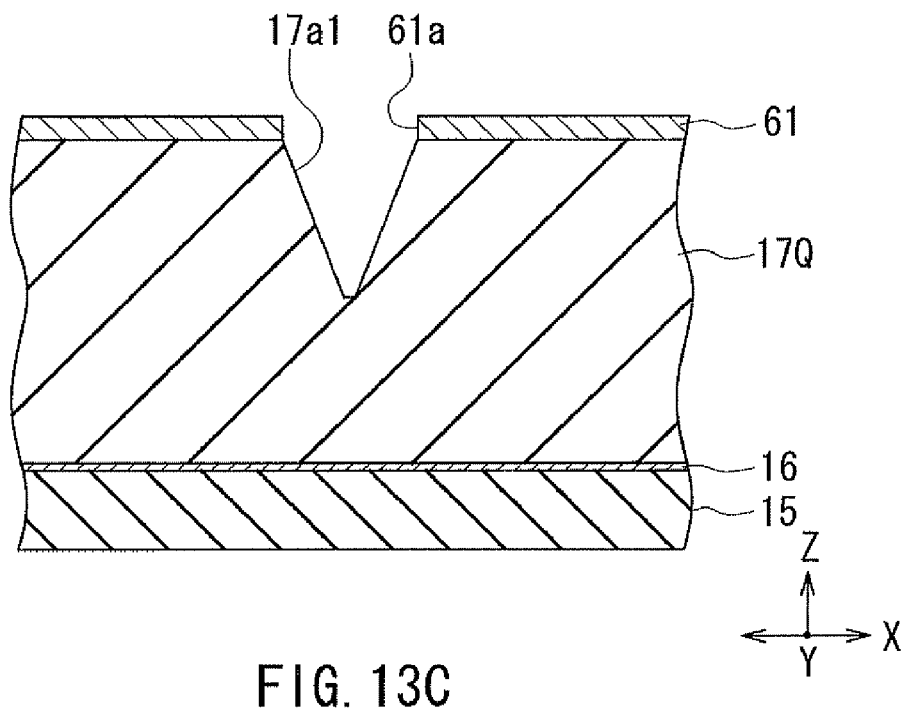
Figure 13D:
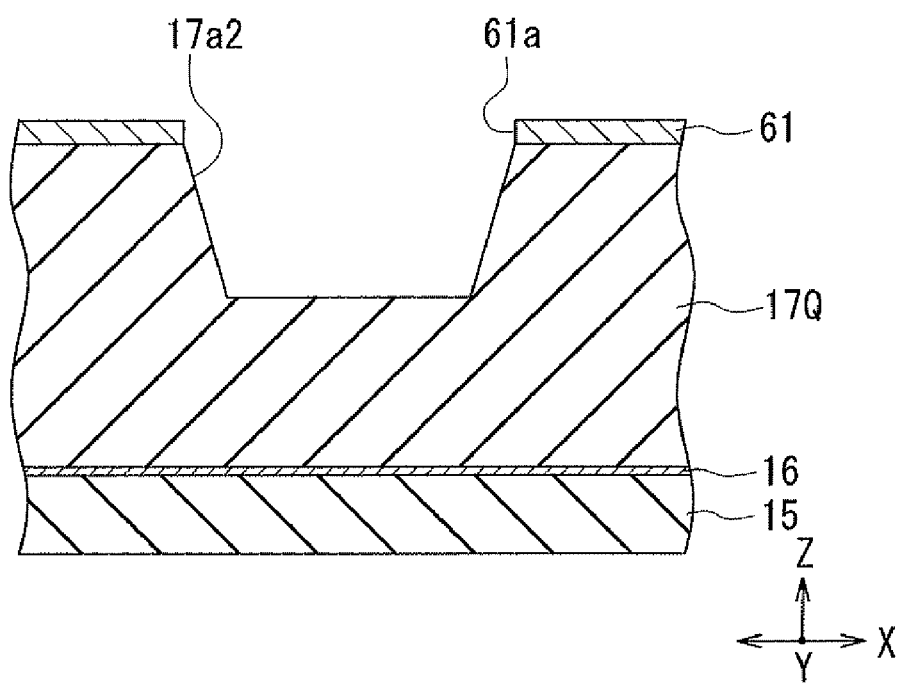
Figure 14A:
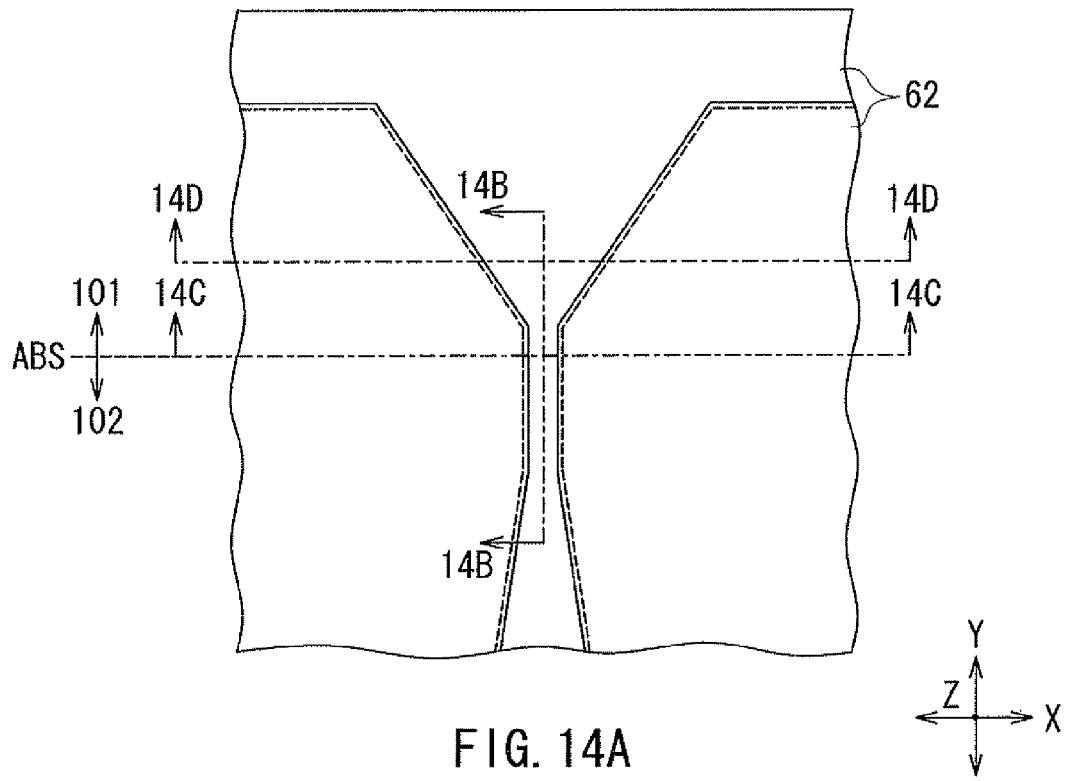
FIG. 14A to FIG. 14D are explanatory diagrams showing a step that follows the step shown in FIG. 13A to FIG. 13D.
Figure 14B:
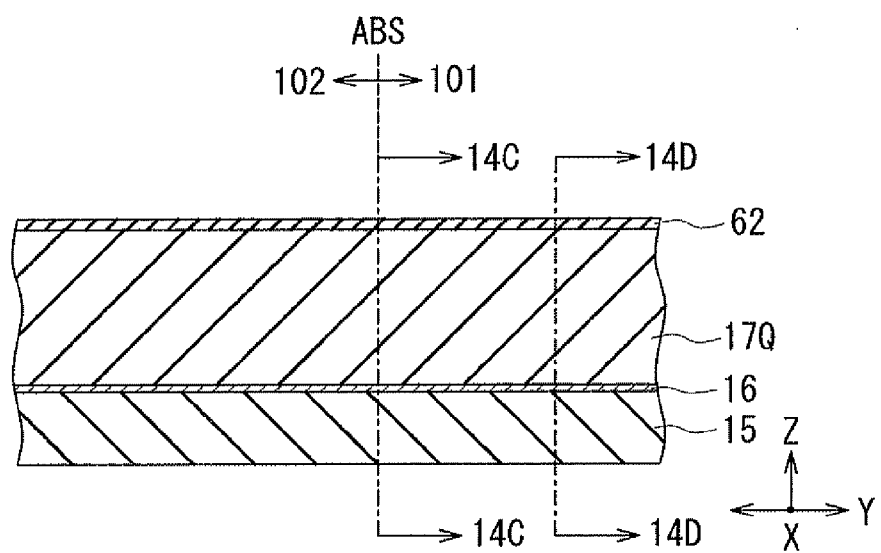
Figure 14C:
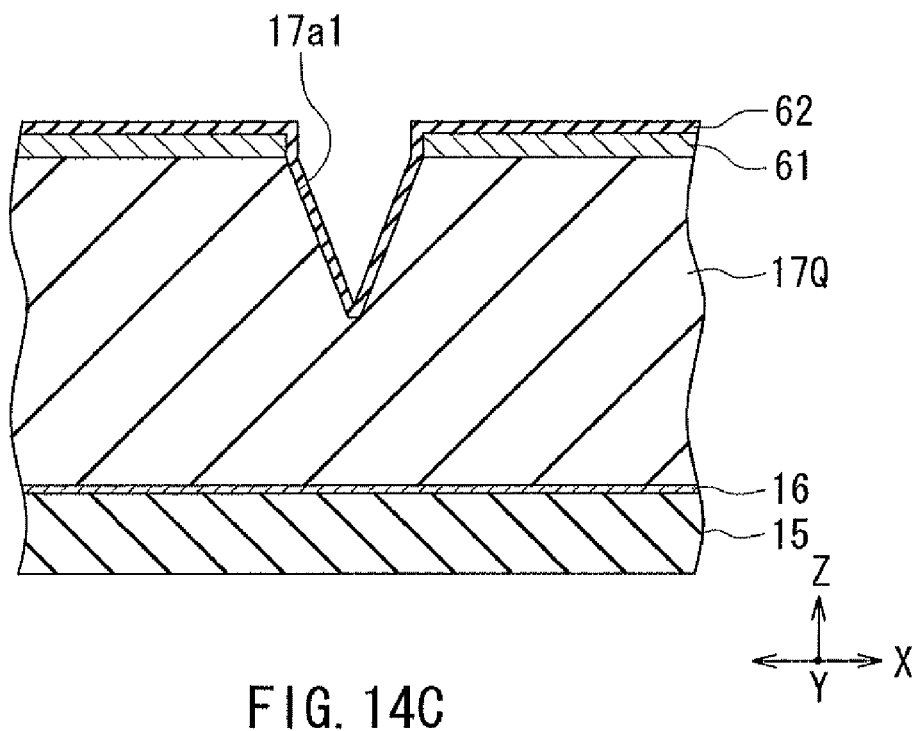
Figure 14D:
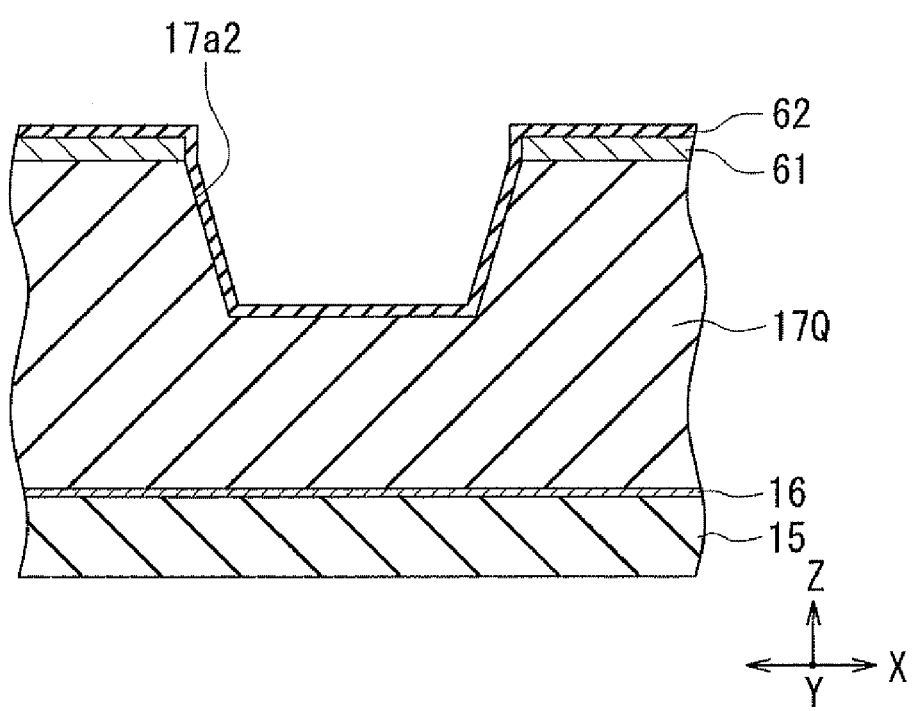

FIG. 13A to FIG. 13D show the next step. In this step, the portion of the initial nonmagnetic layer 17P exposed from the opening 61a of the etching mask layer 61 is selectively etched, whereby an accommodating groove 17a, in which a plating film is to be accommodated later, is formed in the initial nonmagnetic layer 17P. The etching of the initial nonmagnetic layer 17P is performed by reactive ion etching or ion milling, for example. This step makes the initial nonmagnetic layer 17P into a plating-film-accommodating layer 17Q having the accommodating groove 17a. The plating-film-accommodating layer 17Q is made of, for example, an inorganic insulating material such as alumina. As shown in FIG. 13A, the accommodating groove 17a includes a narrow groove portion 17a1 for accommodating the narrow portion 20A of the magnetic pole 20, a wide groove portion 17a2 for accommodating the wide portion 20B of the magnetic pole 20, and a to-be-removed groove portion 17a3 that is provided in the to-be-removed portion 102 so as to be continuous with the narrow groove portion 17a1 and is to be removed later.

FIG. 14A to FIG. 14D show the next step. In this step, the nonmagnetic layer 62 is formed to cover the entire top surface of the stack shown in FIG. 13A to FIG. 13D. The nonmagnetic layer 62 is preferably formed by a forming method that provides good step coverage. For example, atomic layer deposition (hereinafter referred to as ALD) may be employed as such a forming method.

Figure 15A:
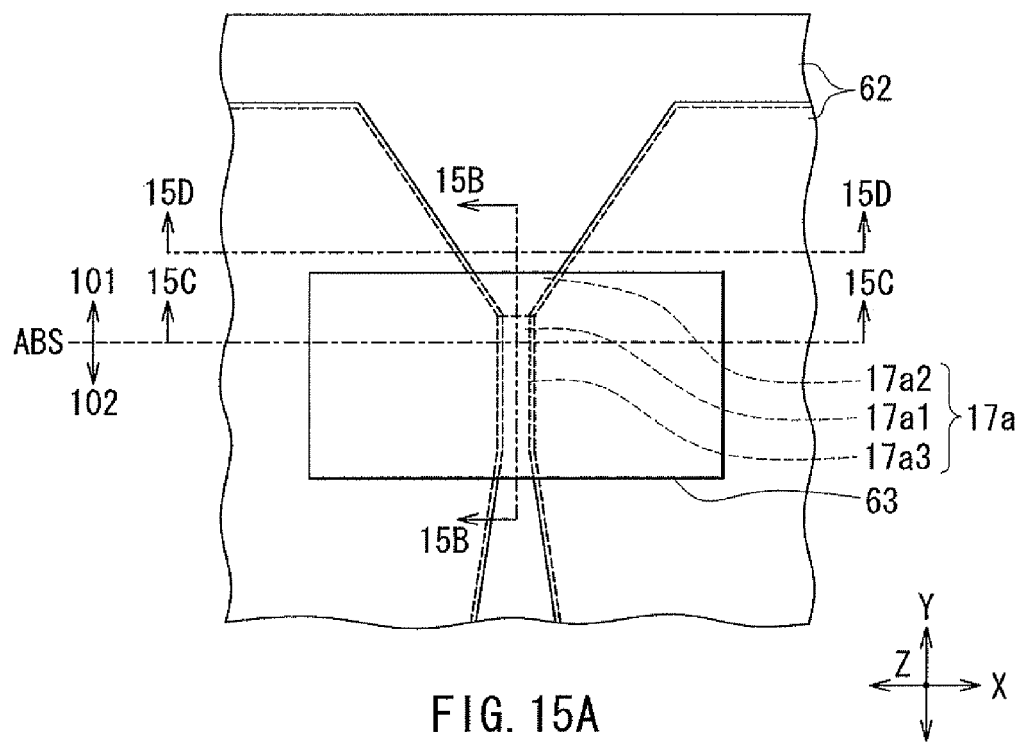
FIG. 15A to FIG. 15D are explanatory diagrams showing a step that follows the step shown in FIG. 14A to FIG. 14D.
Figure 15B:
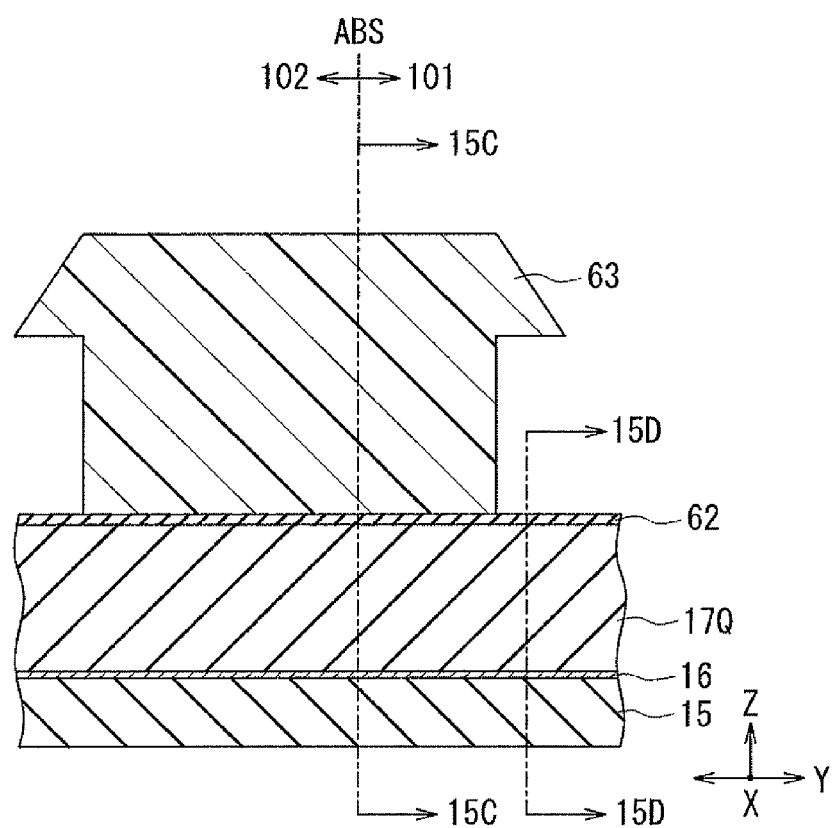
Figure 15C:
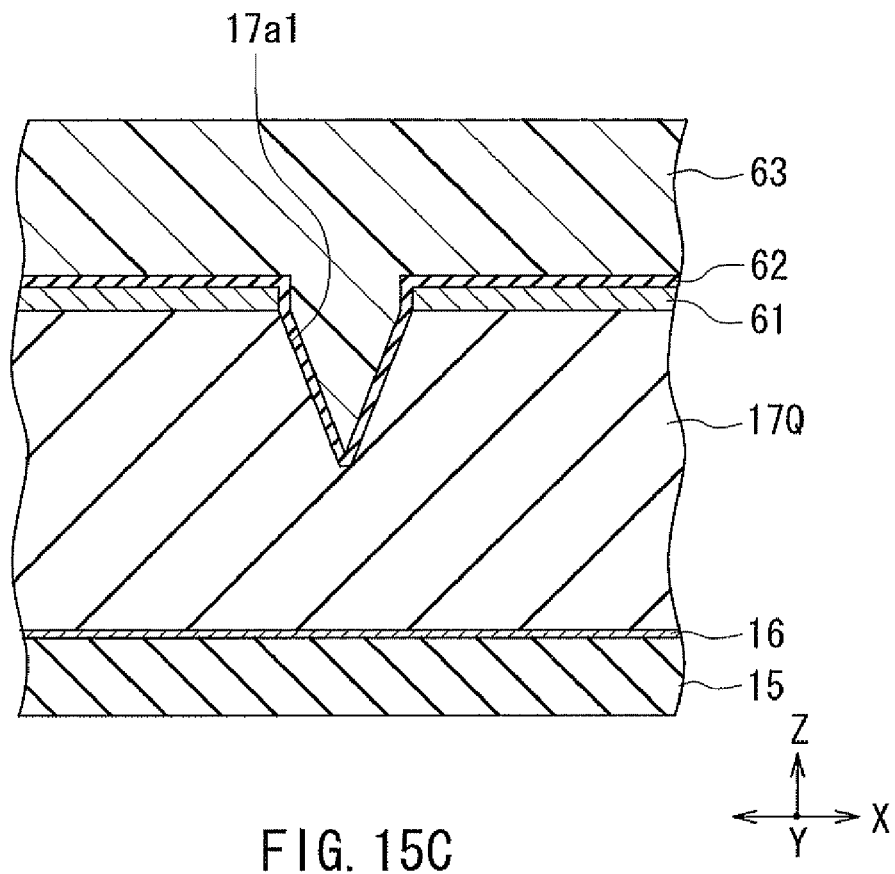
Figure 15D:
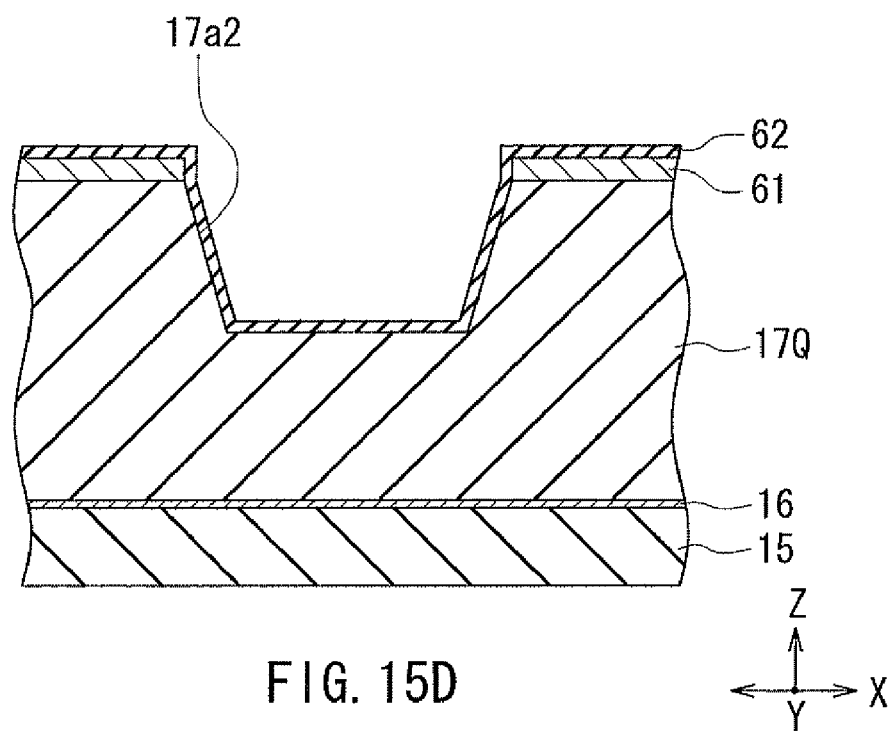
Figure 16A:
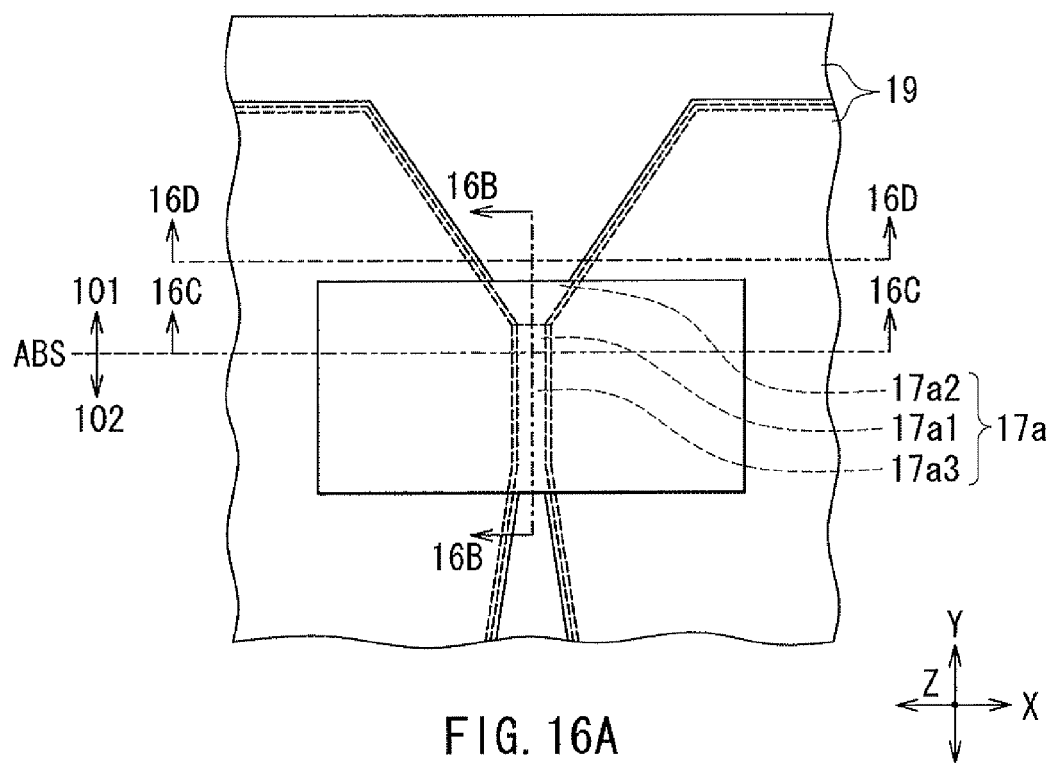
FIG. 16A to FIG. 16D are explanatory diagrams showing a step that follows the step shown in FIG. 15A to FIG. 15D.
Figure 16B:
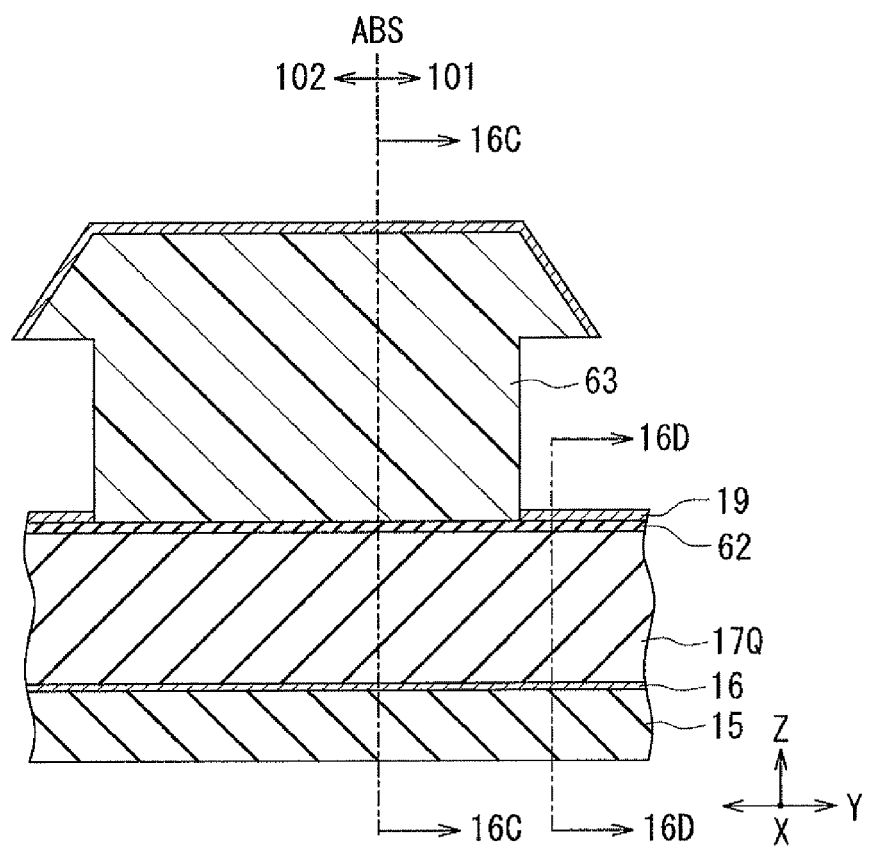
Figure 16C:
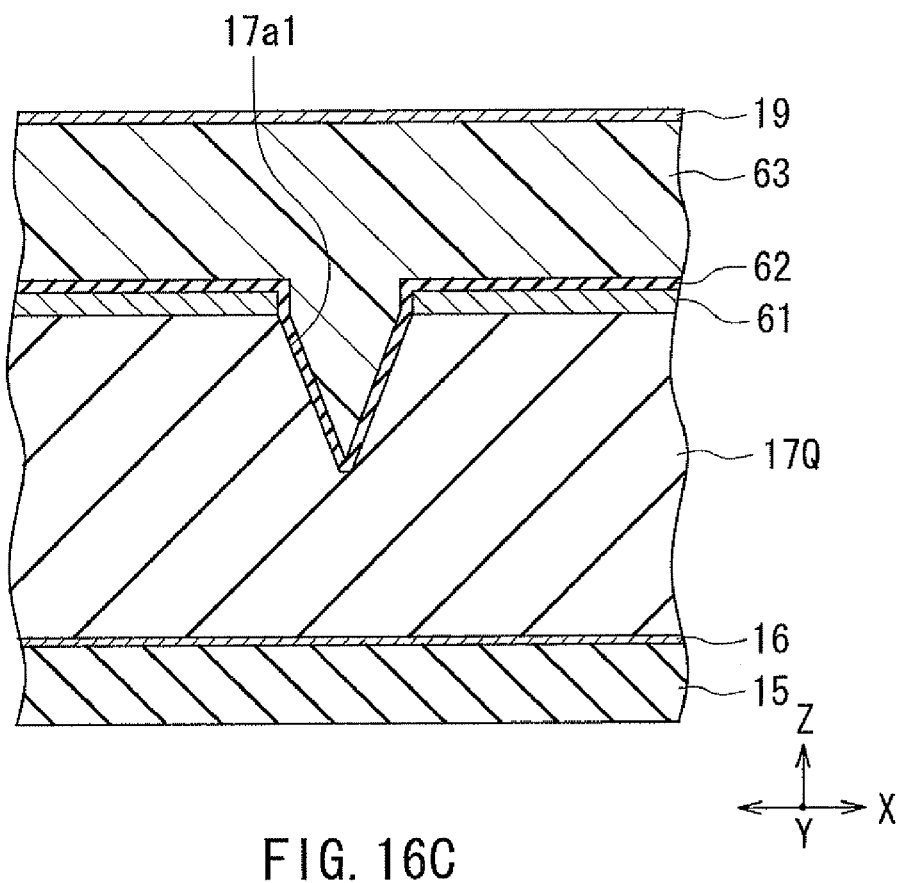
Figure 16D:
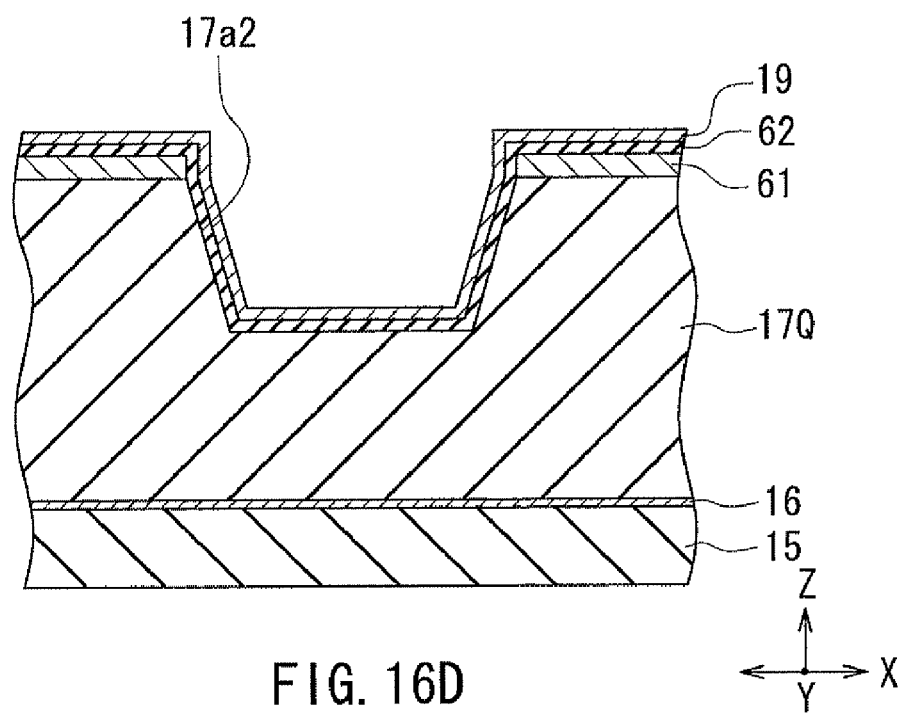

FIG. 15A to FIG. 15D show the next step. In this step, a mask 63 is formed on the stack shown in FIG. 14A to FIG. 14D. As shown in FIG. 15A, the mask 63 is disposed across the pre-head portion 101 and the to-be-removed portion 102. The mask 63 covers at least the entire narrow groove portion 17a1 of the accommodating groove 17a and a part of the to-be-removed groove portion 17a3 that is continuous with the narrow groove portion 17a1. In the example shown in FIG. 15A, the mask 63 also covers a part of the wide groove portion 17a2 that is continuous with the narrow groove portion 17a1. The mask 63 is formed by patterning a photoresist layer by photolithography, for example.

FIG. 16A to FIG. 16D show the next step. In this step, the electrode film 19 is formed to cover the entire top surface of the stack shown in FIG. 15A to FIG. 15D.

FIG. 17A to FIG. 17D show the next step. In this step, the mask 63 is lifted off. Consequently, the electrode film 19 is not provided in the area of the accommodating groove 17a that has been covered by the mask 63. More specifically, the electrode film 19 is not provided at least in the entire narrow groove portion 17a1 of the accommodating groove 17a and the part of the to-be-removed groove portion 17a3 that is continuous with the narrow groove portion 17a1. In the example shown in FIG. 17A, the electrode film 19 is not provided in the part of the wide groove portion 17a2 that is continuous with the narrow groove portion 17a1, either.

The electrode film 19 has a first part 191 provided in at least a part of the wide groove portion 17a2, and a second part 192 provided in a part of the to-be-removed groove portion 17a3. The first part 191 has a first end 191a that is closer to the position ABS where the medium facing surface 30 is to be formed. The second part 192 has a second end 192a that is closer to the position ABS where the medium facing surface 30 is to be formed. A center position C at equal distances from the first end 191a and the second end 192a falls within the to-be-removed portion 102.

Figure 18A:
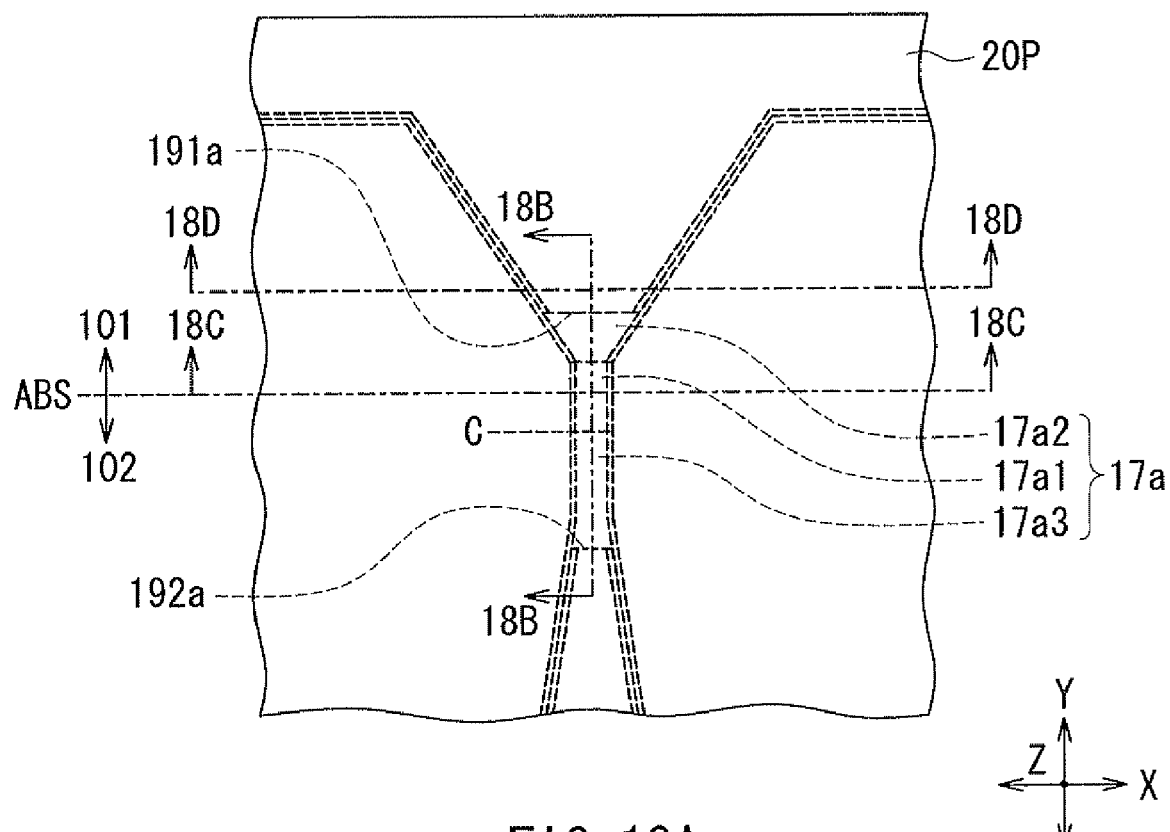
FIG. 18A to FIG. 18D are explanatory diagrams showing a step that follows the step shown in FIG. 17A to FIG. 17D.
Figure 18B:
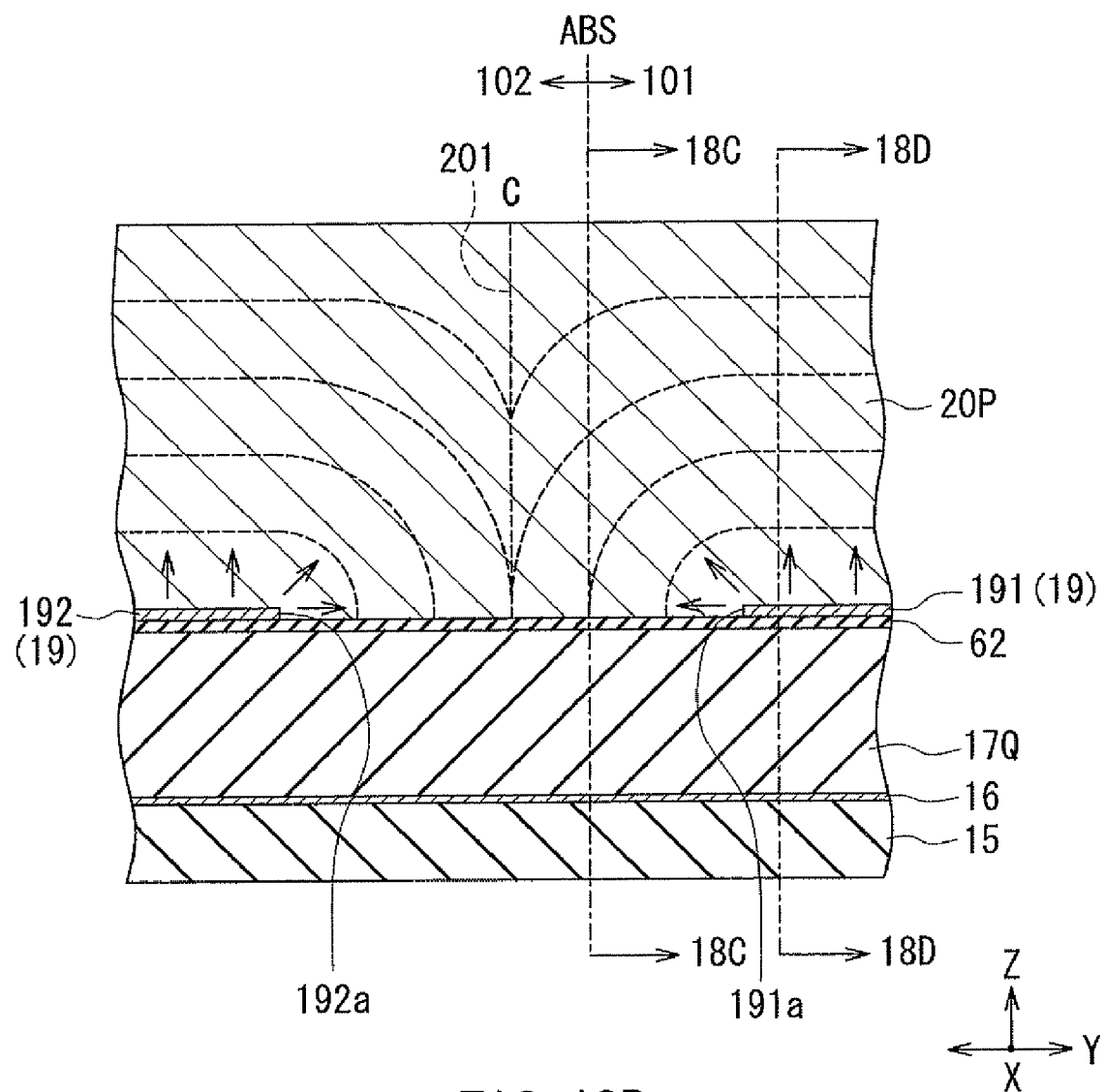
Figure 18C:
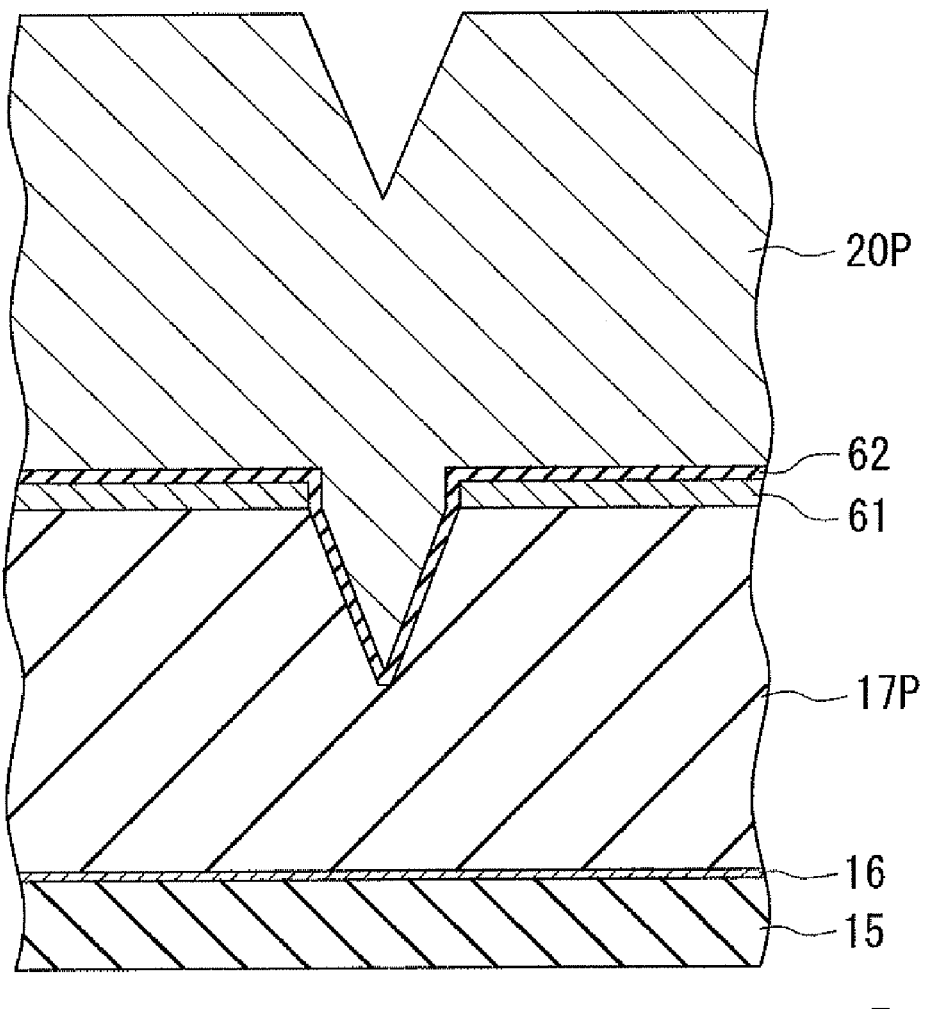
Figure 18D:
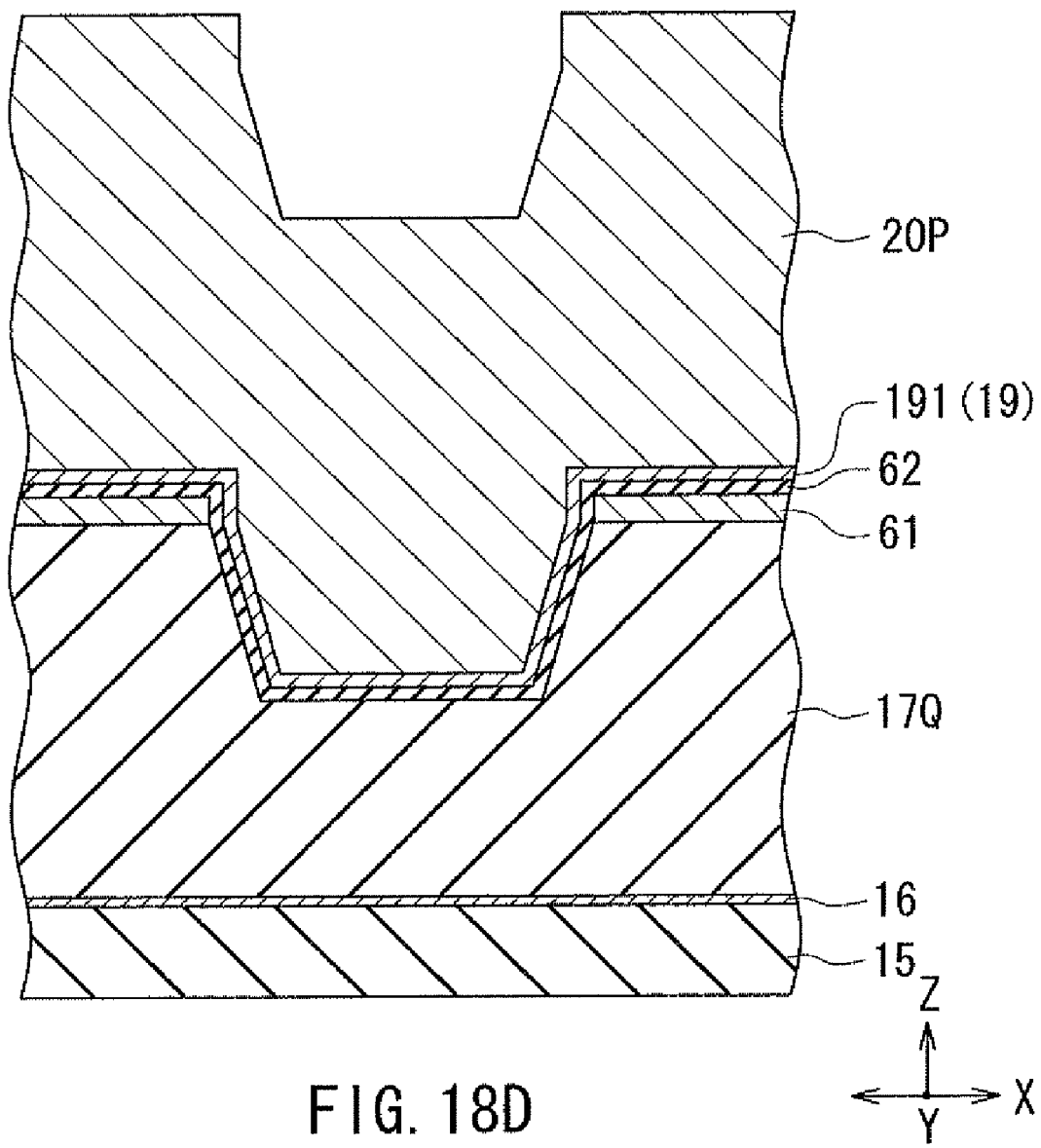
Figure 19A:
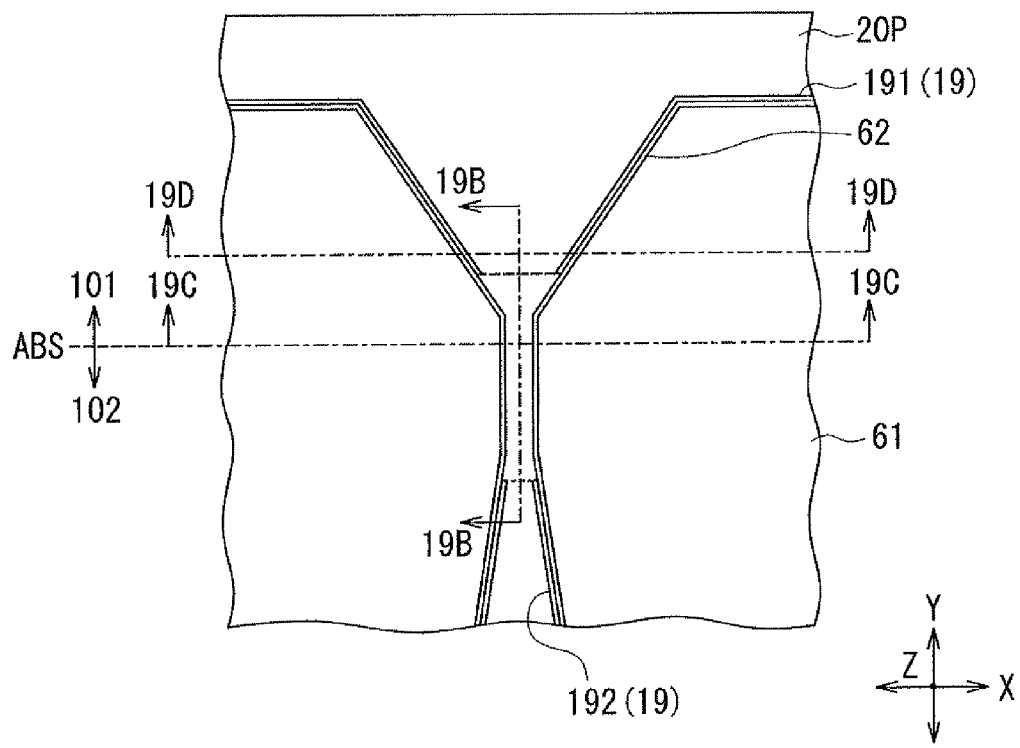
FIG. 19A to FIG. 19D are explanatory diagrams showing a step that follows the step shown in FIG. 18A to FIG. 18D.
Figure 19B:
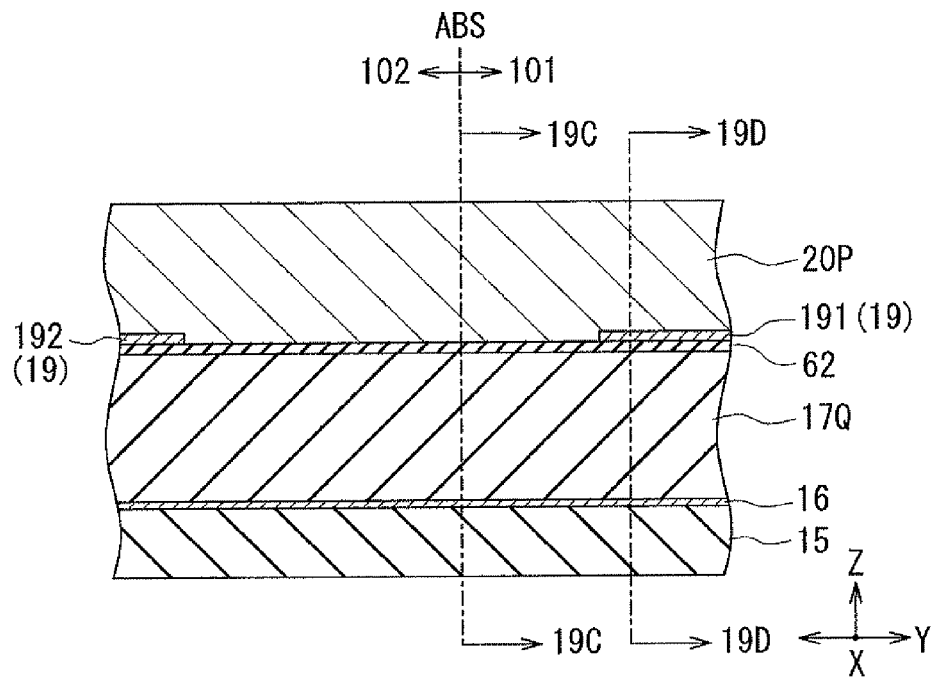
Figure 19C:
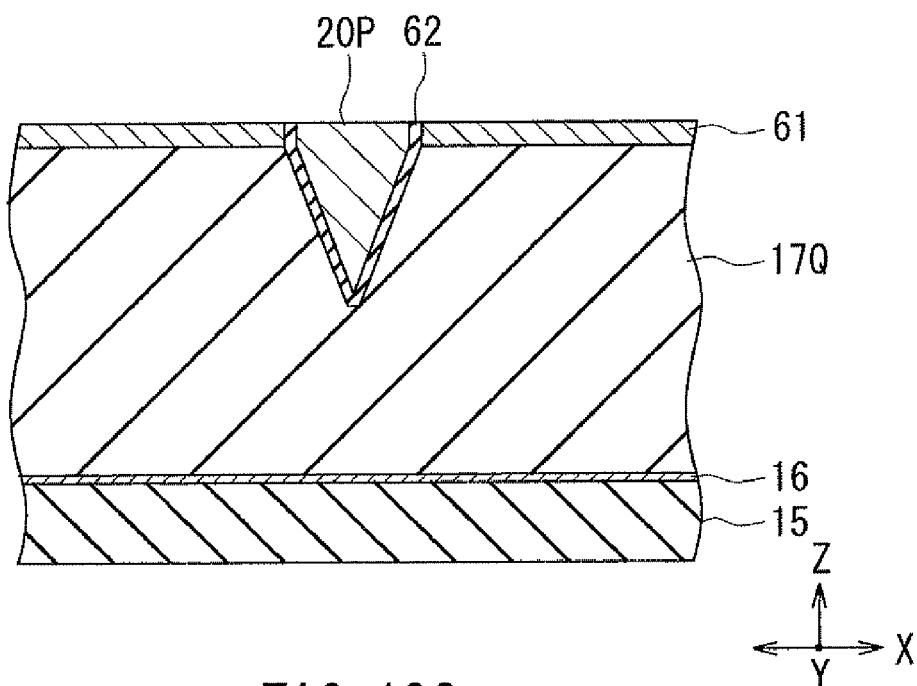
Figure 19D:
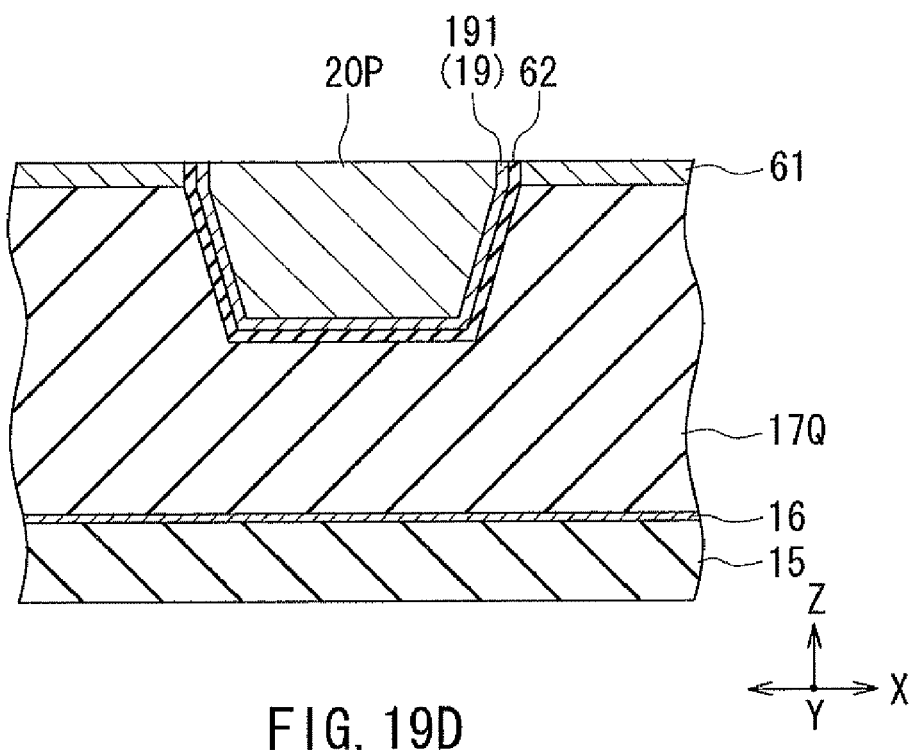
Figure 20A:
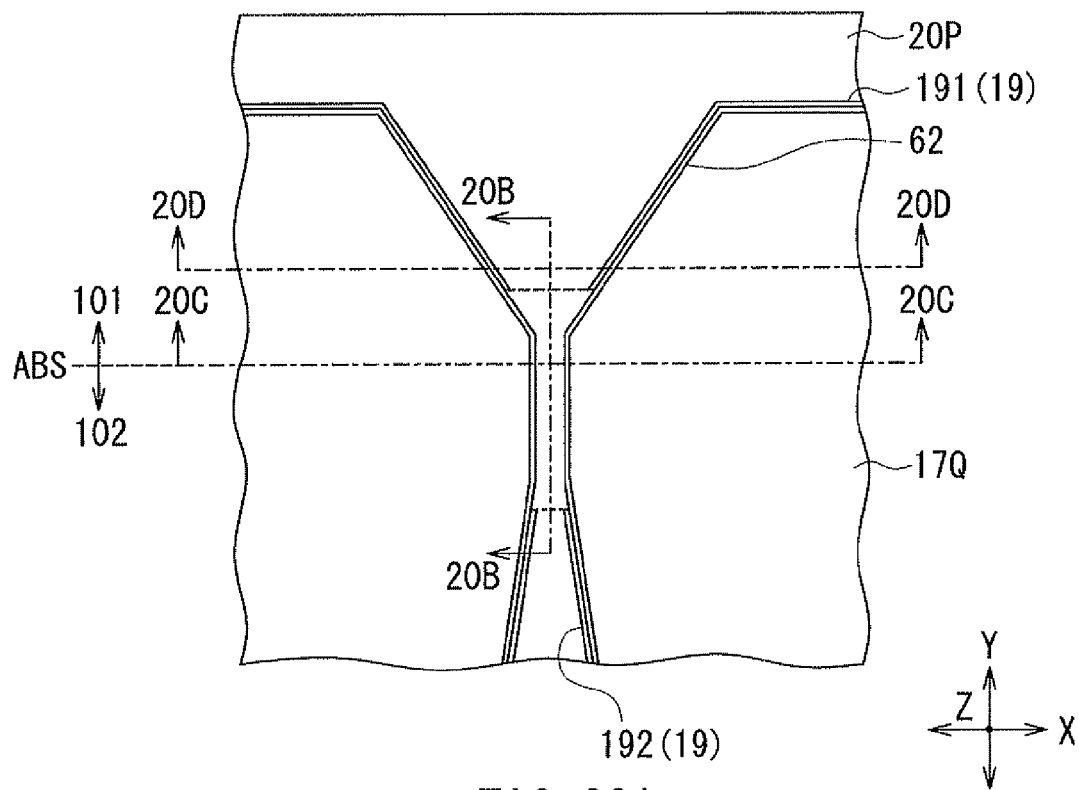
FIG. 20A to FIG. 20D are explanatory diagrams showing a step that follows the step shown in FIG. 19A to FIG. 19D.
Figure 20B:
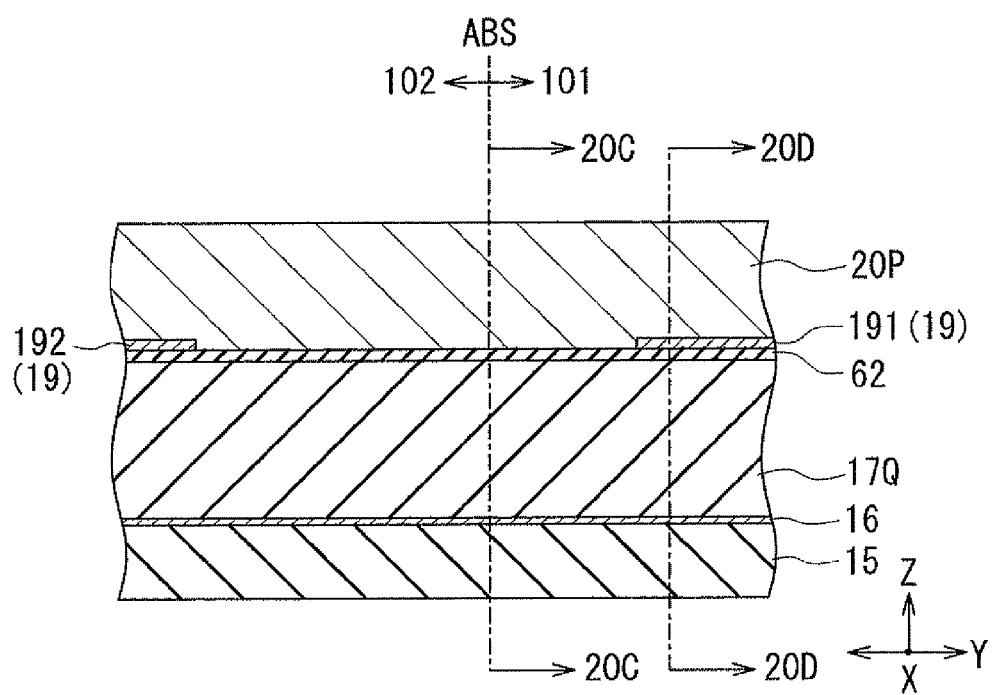
Figure 20C:
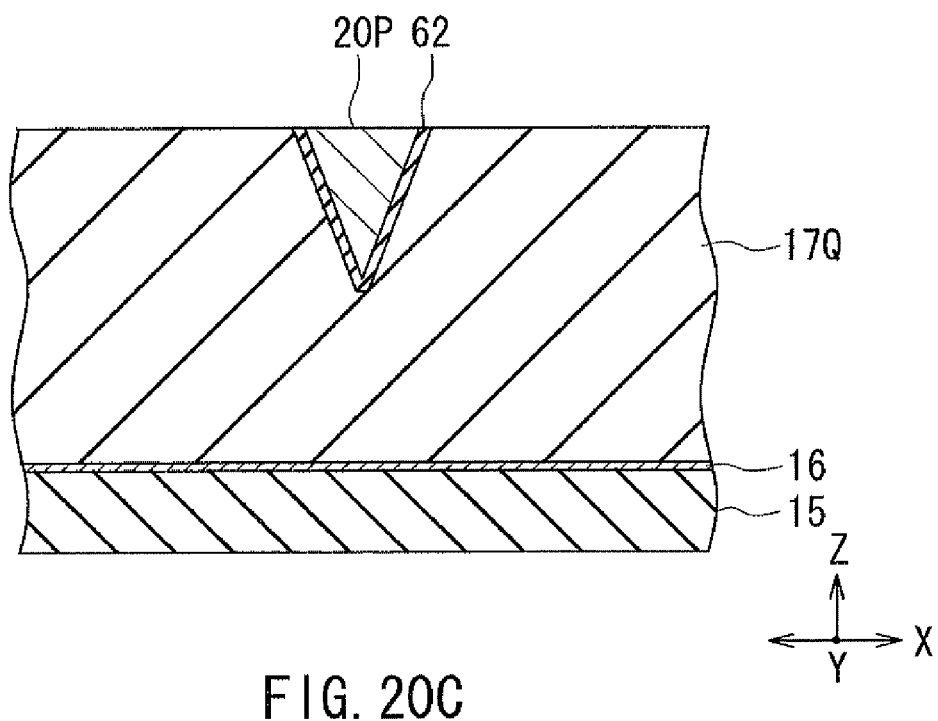
Figure 20D:
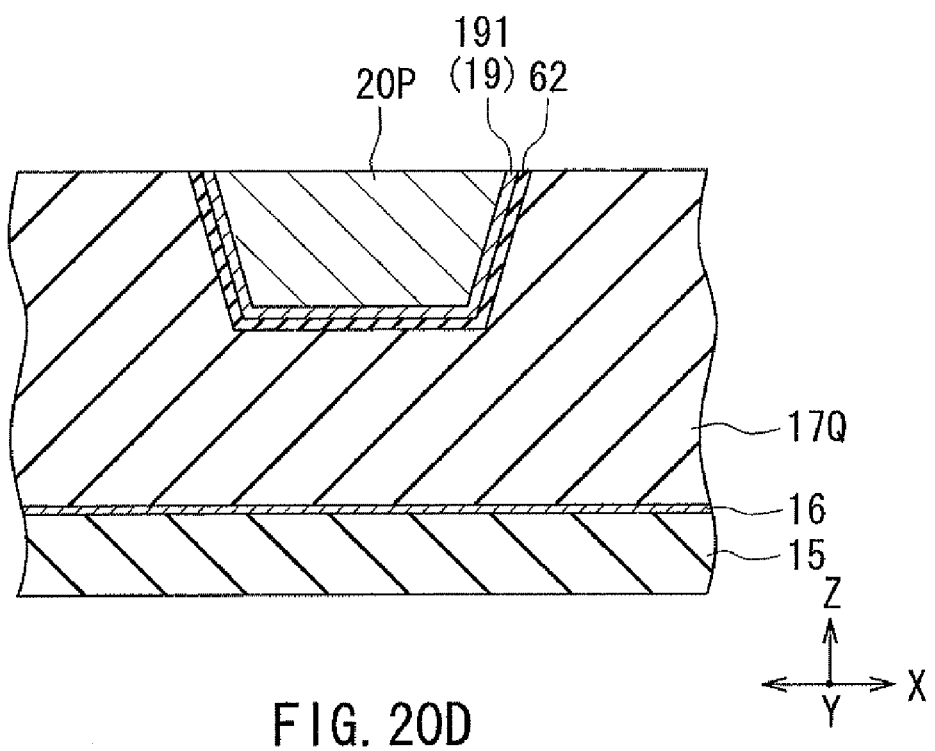
Figure 21A:
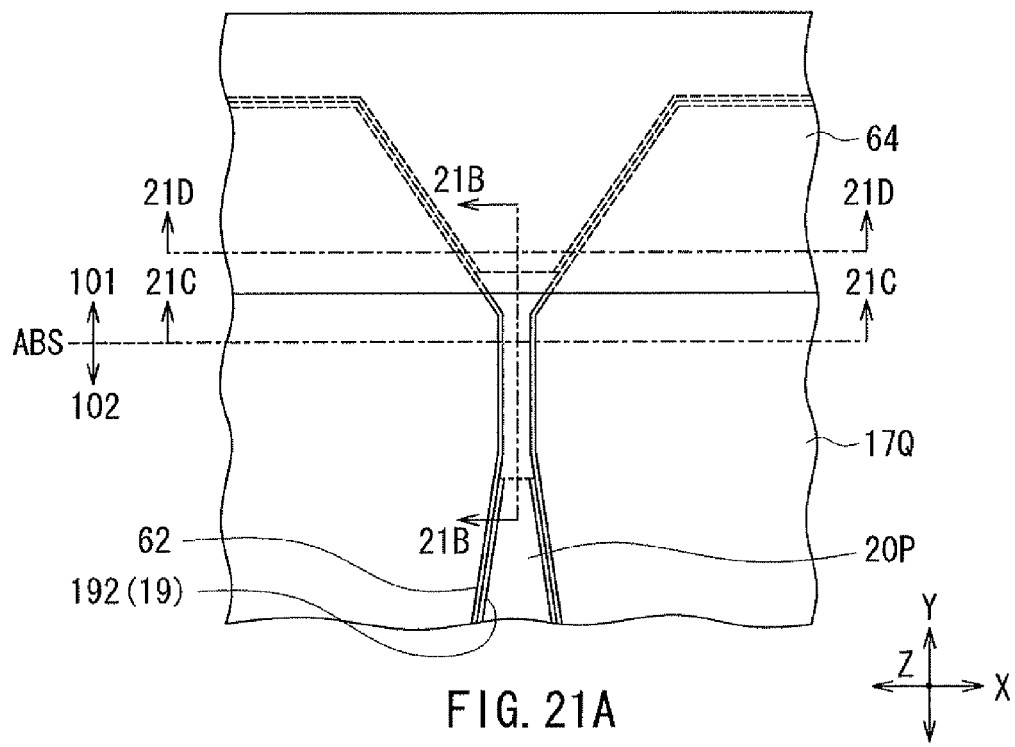
FIG. 21A to FIG. 21D are explanatory diagrams showing a step that follows the step shown in FIG. 20A to FIG. 20D.
Figure 21B:
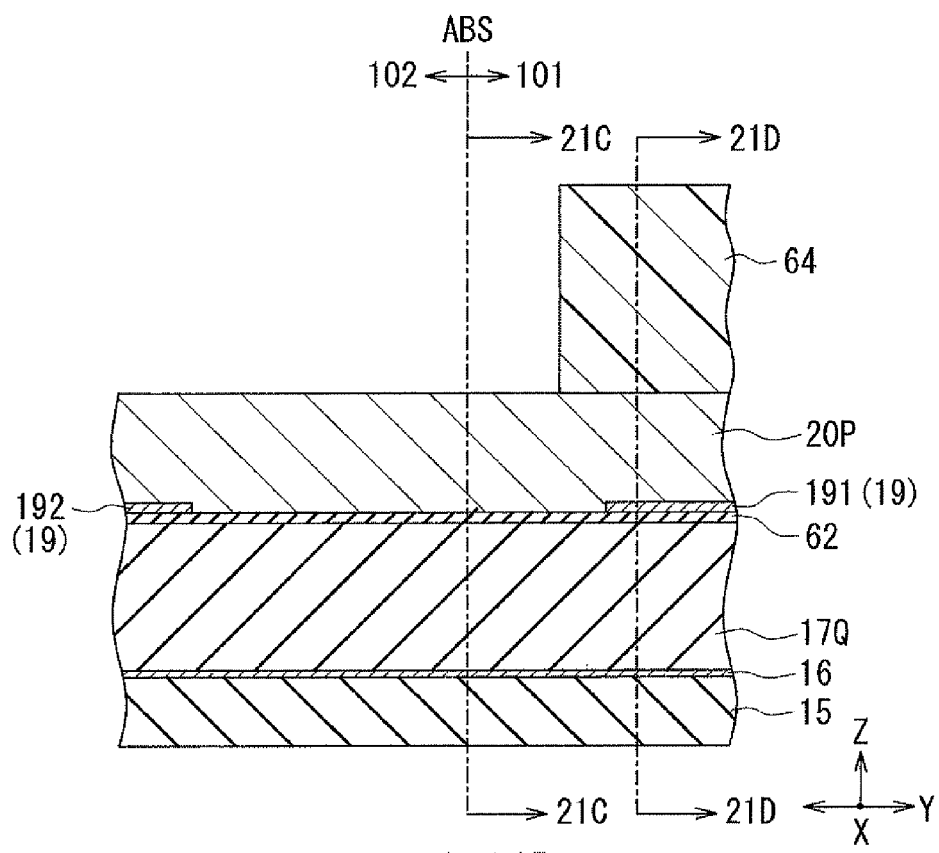
Figure 21C:
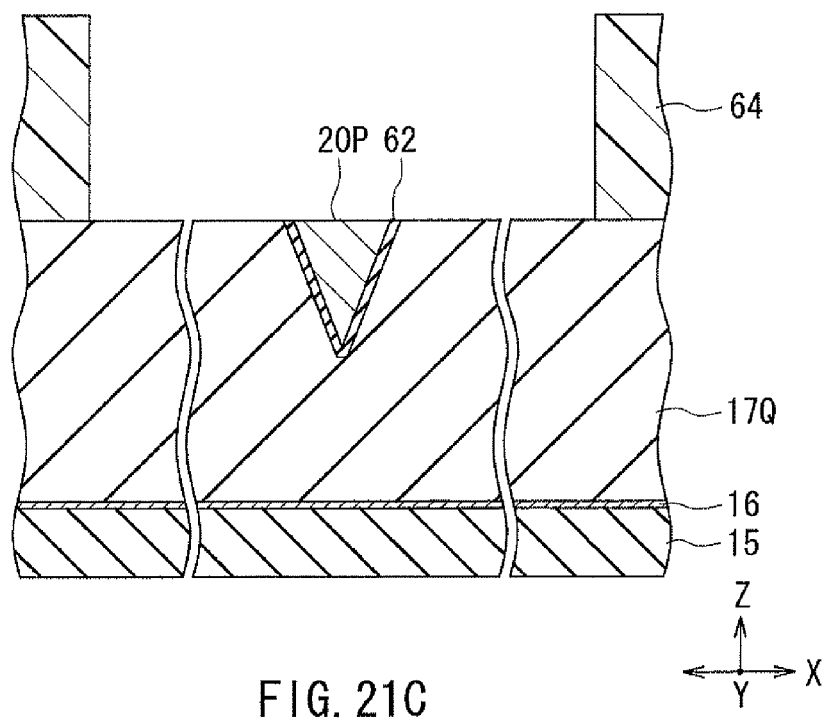
Figure 21D:
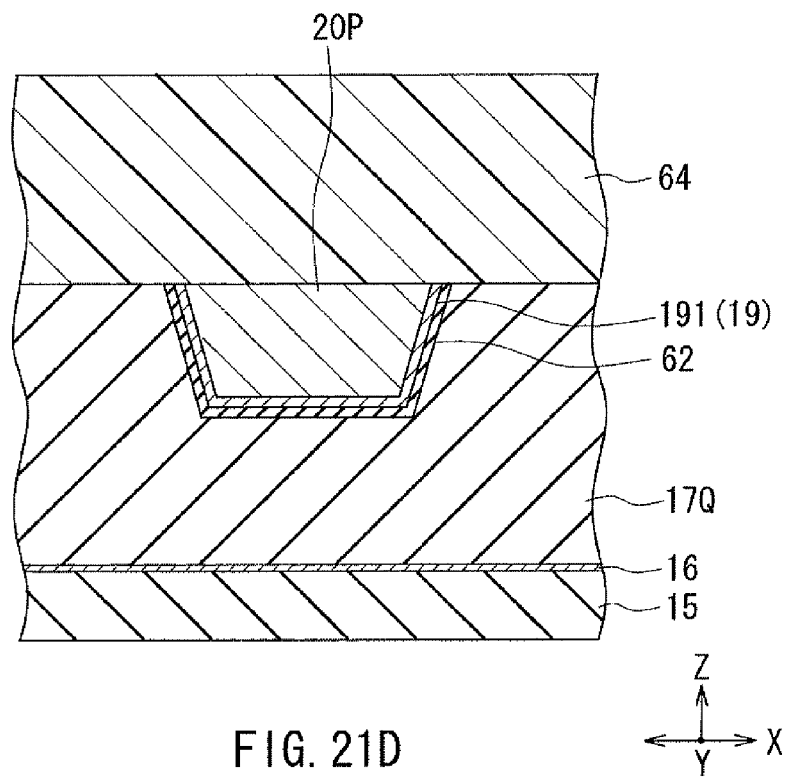

FIG. 18A to FIG. 18D show the next step. In this step, a plating film 20P is formed by plating (electroplating) using the electrode film 19. The plating film 20P is formed in and around the accommodating groove 17a. In the step of forming the plating film 20P, the plating film grows from the surfaces of the first part 191 and second part 192 of the electrode film 19. In FIG. 18B, the broken lines show how the plating film 20P grows. The arrows show the directions of growth of the plating film 20P. The wide groove portion 17a2 is filled with the portion of the plating film 20P that is grown from the surface of the first part 191. The to-be-removed groove portion 17a3 is filled with the portion of the plating film 20P that is grown from the surface of the second part 192. The narrow groove portion 17a1 where the electrode film 19 is not provided is filled with a part of the portion of the plating film 20P that is grown from the surface of the first part 191.

As shown in FIG. 18B, the portion of the plating film 20P grown from the first part 191 and the portion of the plating film 20P grown from the second part 192 meet each other at the position C in the accommodating groove 17a. This forms a seam 201 between the two portions. As mentioned previously, the position C falls within the to-be-removed portion 102. The seam 201 therefore also lies in the to-be-removed position 102.

FIG. 19A to FIG. 19D show the next step. In this step, a not-shown slit is initially formed in the plating film 20P by ion milling, for example. The slit is intended to separate a part of the plating film 20P lying in and near the accommodating groove 17a from the other parts of the plating film 20P. Next, a not-shown mask is formed to cover the part of the plating film 20P lying in and near the accommodating groove 17a. The outer edges of the mask lie inside the foregoing slit formed in the plating film 20P. Next, the parts of the plating film 20P not covered with the mask are removed by wet etching. The mask is then removed. Next, the plating film 20P and the nonmagnetic layer 62 are polished by, for example, CMP, until the etching mask layer 61 is exposed. This flattens the etching mask layer 61, the nonmagnetic layer 62, and the plating film 20P at the top.

FIG. 20A to FIG. 20D show the next step. In this step, the etching mask layer 61 is removed and the top surfaces of the nonmagnetic layer 62 and the plating film 20P are etched by ion milling, for example. The top surfaces of the plating-film-accommodating layer 17Q, the nonmagnetic layer 62 and the plating film 20P are thereby exposed.

FIG. 21A to FIG. 21D show the next step. In this step, a mask 64 is formed on the stack shown in FIG. 20A to FIG. 20D. The mask 64 has an opening that is located in an area including the area where the first shield 41 is to be provided. The mask 64 is formed by patterning a photoresist layer by photolithography, for example.

Figure 22A:
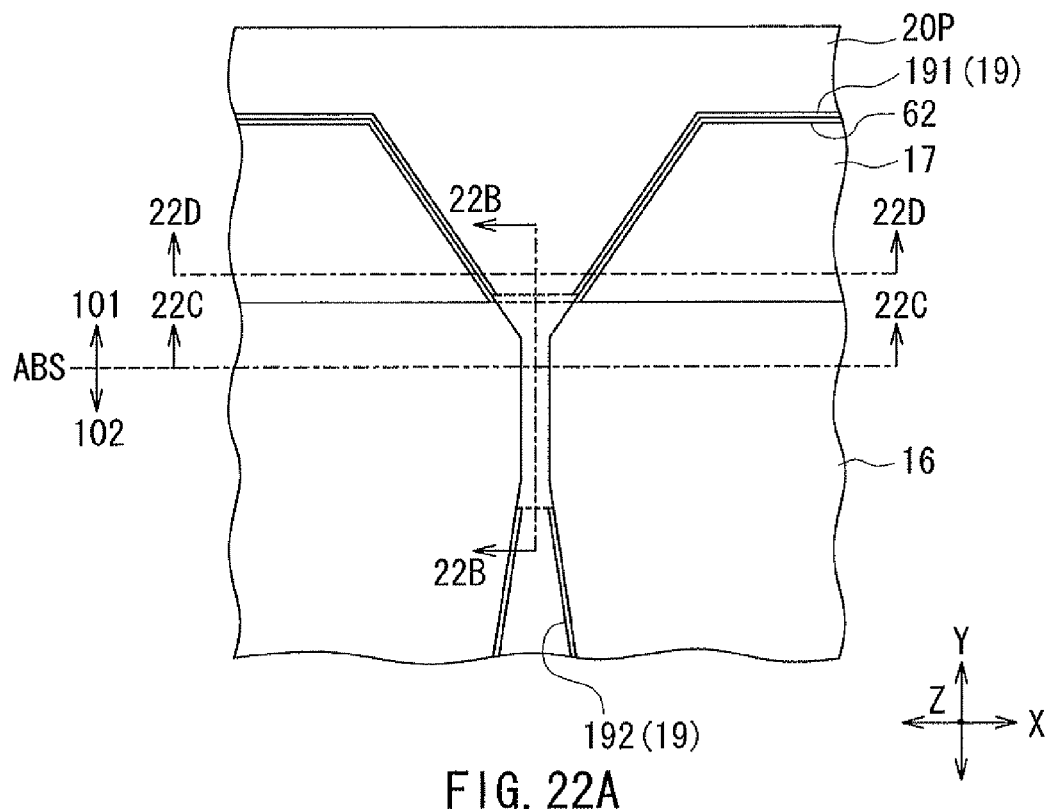
FIG. 22A to FIG. 22D are explanatory diagrams showing a step that follows the step shown in FIG. 21A to FIG. 21D.
Figure 22B:
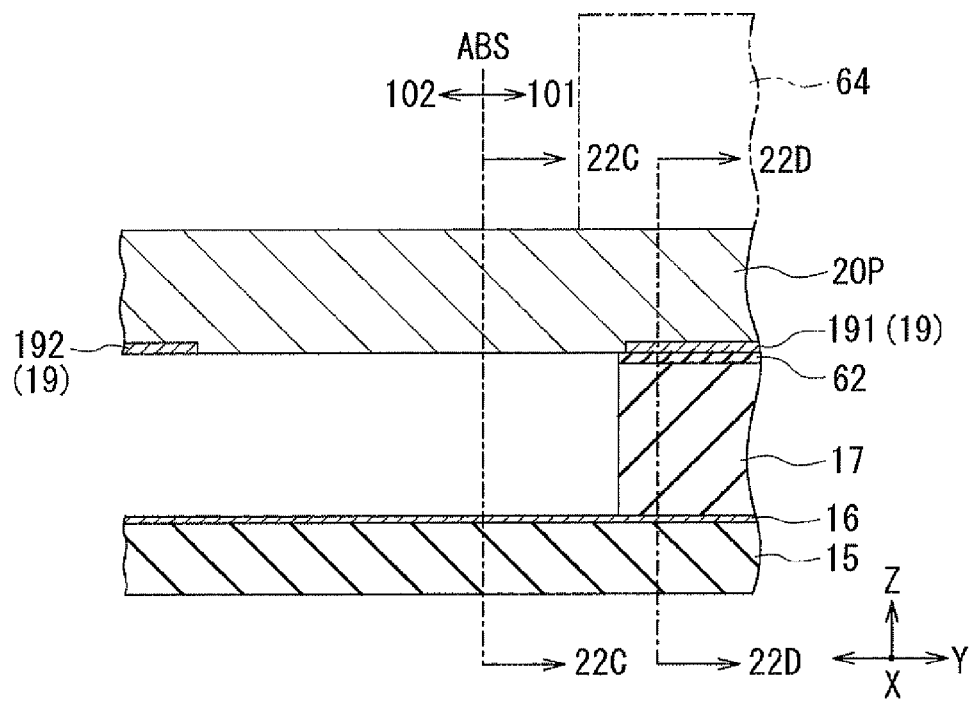
Figure 22C:
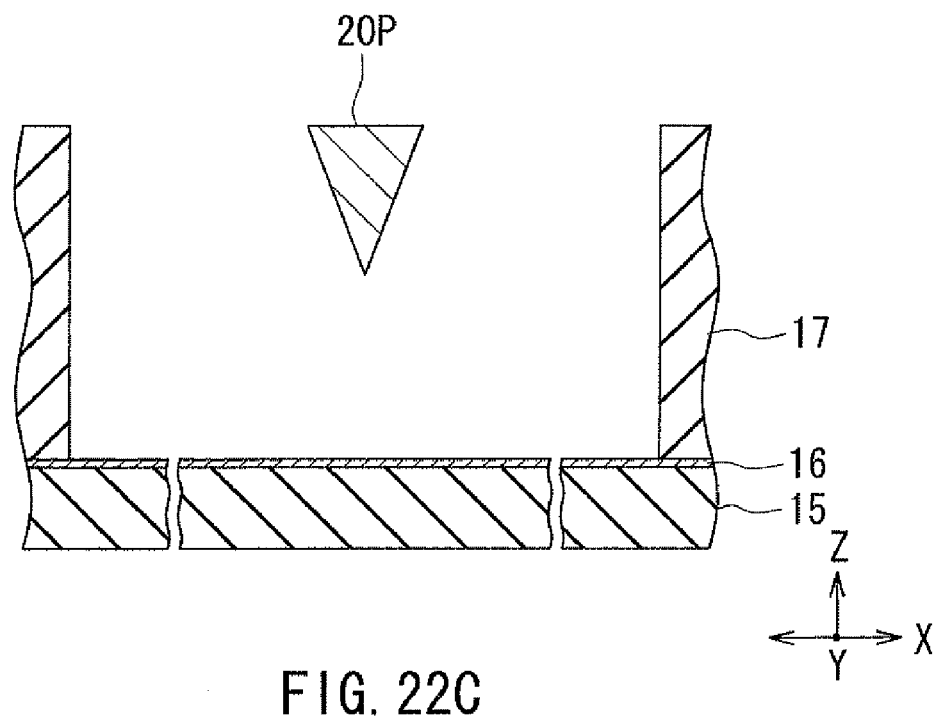
Figure 22D:
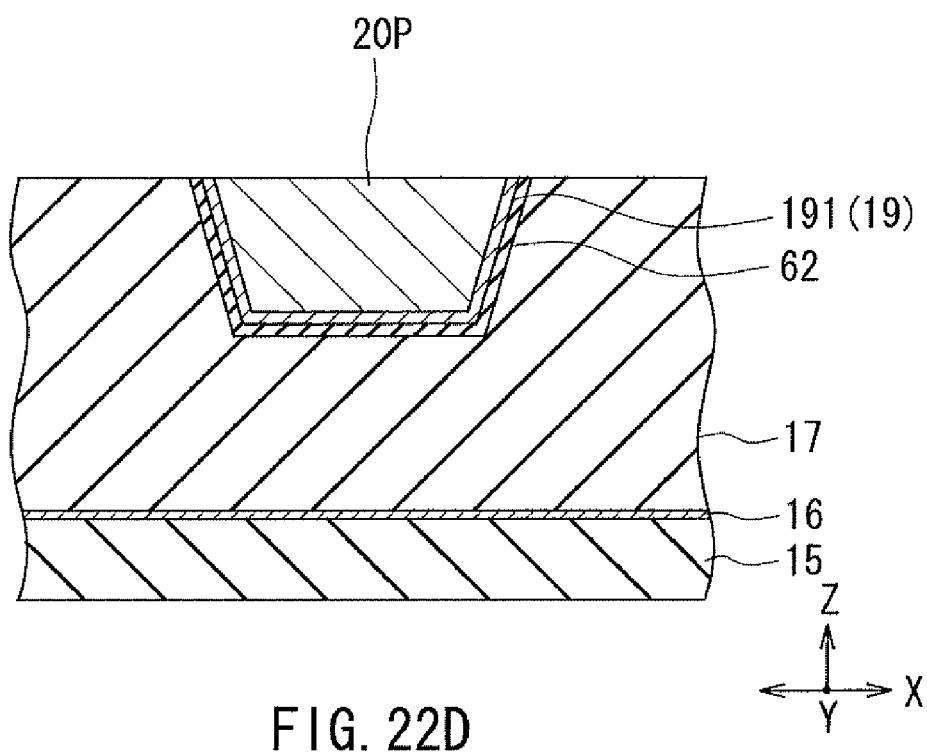
Figure 23A:
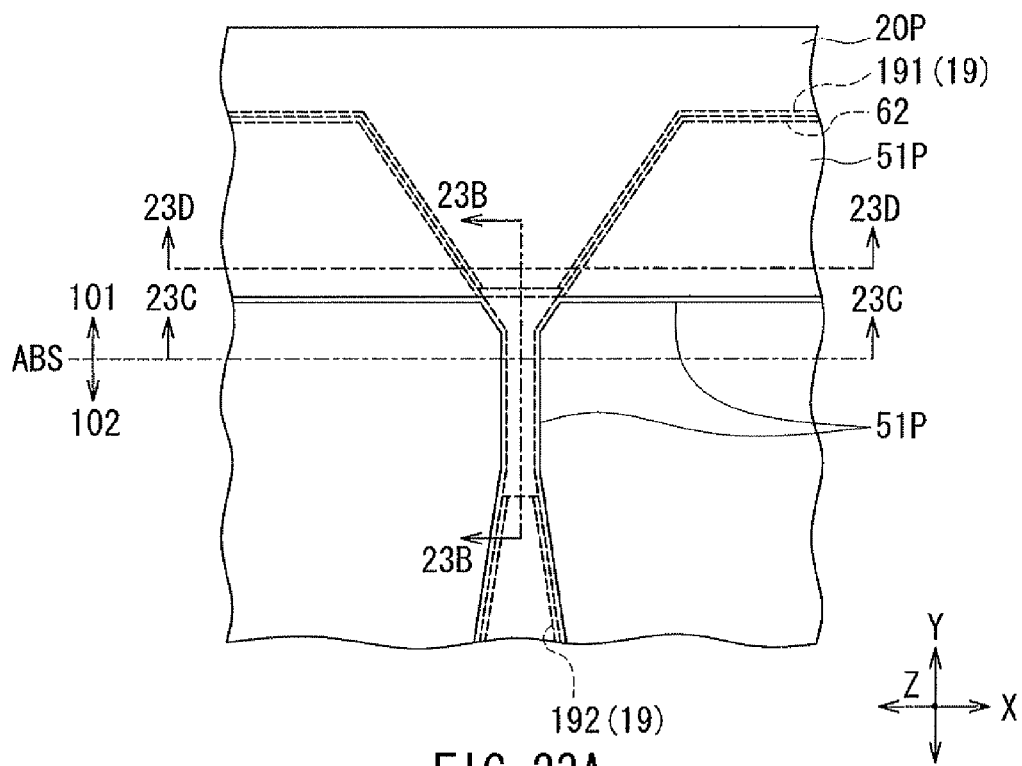
FIG. 23A to FIG. 23D are explanatory diagrams showing a step that follows the step shown in FIG. 22A to FIG. 22D.
Figure 23B:
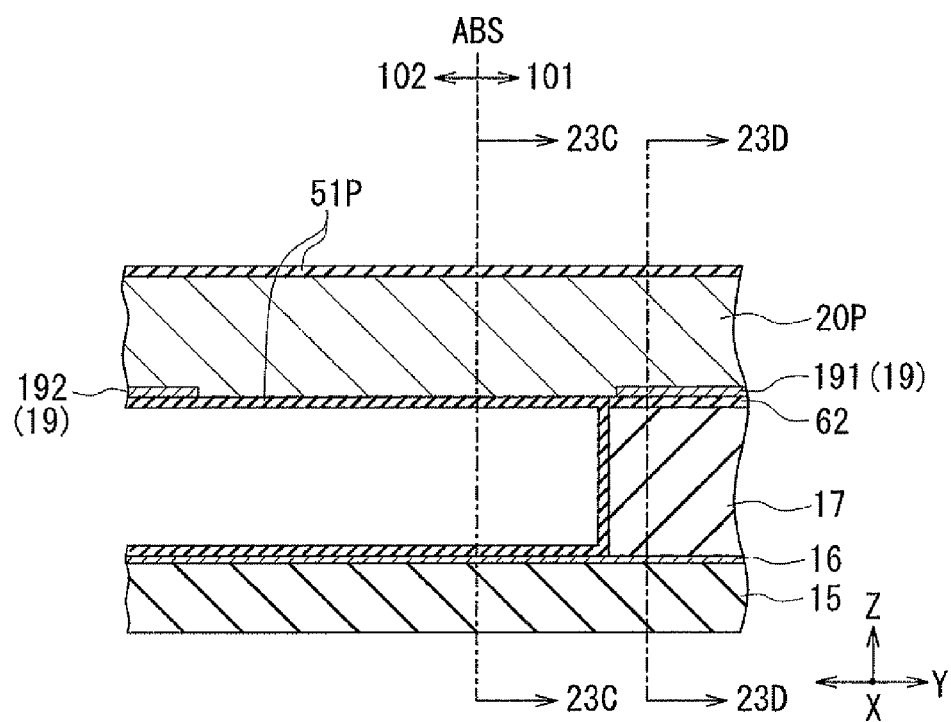
Figure 23C:
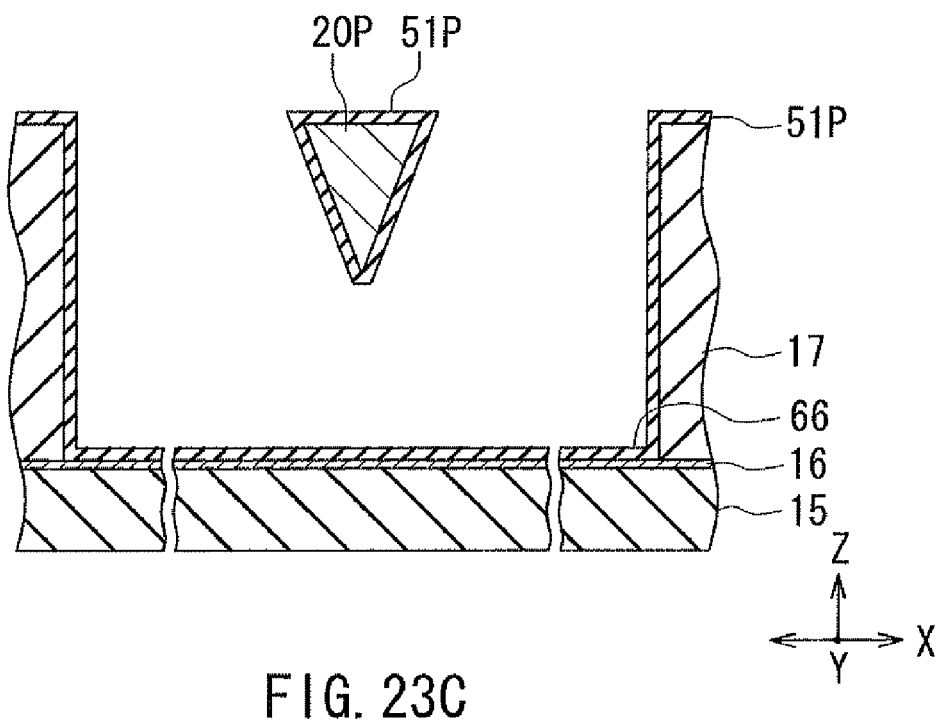
Figure 23D:
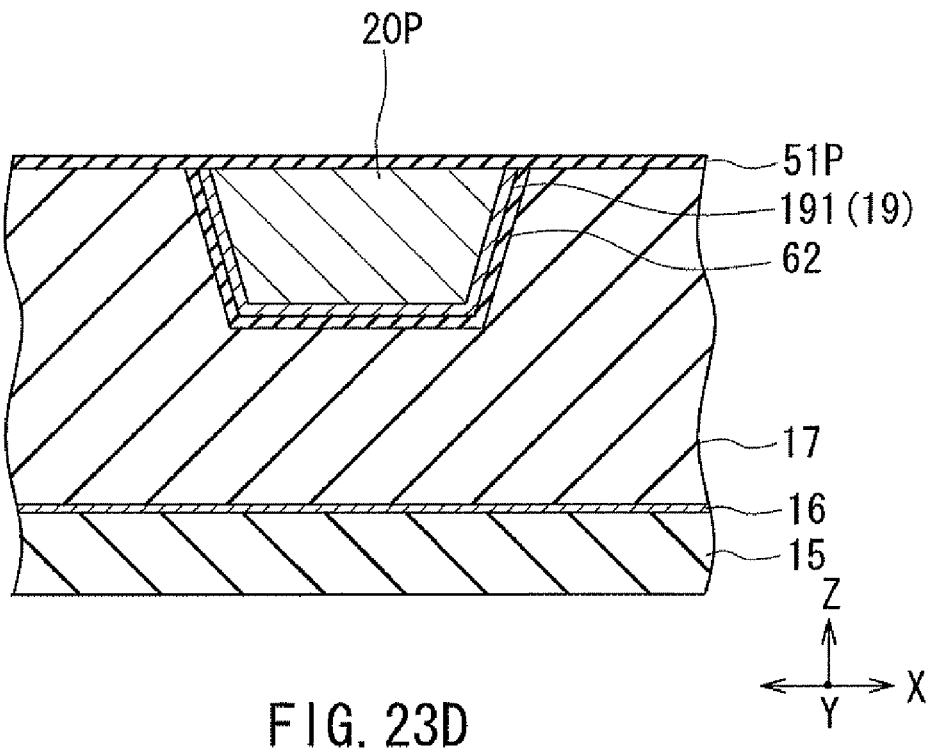
Figure 24A:
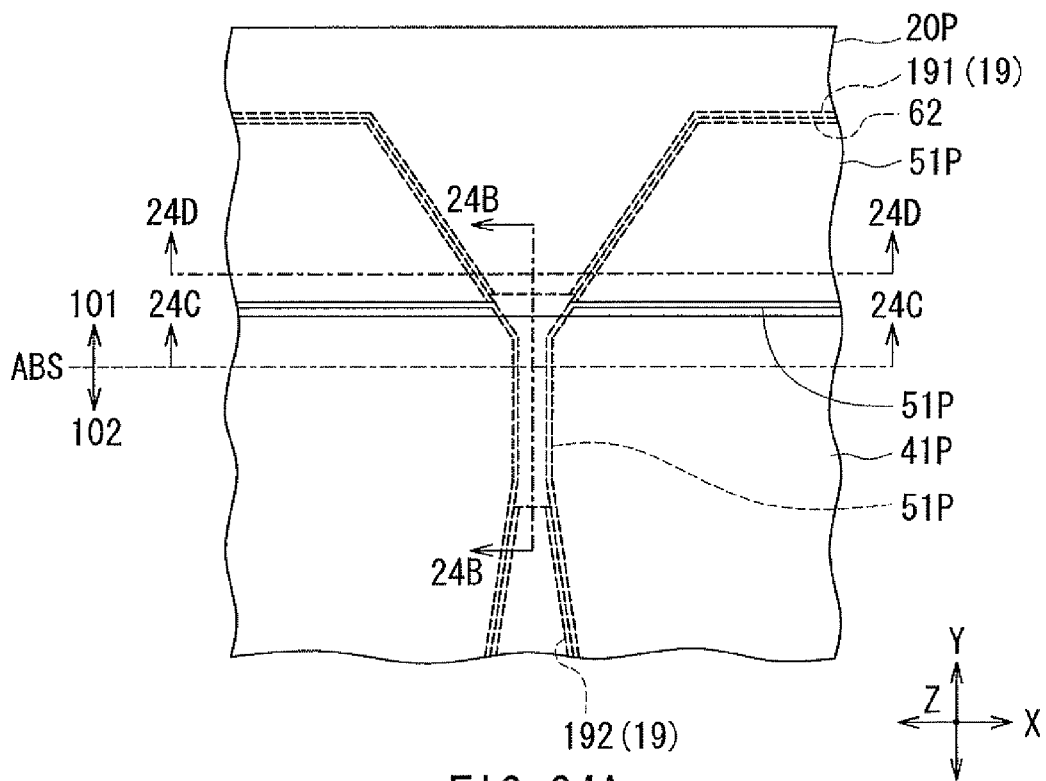
FIG. 24A to FIG. 24D are explanatory diagrams showing a step that follows the step shown in FIG. 23A to FIG. 23D.
Figure 24B:
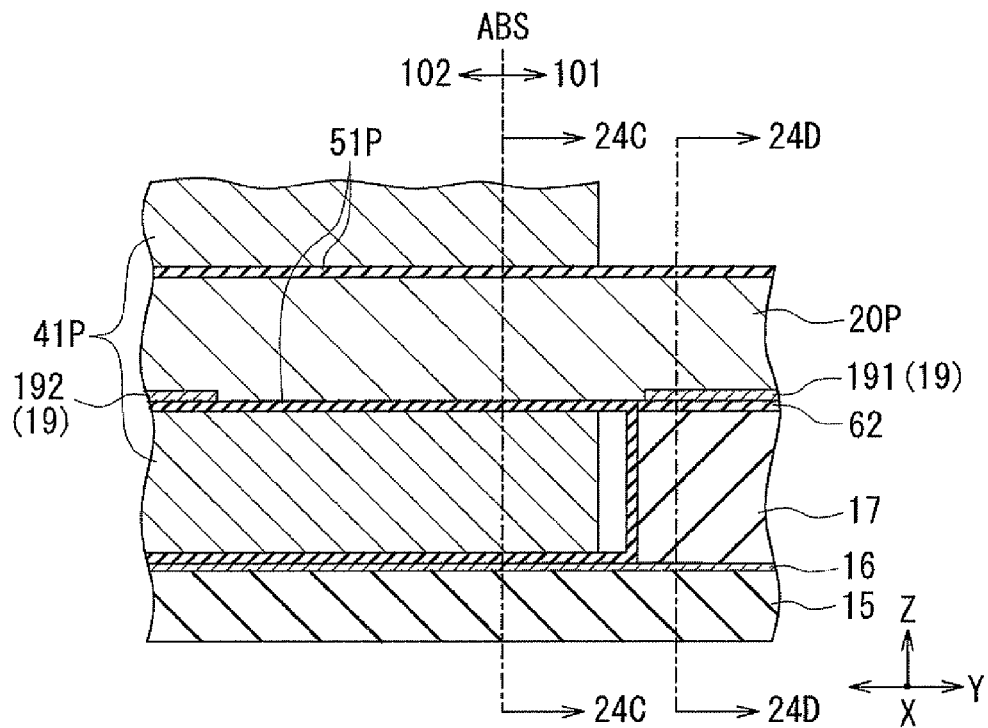
Figure 24C:
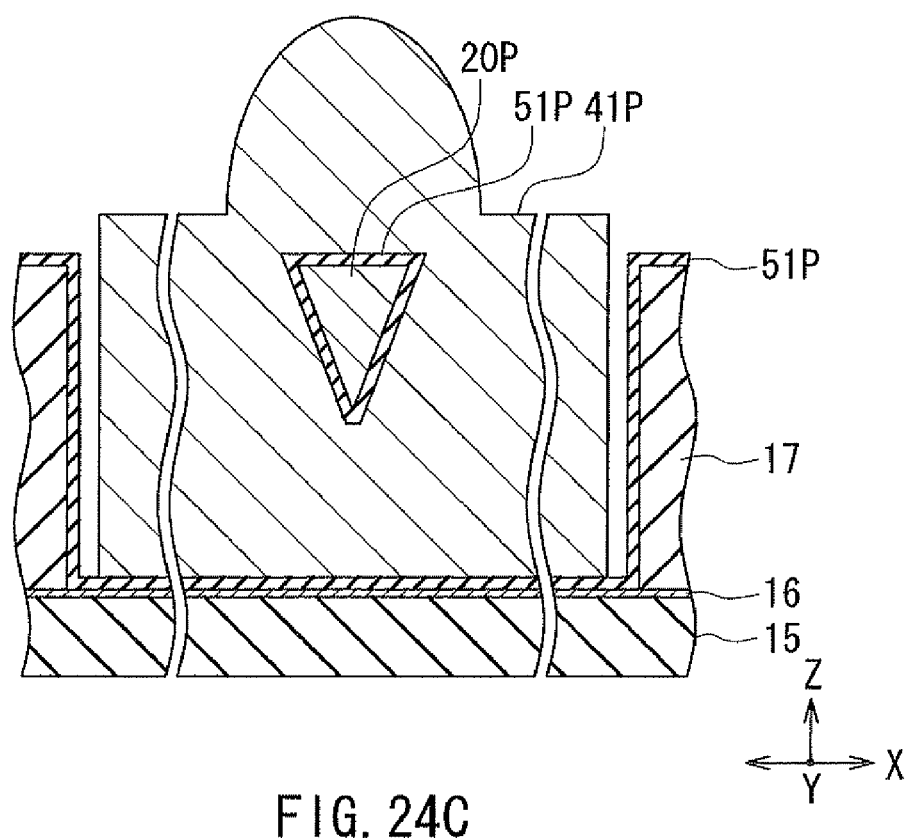
Figure 24D:
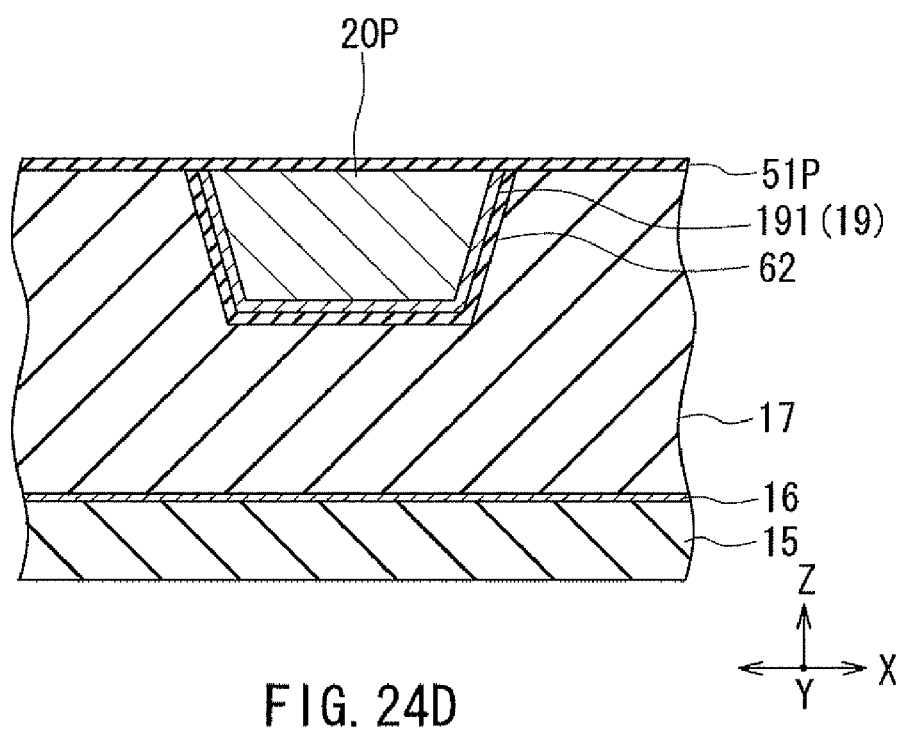
Figure 25A:
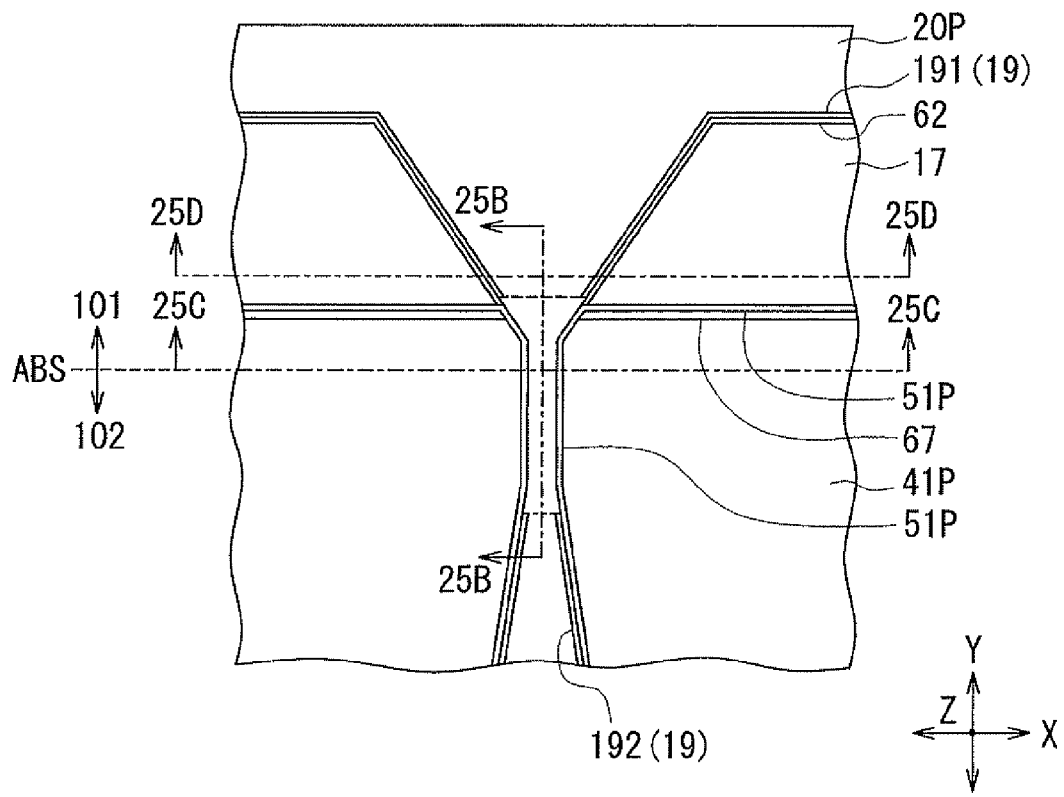
FIG. 25A to FIG. 25D are explanatory diagrams showing a step that follows the step shown in FIG. 24A to FIG. 24D.
Figure 25B:
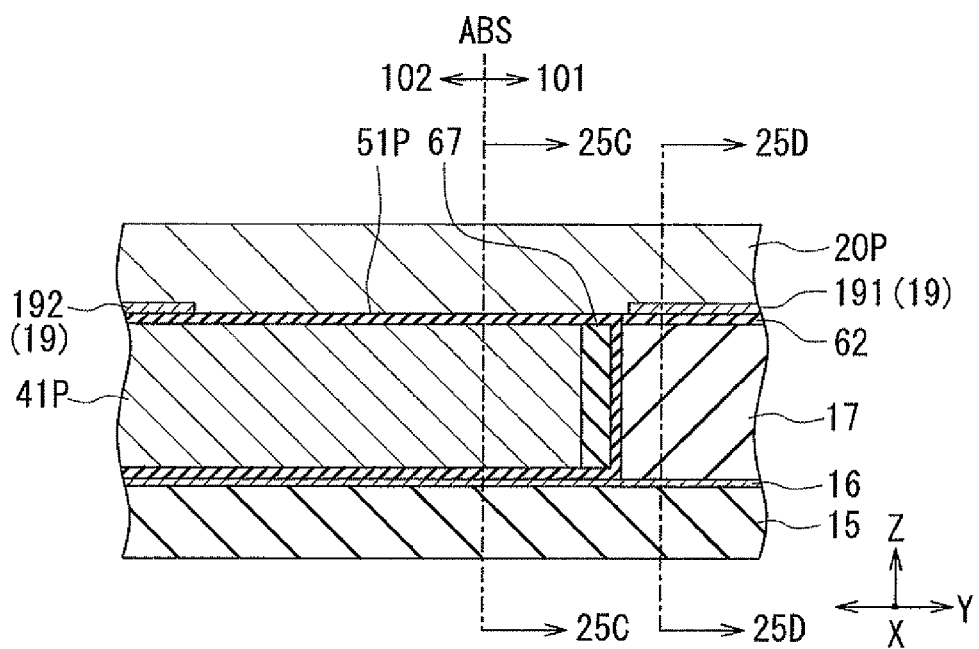
Figure 25C:
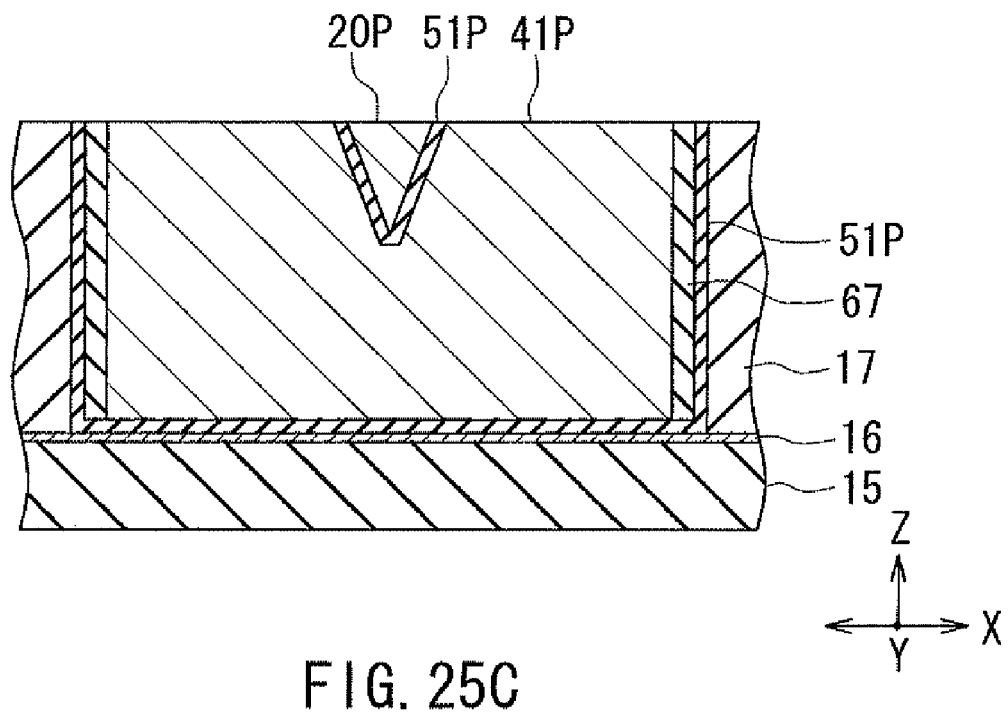
Figure 25D:
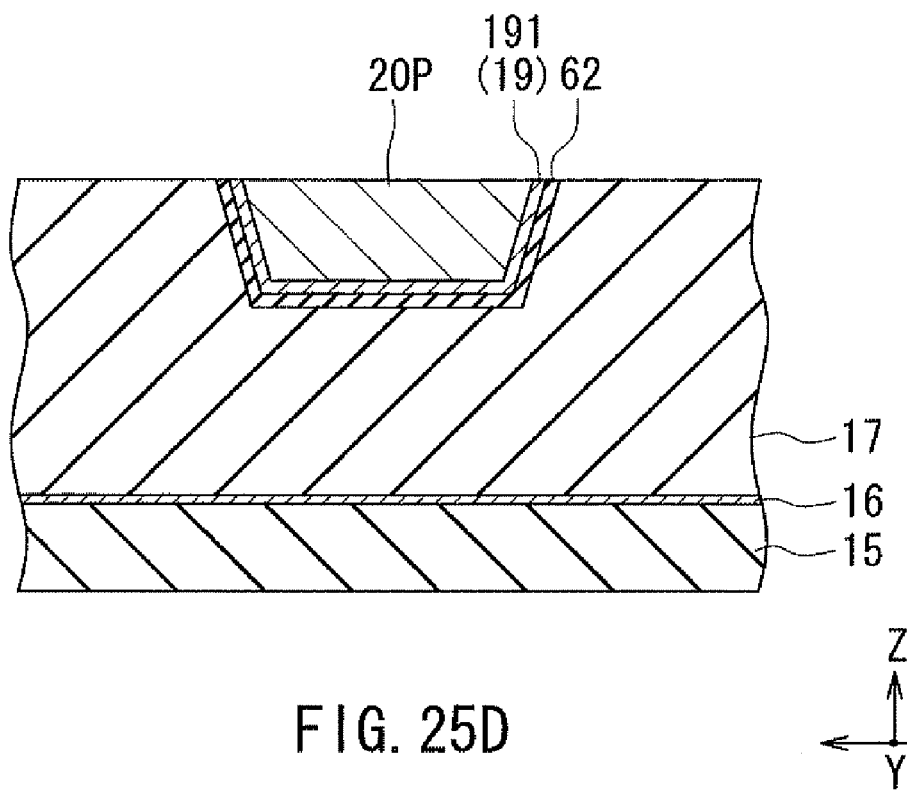

FIG. 22A to FIG. 22D show the next step. In this step, portions of the plating-film-accommodating layer 17Q and the nonmagnetic layer 62, both of which are made of alumina, for example, are initially removed by wet etching, the portions lying in the area where the opening of the mask 64 is located. The remaining portion of the plating-film-accommodating layer 17Q becomes the nonmagnetic layer 17. In this step, the nonmagnetic metal layer 16 functions as an etching stopper for stopping the progress of etching. This step exposes the entire periphery of the portion of the plating film 20P located in the area where the nonmagnetic layer 17 does not exist. The mask 64 is then removed. In FIG. 22B, the position of the mask 64 yet to be removed is shown by a chain double-dashed line. As shown in FIG. 22B, the foregoing wet etching produces an undercut, i.e., the phenomenon that some of the portions of the plating-film-accommodating layer 17Q and the nonmagnetic layer 62 lying under the mask 64 are also etched. The positions of the sidewalls of the nonmagnetic layers 17 and 62 formed by the wet etching vary depending on the etching condition.

FIG. 23A to FIG. 23D show the next step. In this step, a nonmagnetic layer 51P of a nonmagnetic material is formed by ALD, for example, so as to cover all the exposed surfaces of the stack shown in FIG. 22A to FIG. 22D. The nonmagnetic layer 51P is to become the first gap layer 51 later. A part of the nonmagnetic layer 51P covers the entire periphery of the portion of the plating film 20P where the entire periphery is exposed.

FIG. 24A to FIG. 24D show the next step. In this step, a magnetic layer 41P is formed by frame plating, for example. The magnetic layer 41P is formed around the portion of the plating film 20P where the outer periphery is covered with the nonmagnetic layer 51P. The magnetic layer 41P is to become the first shield 41 later.

FIG. 25A to FIG. 25D show the next step. In this step, the nonmagnetic layer 67 is initially formed to fill the space between the magnetic layer 41P and the nonmagnetic layer 51P. Next, the magnetic layer 41P, the nonmagnetic layers 17, 62 and 67, the plating film 20P, and the electrode film 19 are polished by, for example, CMP, so as to flatten their top surfaces. Next, in order to adjust the width and level of the front end face 20A1 of the narrow portion 20A of the magnetic pole 20, the top surfaces of the magnetic layer 41P, the nonmagnetic layers 17, 62 and 67, the plating film 20P and the electrode film 19 are etched by ion milling, for example.

Figure 26A:
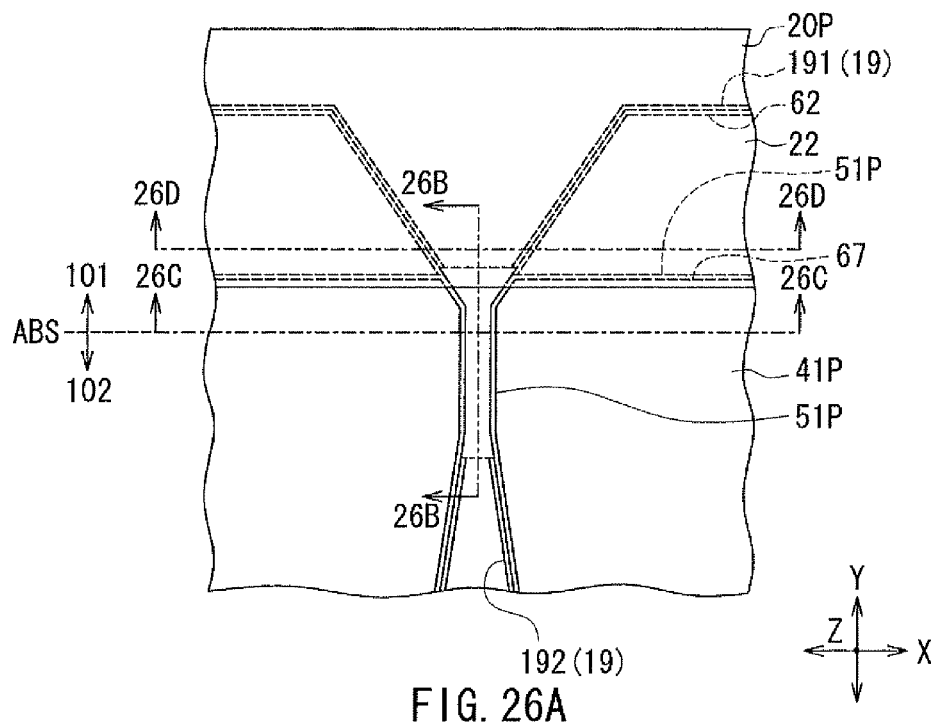
FIG. 26A to FIG. 26D are explanatory diagrams showing a step that follows the step shown in FIG. 25A to FIG. 25D.
Figure 26B:
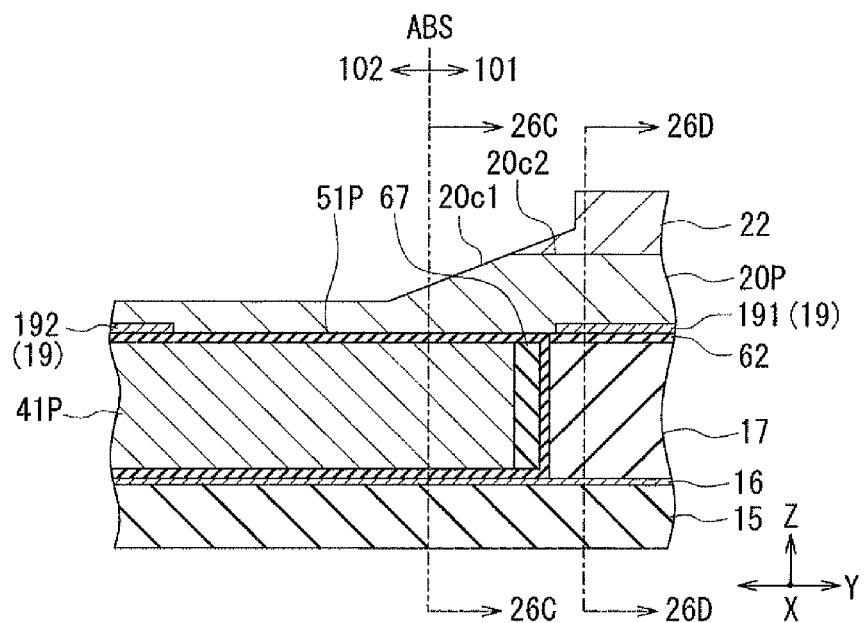
Figure 26C:
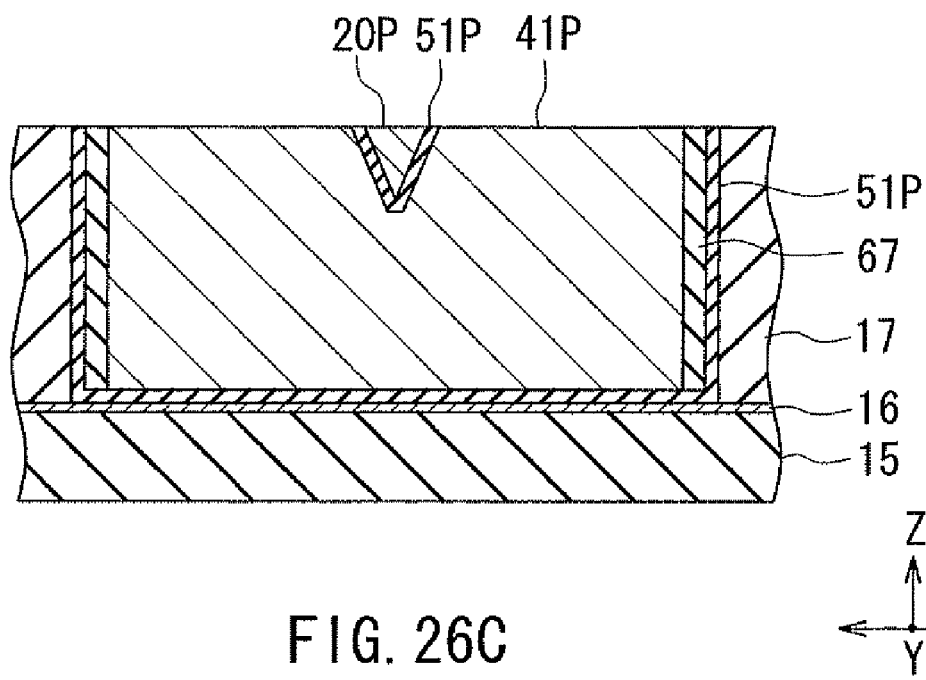
Figure 26D:
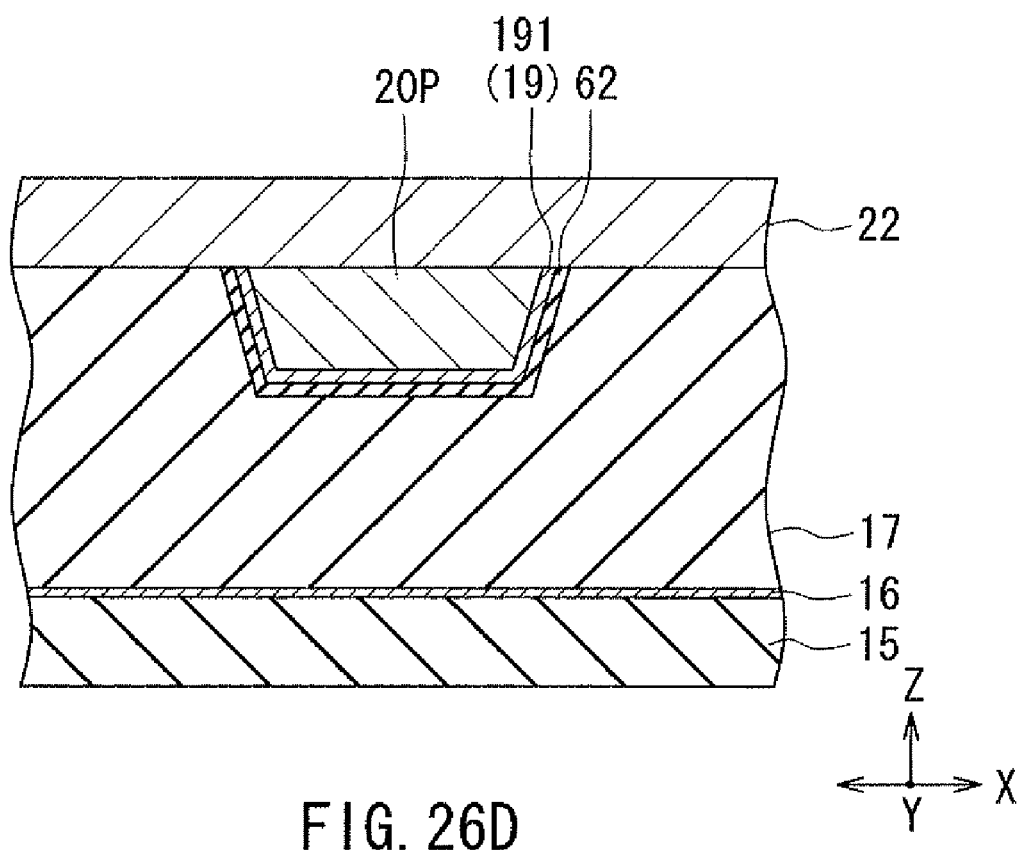

FIG. 26A to FIG. 26D show the next step. In this step, first, a to-be-etched layer (not shown) that is to become the nonmagnetic layer 22 later is formed by lift-off, for example. Next, a not-shown etching mask is formed on the to-be-etched layer. The etching mask covers a part of the top surface of the to-be-etched layer, the part being intended to become the top surface 22b of the nonmagnetic layer 22 later. The etching mask is formed by patterning a photoresist layer by photolithography, for example. Next, the other part of the to-be-etched layer which is not covered with the etching mask and a part of the top surface of the plating film 20P are etched by ion milling, for example. This etching makes the to-be-etched layer into the nonmagnetic layer 22, as shown in FIG. 26B. This etching also forms the first part 20c1 and the second part 20c2 in the top surface of the plating film 20P.

Next, although not shown, the second gap layer 52 is formed to cover the plating film 20P and the nonmagnetic layer 22. Next, the nonmagnetic layer 22 and the second gap layer 52 are each etched in part so as to expose a part of the top surface of the plating film 20P on which the yoke layer 23 is to be disposed. Next, a plating layer that is to be made into the second shield 42 and the yoke layer 23 later is formed by frame plating, for example. Next, a nonmagnetic film that is to become the nonmagnetic layer 24 later is formed to cover the entire stack. The nonmagnetic film is then polished by, for example, CMP, until the top surface of the plating layer is exposed. This makes the nonmagnetic film into the nonmagnetic layer 24. Also, the second shield 42 and the yoke layer 23 are formed by the plating layer.

Next, as shown in FIG. 5, the insulating layer 25 is formed over areas of the top surfaces of the yoke layer 23 and the nonmagnetic layer 24 above which the coil 26 is to be disposed. The coil 26 is then formed by, for example, plating, such that at least a part of the coil 26 lies on the insulating layer 25. Next, the insulating layer 27 is formed to cover the coil 26. Next, the return yoke layer 28 is formed by frame plating, for example. Next, the protection layer 29 is formed to cover the entire top surface of the stack. Wiring, terminals, and other components are then formed on the protection layer 29. The substructure is completed by the foregoing steps.

In the step of fabricating the magnetic head from the substructure, as described previously, the substructure is cut in the positions of the inter-row to-be-removed portions 112 and the intra-row to-be-removed portions 113 shown in FIG. 27, whereby the plurality of pre-head portions 101 are separated from each other and the medium facing surfaces 30 are formed in the respective positions ABS where to form the medium facing surfaces 30. A plurality of magnetic heads are thereby fabricated from the substructure. When the medium facing surface 30 is formed, the plating film 20P, the magnetic layer 41P, and the nonmagnetic layer 51P shown in FIG. 26B become the magnetic pole 20, the first shield 41, and the first gap layer 51, respectively.

The effect of the magnetic head and the method of manufacturing the same according to the present embodiment will now be described. In the magnetic head according to the present embodiment, the magnetic pole 20 includes the narrow portion 20A and the wide portion 20B, and is formed of a plating film. The electrode film 19, which is used when forming the plating film to constitute the magnetic pole 20 by plating, is provided not under the narrow portion 20A but under at least a part of the wide portion 20B. Consequently, as will be described later, the present embodiment prevents the formation of a seam in the plating film in the narrow portion 20A.

The method of manufacturing the magnetic head according to the present embodiment includes the steps of: forming the plating-film-accommodating layer 17Q that has the accommodating groove 17a; forming the electrode film 19 in a part of the accommodating groove 17a; and forming the plating film 20P in the accommodating groove 17a by plating using the electrode film 19. The accommodating groove 17a includes the narrow groove portion 17a1 for accommodating the narrow portion 20A of the magnetic pole 20, and the wide groove portion 17a2 for accommodating the wide portion 20B of the magnetic pole 20. The electrode film 19 is provided not in the narrow groove portion 17a1 but in at least a part of the wide groove portion 17a2. In the step of forming the plating film 20P, the plating film 20P grows from the surface of the electrode film 19, and the narrow groove portion 17a1 is filled with a part of the plating film 20P. If any electrode film exists in the narrow groove portion 17a1, two portions of the plating film that are grown from the two portions of the electrode film lying on the two sidewalls of the narrow groove portion 17a1 meet each other to form a seam in the plating film in the narrow portion 20A. In contrast, according to the present embodiment, the absence of the electrode film 19 in the narrow groove portion 17a1 prevents the formation of a seam in the plating film in the narrow portion 20A.

As described above, according to the magnetic head and the method of manufacturing the same of the present embodiment, it is possible to provide a magnetic head in which the narrow portion 20A of the magnetic pole 20 has no seam in plating film. If there is a seam in the plating film in the narrow portion 20A, the magnetic pole 20 drops in mechanical strength and becomes susceptible to corrosion at the seam. This results in the problems that the magnetic pole 20 is defect-prone in the process of manufacturing the magnetic head, and that the magnetic head degrades in recording characteristics including the overwrite property. The present embodiment prevents such problems. According to the present embodiment, it is therefore possible to prevent the occurrence of defects in the magnetic pole 20 in the process of manufacturing the magnetic head, and to improve the recording characteristics of the magnetic head.

The method of manufacturing the magnetic head according to the present embodiment also includes the steps of: fabricating a substructure by forming components of the magnetic head on a substrate, the substructure including a pre-head portion 101 that is to become the magnetic head later and a to-be-removed portion 102 that is to be removed later, the to-be-removed portion 102 adjoining the pre-head portion 101 across the position ABS where the medium facing surface 30 is to be formed; and fabricating the magnetic head from the substructure so that the to-be-removed portion 102 is removed from the substructure to form the medium facing surface 30.

Figure 17A:
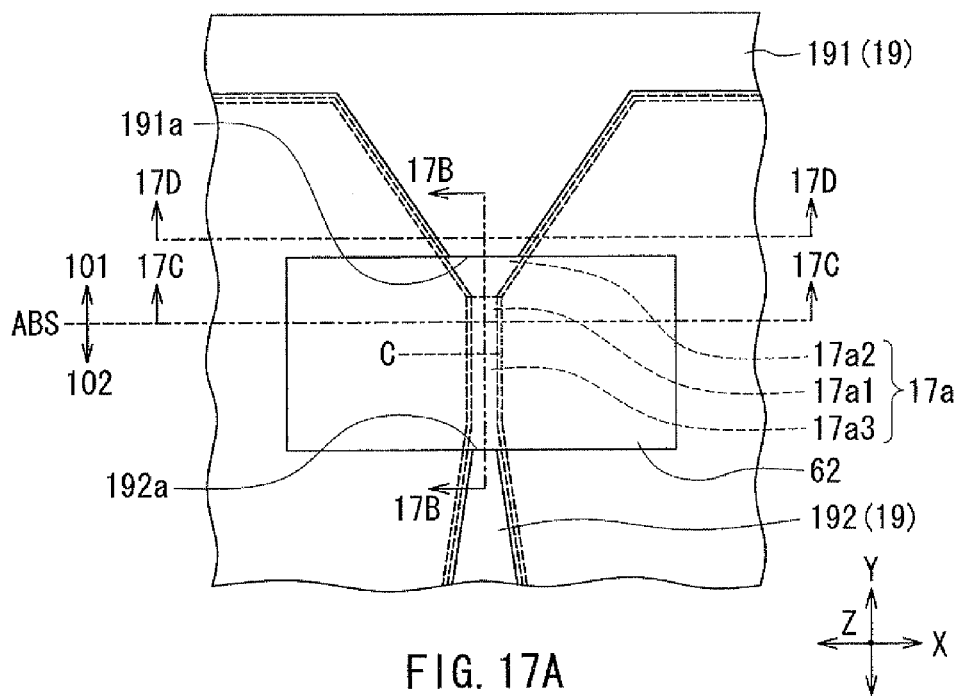
FIG. 17A to FIG. 17D are explanatory diagrams showing a step that follows the step shown in FIG. 16A to FIG. 16D.
Figure 17B:
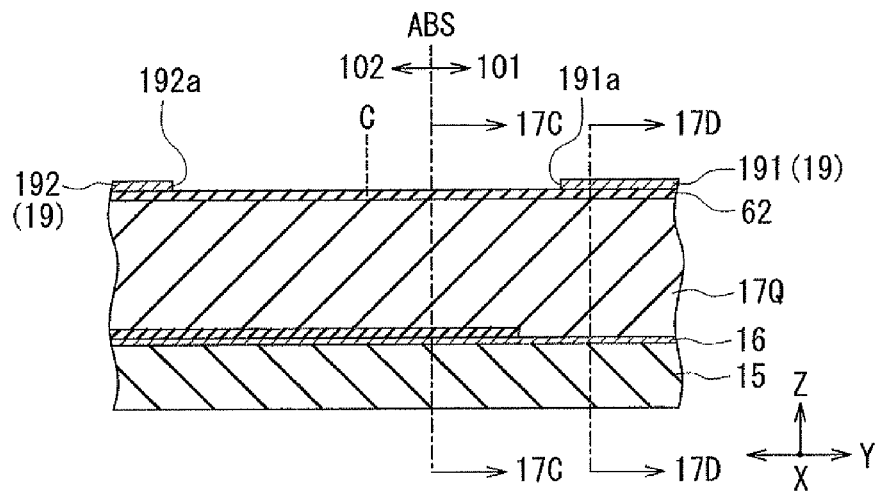
Figure 17C:
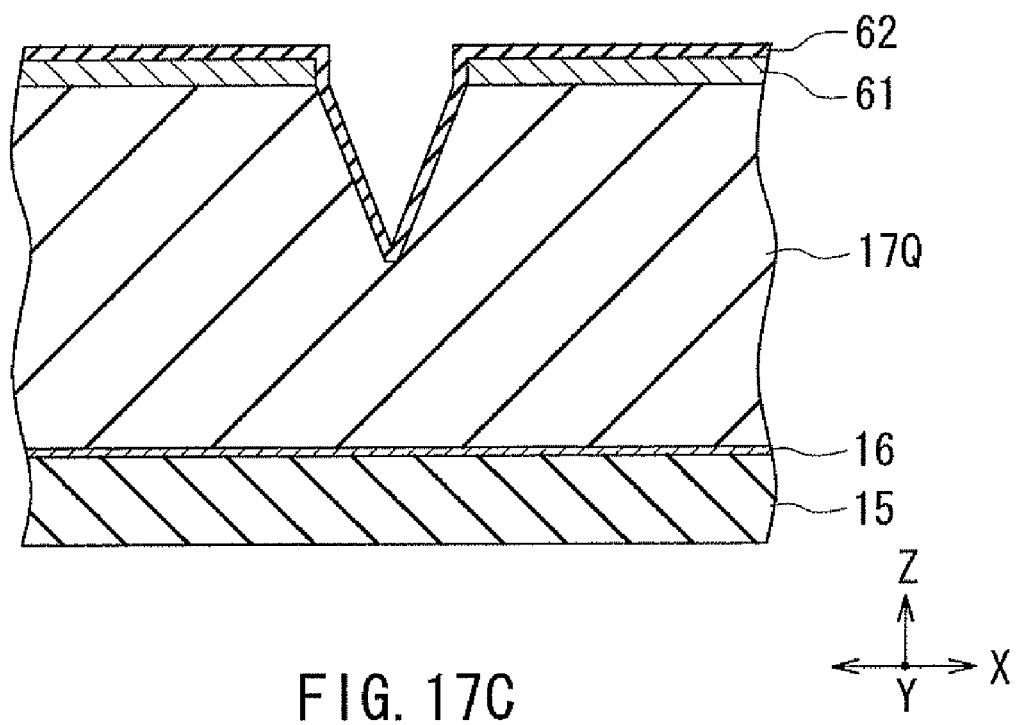
Figure 17D:
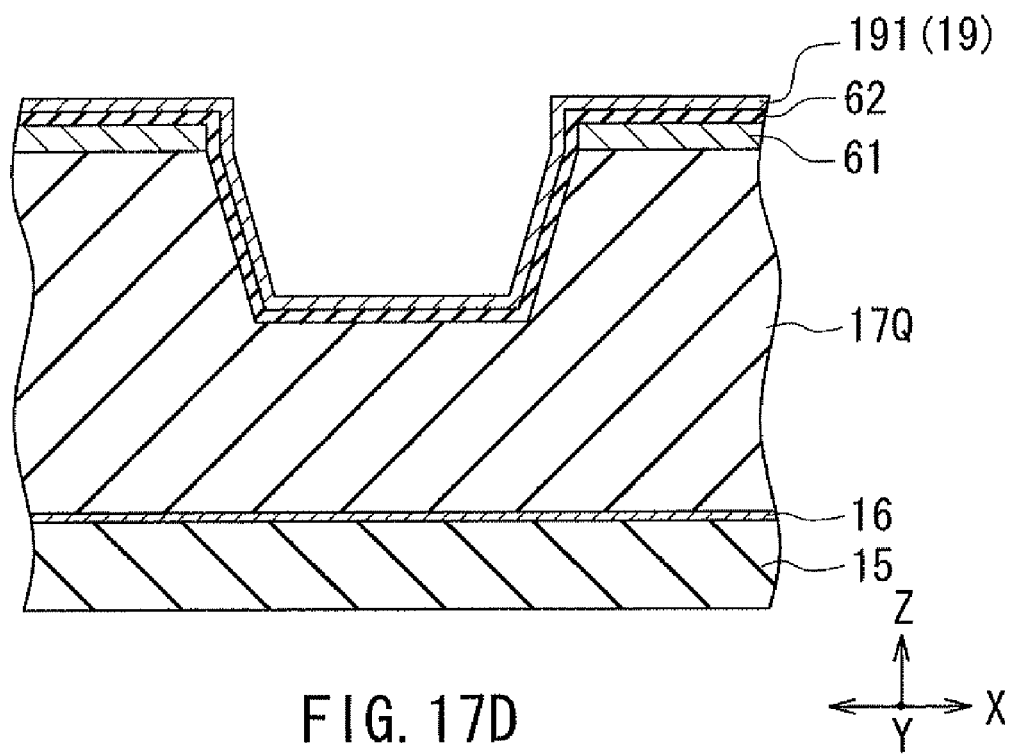

The step of fabricating the substructure includes the steps of: forming the plating-film-accommodating layer 17Q that has the accommodating groove 17a; forming the electrode film 19 in a part of the accommodating groove 17a; and forming the plating film 20P in the accommodating groove 17a by plating using the electrode film 19. As shown in FIG. 13A to FIG. 13D, the accommodating groove 17a includes the narrow groove portion 17a1 for accommodating the narrow portion 20A of the magnetic pole 20, the wide groove portion 17a2 for accommodating the wide portion 20B of the magnetic pole 20, and the to-be-removed groove portion 17a3 that is provided in the to-be-removed portion 102 so as to be continuous with the narrow groove portion 17a1 and is to be removed later. As shown in FIG. 17A to FIG. 17D, the electrode film 19 has the first part 191 provided in at least a part of the wide groove portion 17a2, and the second part 192 provided in a part of the to-be-removed groove portion 17a3. The electrode film 19 is not provided in the narrow groove portion 17a1. The first part 191 has the first end 191a that is closer to the position ABS where the medium facing surface 30 is to be formed. The second part 192 has the second end 192a that is closer to the position ABS where the medium facing surface 30 is to be formed. As shown in FIG. 17A and FIG. 17B, the center position C at equal distances from the first end 191*a* and the second end 192*a* falls within the to-be-removed portion 102. As shown in FIG. 18B, in the step of forming the plating film 20P, the plating film 20P grows from the surfaces of the first part 191 and the second part 192 of the electrode film 19. The narrow groove portion 17*a*1 is filled with a part of the portion of the plating film 20P that is grown from the surface of the first part 191.

Figure 28:
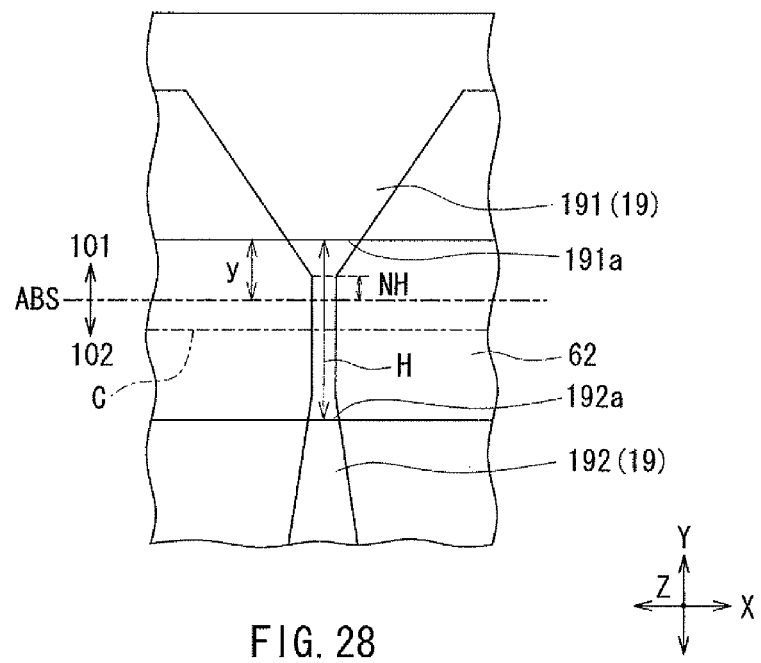
FIG. 28 is an explanatory diagram showing the position of the electrode film in the method of manufacturing the magnetic head according to the embodiment of the invention.

With reference to FIG. 28, a description will now be given of the relationship between the position of the electrode film 19 and the thickness of the plating film 20P. Initially, the thickness of the plating film 20P will be defined as a dimension of the portion of the plating film 20P that is perpendicularly grown from the top surface of the first part 191 of the electrode film 19, the dimension being taken in the direction perpendicular to the top surface of the first part 191. The thickness of the plating film 20P will be represented by the symbol x. The distance from the boundary between the narrow portion 20A and the wide portion 20B of the magnetic pole 20 to the medium facing surface 30 will be referred to as a neck height, and will be represented by the symbol NH. The distance between the position ABS where the medium facing surface 30 is to be formed and the first end 191*a* will be represented by the symbol y. The distance between the first end 191*a* and the second end 192*a* will be represented by the symbol H.

In the step of forming the plating film 20P, the portion of the plating film 20P grown from the first part 191 and the portion of the plating film 20P grown from the second part 192 need to be connected to each other so that the subsequent steps can be performed without problems. From this point of view, the plating film 20P needs to have a thickness x that is greater than ½ the distance H between the first end 191*a* and the second end 192*a*. The thickness x of the plating film 20P is preferably greater than the distance H. In other words, the thickness x of the plating film 20P and the distance H need to satisfy the following expression (1a), and preferably satisfy the expression (1b).

$$H/x<2 \qquad (1a)$$

$$H/x<1 \qquad (1b)$$

In order to prevent the electrode film 19 from being formed in the narrow groove portion 17*a*1, the distance y between the position ABS where the medium facing surface 30 is to be formed and the first end 191*a* needs to be greater than the neck height NH. The distance y and the neck height NH therefore need to satisfy the following expression (2).

$$y/NH>1 \qquad (2)$$

As shown in FIG. 18B, the portion of the plating film 20P grown from the first part 191 and the portion of the plating film 20P grown from the second part 192 meet each other to form a seam 201. The seam 201 needs to lie in the to-be-removed portion 102. This requires that the center position C at equal distances from the first end 191*a* and the second end 192*a* fall within the to-be-removed portion 102. In other words, the distance y between the position ABS where the medium facing surface 30 is to be formed and the first end 191*a* and the distance H between the first end 191*a* and the second end 192*a* need to satisfy the following expression (3).

$$H/2>y, \text{ or equivalently, } H/y>2 \qquad (3)$$

Figure 29:
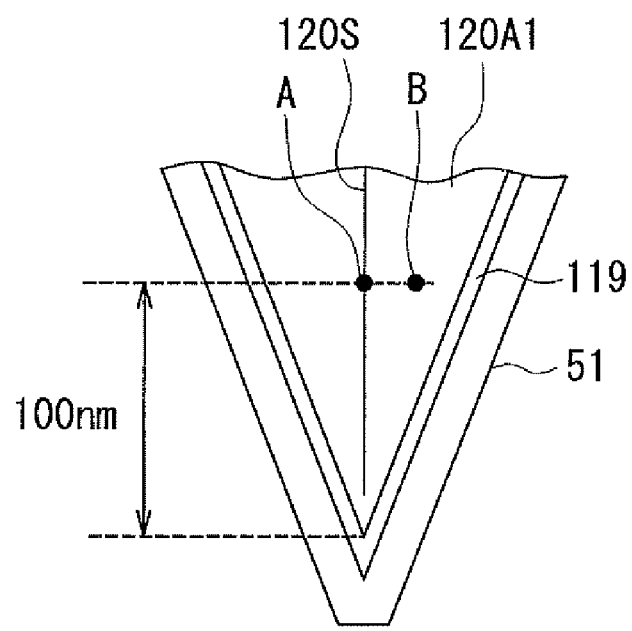
FIG. 29 is an explanatory diagram showing a magnetic pole formed by a method of manufacturing a magnetic head of a comparative example.
Figure 30:
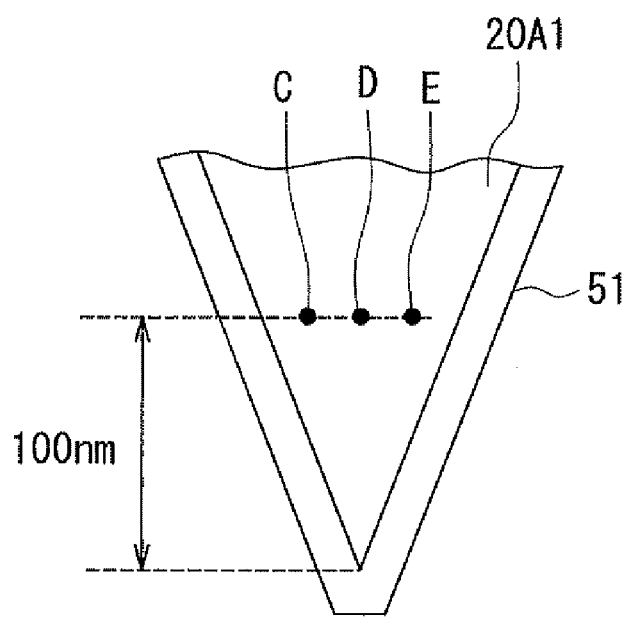
FIG. 30 is an explanatory diagram showing a magnetic pole formed by the method of manufacturing the magnetic head according to the embodiment of the invention.

With reference to FIG. 29 and FIG. 30, a description will now be given of the result of a first experiment. The first experiment was performed for comparison between the structure of a magnetic pole that was formed by a method of manufacturing a magnetic head of a comparative example and the structure of a magnetic pole that was formed by the method of manufacturing the magnetic head according to the present embodiment. FIG. 29 shows a front end face 120A1 of the narrow portion of the magnetic pole that was formed by the method of manufacturing a magnetic head of the comparative example. FIG. 30 shows the front end face 20A1 of the narrow portion 20A of the magnetic pole 20 that was formed by the method of manufacturing the magnetic head according to the present embodiment.

Hereinafter, the magnetic pole 20 that was formed by the method of manufacturing the magnetic head according to the present embodiment for the first experiment will be referred to as the magnetic pole of a first practical example. The magnetic pole of the first practical example was formed under the following conditions. The thickness x of the plating film 20P was 1.25 µm. The distance y between the position ABS where to form the medium facing surface 30 and the first end 191*a* of the first part 191 of the electrode film 19 was 0.20 µm. The neck height NH was 0.06 µm. The distance H between the first end 191*a* and the second end 192*a* was 0.76 µm. Such values of x, y, NH, and H satisfy the foregoing expressions (1a), (1b), (2), and (3).

In the method of manufacturing a magnetic head of the comparative example, an electrode film 119 was formed in the entire accommodating groove 17*a* of the plating-film-accommodating layer 17, and a plating film to constitute the magnetic pole was formed by plating using the electrode film 119. The rest of the steps in the method of manufacturing a magnetic head of the comparative example were the same as those of the present embodiment. Hereinafter, the magnetic pole that was formed by the method of manufacturing a magnetic head of the comparative example for the first experiment will be referred to as the magnetic pole of a first comparative example.

The electrode film 119 used to form the magnetic pole of the first comparative example and the electrode film 19 used to form the magnetic pole 20 of the first practical example were both configured so that a 12.5-nm-thick Ru layer and a 50-nm-thick FeCo layer were stacked in this order on a 10-nm-thick Ti layer. The FeCo layer was composed of 65% by weight of Fe and 35% by weight of Co. Both the magnetic pole of the first comparative example and the magnetic pole 20 of the first practical example were formed into a target composition with 65% by weight of Fe, 32% by weight of Co, and 3% by weight of Ni.

As shown in FIG. 29, the magnetic pole of the first comparative example had a seam 120S in the plating film in the narrow portion. The seam 120S was formed between two portions of the plating film that were grown from the two portions of the electrode film 119 lying on the two sidewalls of the narrow groove portion 17*a*1 of the accommodating groove 17*a*. As shown in FIG. 30, the magnetic pole 20 of the first practical example had no seam in the plating film in the narrow portion 20A.

In the first experiment, the front end face 120A1 of the narrow portion of the magnetic pole of the first comparative example shown in FIG. 29 and the front end face 20A1 of the narrow portion 20A of the magnetic pole 20 of the first practical example shown in FIG. 30 were analyzed for composition at positions A and B and at positions C, D, and E, respectively, by using an EDX (Energy Dispersive X-ray spectroscope). The position A was on the seam 120S and 100 nm above the bottom end of the front end face 120A1. The position B was at the same level as the position A and off the seam 120S. The position D was 100 nm above the bottom end of the front end face 20A1. The positions C and E were at the same level as the position D and on opposite sides of the position D in the track width direction. Table 1 shows the composition analyses at the positions A to E. The numerals in Table 1 show the contents of the respective components in units of % by weight.

TABLE 1

| Position | Fe | Co | Ni | S |
|---|---|---|---|---|
| A | 64.2 | 31.8 | 3.4 | 0.6 |
| B | 64.9 | 31.6 | 3.3 | 0.2 |
| C | 65.2 | 31.8 | 2.9 | 0.1 |
| D | 64.4 | 32.2 | 3.2 | 0.2 |
| E | 64.6 | 32.1 | 3.3 | 0.0 |

As shown in Table 1, the front end face 120A1 of the narrow portion of the magnetic pole of the first comparative example had an extremely high S (sulfur) content (0.6% by weight) at the position A on the seam 120S as compared with the S (sulfur) content (0.2% by weight) at the position B off the seam 120S. S (sulfur) is one of the elements contained in the plating bath that was used for the formation of the plating film, and is an impurity in the magnetic pole. The result of the first experiment shows that impurities segregated at the seam 120S in the narrow portion of the magnetic pole of the first comparative example. Such a seam 120S is low in mechanical strength and susceptible to corrosion as compared with the other portions of the magnetic pole. Consequently, in the process of manufacturing the magnetic head, the magnetic pole is prone to defects such as a deep recess in the position of the seam 120S.

As shown in Table 1, the front end face 20A1 of the narrow portion 20A of the magnetic pole 20 of the first practical example had S (sulfur) contents in the range of 0.0% to 0.2% by weight at the positions C, D, and E. This shows that S (sulfur), an impurity, was almost uniformly distributed in the narrow portion 20A of the magnetic pole 20 of the first practical example. This prevents the narrow portion 20A from suffering from the seam-based problem mentioned above.

Next, a description will be given of the result of a second experiment. The second experiment was performed to compare recording and other characteristics between a magnetic head that was manufactured by the method of manufacturing the magnetic head according to the present embodiment and a magnetic head that was manufactured by the method of manufacturing a magnetic head of the comparative example. In the second experiment, magnetic heads of second to fourth practical examples were manufactured by the method of manufacturing the magnetic head according to the present embodiment. A magnetic head of a second comparative example was manufactured by the method of manufacturing a magnetic head of the comparative example. The conditions for forming the magnetic poles in the second experiment were the same as those in the first experiment except the target compositions of the magnetic poles.

In the second experiment, each of the magnetic heads manufactured was measured for the overwrite property. Each of the magnetic heads was also checked for a seam in the front end face of the narrow portion of the magnetic pole, and for the occurrence of a defect in the narrow portion in the process of manufacturing the magnetic head. Specifically, the defect in the narrow portion refers to a deep recess that appears in the position of a seam. Table 2 shows the results of the second experiment. Table 2 lists the target compositions of the magnetic poles, the overwrite property OW (in units of dB), the presence or absence of a seam, and the presence or absence of the defect in the second to fourth practical examples and the second comparative example. For the target compositions of the magnetic poles, FeXCoYNiZ indicates that Fe was X % by weight, Co was Y % by weight, and Ni was Z % by weight. For the overwrite property OW, the greater the better. With the target compositions of the magnetic poles of the second to fourth practical examples and the second comparative example, the plating films each has a saturation flux density of approximately 2.3 to 2.4 T.

TABLE 2

| | Target composition | OW | Seam | Defect |
|---|---|---|---|---|
| 2nd practical example | Fe70Co28N2 | 28 | None | None |
| 3rd practical example | Fe65Co32N3 | 28 | None | None |
| 4th practical example | Fe60Co37N3 | 27 | None | None |
| 2nd comparative example | Fe62Co35N3 | 25 | Present | Present |

As shown in Table 2, the magnetic heads of the second to fourth practical examples had a 2- to 3-dB improved overwrite property OW as compared with that of the magnetic head of the second comparative example. While a defect occurred in the narrow portion of the second comparative example, no defect occurred in the narrow portions of the second to fourth practical examples. The reason for this seems to be that the second to fourth practical examples did not have a seam which existed in the second comparative example.

The effect of the magnetic head and the method of manufacturing the same according to the present embodiment was confirmed from the results of the foregoing first and second experiments.

Other effects of the present embodiment will now be described. In the present embodiment, as shown in FIG. 1, the front end face 20A1 of the narrow portion 20A of the magnetic pole 20 located in the medium facing surface 30 decreases in width with decreasing distance to the top surface of the substrate 1. According to the present embodiment, it is thus possible to suppress the adjacent track erase resulting from a skew. The skew refers to the tilt of a magnetic head with respect to the tangent of the circular track that occurs according to the position of the magnetic head along the direction across the tracks.

In the present embodiment, as shown in FIG. 3, the top surface 20c of the magnetic pole 20 includes the first part 20c1 and the second part 20c2. The distance between the top surface of the substrate 1 and an arbitrary point on the first part 20c1 increases with increasing distance between the arbitrary point and the medium facing surface 30. Consequently, according to the present embodiment, the front end face 20A1 of the narrow portion 20A of the magnetic pole 20 located in the medium facing surface 30 can be reduced in size in the Z direction. This allows the suppression of the adjacent track erase resulting from a skew. Furthermore, the present embodiment allows the improvement of overwrite property since the magnetic pole 20 is capable of introducing a large amount of magnetic flux to the medium facing surface 30.

In the present embodiment, as shown in FIG. 3, the distance between the bottom surface of the second shield 42 and the second part 20c2 is greater than that between the bottom surface of the second shield 42 and the first part 20c1. According to the present embodiment, the magnetic pole 20 and the second shield 42 are opposed to each other via the second gap layer 52 only across a small area. This serves to prevent the second shield 42 from being saturated with the magnetic field leaking from the magnetic pole 20. Consequently, according to the present embodiment, it is possible to increase the gradient of the recording magnetic field by the function of the second shield 42.

The present invention is not limited to the foregoing embodiment, and various modifications may be made thereto. For example, in the foregoing embodiment, the plating film 20P to become the magnetic pole 20 is formed in the accommodating groove 17a of the plating-film-accommodating layer 17Q made of an inorganic insulating material. However, the present invention is also applicable to the case where the plating film 20P to become the magnetic pole 20 is formed in an accommodating groove of a plating-film-accommodating layer that is made of a material other than inorganic insulating materials, such as photoresist.

In the foregoing embodiment, a part of the plating-film-accommodating layer 17Q is removed after the formation of the plating film 20P. However, the present invention is also applicable to the case where no part of the plating-film-accommodating layer 17Q is removed after the formation of the plating film 20P.

In the present invention, the magnetic pole 20 may have a flat top surface 20c without the first and second parts 20c1 and 20c2.

The present invention is applicable not only to a magnetic head for the perpendicular magnetic recording system but also to a magnetic head for the longitudinal magnetic recording system.

While the foregoing embodiment has been described with reference to a magnetic head having a structure in which the reproducing head is formed on the base body and the recording head is stacked on the reproducing head, the reproducing head and the recording head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A thin-film magnetic head comprising:
   a medium facing surface that faces a recording medium;
   a magnetic pole formed of a plating film; and
   an electrode film provided under a part of the magnetic pole, wherein:
   the magnetic pole includes a narrow portion and a wide portion, the narrow portion having a front end face located in the medium facing surface and a rear end opposite to the front end face, the wide portion being connected to the rear end of the narrow portion and having a width greater than that of the narrow portion, the magnetic pole producing, from the front end face of the narrow portion, a recording magnetic field for recording data on the recording medium; and
   the electrode film is provided not under the narrow portion but under at least a part of the wide portion.

2. The thin-film magnetic head according to claim 1, wherein the electrode film includes a layer made of a non-magnetic metal material.

3. A head assembly comprising: a slider that is disposed to face a recording medium; and a supporter that flexibly supports the slider, the slider including the thin-film magnetic head according to claim 1.

4. A magnetic recording device comprising: a recording medium; a slider that is disposed to face the recording medium; and a positioning device that supports the slider and positions the slider with respect to the recording medium, the slider including the thin-film magnetic head according to claim 1.

5. A method of manufacturing the thin-film magnetic head according to claim 1, comprising the steps of:
   forming a plating-film-accommodating layer that has an accommodating groove in which the plating film is to be accommodated later;
   forming the electrode film in a part of the accommodating groove; and
   forming the plating film in the accommodating groove by plating using the electrode film, wherein:
   the accommodating groove includes a narrow groove portion for accommodating the narrow portion of the magnetic pole and a wide groove portion for accommodating the wide portion of the magnetic pole;
   the electrode film is provided not in the narrow groove portion but in at least a part of the wide groove portion; and
   in the step of forming the plating film, the plating film grows from a surface of the electrode film, and the narrow groove portion is filled with a part of the plating film.

6. A method of manufacturing the thin-film magnetic head according to claim 1, comprising the steps of:
   fabricating a substructure by forming components of the thin-film magnetic head on a substrate, the substructure including a pre-head portion that is to become the thin-film magnetic head later and a to-be-removed portion that is to be removed later, the to-be-removed portion adjoining the pre-head portion across a position where the medium facing surface is to be formed; and
   fabricating the thin-film magnetic head from the substructure so that the to-be-removed portion is removed from the substructure to form the medium facing surface,
   wherein the step of fabricating the substructure includes the steps of:
   forming a plating-film-accommodating layer that has an accommodating groove in which the plating film is to be accommodated later;
   forming the electrode film in a part of the accommodating groove; and
   forming the plating film in the accommodating groove by plating using the electrode film, wherein:
   the accommodating groove includes a narrow groove portion for accommodating the narrow portion of the magnetic pole, a wide groove portion for accommodating the wide portion of the magnetic pole, and a to-be-removed groove portion that is provided in the to-be-removed portion so as to be continuous with the narrow groove portion and is to be removed later;
   the electrode film has a first part provided in at least a part of the wide groove portion and a second part provided in a part of the to-be-removed groove portion, the electrode film not being provided in the narrow groove portion;
   the first part of the electrode film has a first end that is closer to the position where the medium facing surface is to be formed;
   the second part of the electrode film has a second end that is closer to the position where the medium facing surface is to be formed;
   a center position at equal distances from the first end and the second end falls within the to-be-removed portion; and in the step of forming the plating film, the plating film grows from surfaces of the first and second parts of the electrode film, and the narrow groove portion is filled with a part of a portion of the plating film that is grown from the surface of the first part of the electrode film.

7. The method of manufacturing the thin-film magnetic head according to claim 6, wherein the plating film has a thickness greater than ½ a distance between the first end and the second end of the electrode film.

* * * * *